United States Patent [19]

Mukawa et al.

[11] Patent Number: 5,557,589
[45] Date of Patent: Sep. 17, 1996

[54] DISC RECORDING AND/OR REPRODUCING APPARATUS THAT POSITIONS THE MAGNETIC HEAD IN RESPONSE TO A TYPE OF DISC

[75] Inventors: Hiroshi Mukawa; Hiroshi Eto, both of Tokyo, Japan

[73] Assignee: Sony Corporation, Tokyo, Japan

[21] Appl. No.: 317,846

[22] Filed: Oct. 4, 1994

Related U.S. Application Data

[63] Continuation of Ser. No. 9,294, Jan. 26, 1993, abandoned.

[30] Foreign Application Priority Data

| Jan. 27, 1992 | [JP] | Japan | 4-034049 |
| Jan. 27, 1992 | [JP] | Japan | 4-034050 |
| May 26, 1992 | [JP] | Japan | 4-157309 |
| May 26, 1992 | [JP] | Japan | 4-158820 |

[51] Int. Cl.⁶ ............................ G11B 33/02; G11B 11/00
[52] U.S. Cl. ........................................ 369/13; 369/77.2
[58] Field of Search ............................ 369/13, 75.2, 77.2; 360/105, 114

[56] References Cited

U.S. PATENT DOCUMENTS

| 4,716,479 | 12/1987 | Sakamoto et al. | 360/105 |
| 4,740,937 | 4/1988 | Watanabe | 369/13 |
| 4,837,758 | 6/1989 | Motoyama et al. | 369/13 |
| 4,868,695 | 9/1989 | Quatro et al. | 360/105 |
| 5,072,431 | 12/1991 | Ohmori et al. | 369/13 |
| 5,224,079 | 6/1993 | Inoue | 369/13 |
| 5,226,024 | 7/1993 | Mukawa | 369/13 |
| 5,309,421 | 5/1994 | Fujisawa | 369/77.1 |

FOREIGN PATENT DOCUMENTS

| 13254 | 1/1992 | Japan | 369/13 |

Primary Examiner—John H. Wolff
Assistant Examiner—George J. Letscher
Attorney, Agent, or Firm—Limbach & Limbach L.L.P.

[57] ABSTRACT

A disc type detection arm contacts a disc type opening formed in a disc cartridge when the disc cartridge is loaded into a recording and/or reproducing apparatus. The disc type detection arm determines the type of disc which has been loaded by the depth of the disc type opening, and controls the positioning of the magnetic head in response thereto. The magnetic head is spaced-apart from the disc when a read-only type disc is loaded, and positioned close to the disc when a read/write disc is loaded.

24 Claims, 28 Drawing Sheets

DISC RECORDING AND/OR REPRODUCING APPARATUS THAT POSITIONS THE MAGNETIC HEAD IN RESPONSE TO A TYPE OF DISC

This is a continuation of application Ser. No. 08/009,294 filed on Jan. 26, 1993, now abandoned.

BACKGROUND OF THE INVENTION

1. Field of the Invention

This invention relates to a disc recording and/or reproducing apparatus employing a recording disc, such as a magneto-optical disc or an optical disc, as a recording medium. More particularly, it relates to a disc recording and/or reproducing apparatus on which a disc cartridge having the recording disc housed therein may be loaded as such, that is with the disc housed therein.

2. Description of the Related Art

There has hitherto been proposed a disc recording and/or reproducing apparatus on which a disc cartridge housing therein a recording disc such as a magneto-optical disc or an optical disc carrying pre-recorded information signals or information signals to be recorded may be loaded as such and in which the information signals may be recorded on the recording disc or the information signals pre-recorded on the disc may be reproduced from the disc.

As the recording medium for this type of the recording and/or reproducing apparatus, there are a play-only optical disc on which the information signals are pre-recorded and exclusively reproduced, and a magneto-optical disc in which the informations signals once recorded on the disc are erased to permit rerecording of new signals.

The play-only optical disc includes a disc substrate, fabricated by molding synthetic resin, such as transparent polycarbonate resin exhibiting light transmittancy, and a reflective layer of a metallic material, such as aluminum, deposited on one of the major surfaces of the disc substrate. On the major surface of the disc substrate, provided with the reflective layer of the disc substrate, a pattern of pits and lands corresponding to the informations signals is previously formed by, for example, injection molding, by means of a stamper. That is, the informations signals are recorded as the pattern of pits and lands formed by the stamper. The informations signals, recorded on the disc substrate in the form of the pattern of pits and lands, may be read out and reproduced by radiating a laser beam from the major surface of the optical disc opposite to the surface provided with the reflective layer, and by detecting the volume of reflected light by detecting means, such as photodetectors.

On the other hand, the magneto-optical disc enabling rerecording of information signals includes a disc substrate formed by molding a transparent synthetic resin, such as transparent polycarbonate resin, exhibiting light transmitting properties, similarly to the optical disc, and a signal recording layer, consisting in a magnetic layer, deposited on one of the major surfaces of the disc substrate. The information signals may be recorded on the magneto-optical disc by converging a laser beam emanating from an optical pickup device at a predetermined site of the signal recording layer and applying an external magnetic field on the irradiated site by an external magnetic field generating device. Meanwhile, the laser light beam is radiated on the signal recording layer through the disc substrate from the major surface opposite to the major surface provided with the signal recording layer. On the other hand, the external magnetic field is applied from the major surface of the magneto-optical disc opposite to the major surface thereof irradiated with the laser beam. The portion of the signal recording layer irradiated with the laser beam becomes devoid of coercivity by being heated to a temperature higher than the Curie temperature. The external magnetic field is applied to the disc in the state bereaved of coercivity so that the signal recording layer has its magnetic domain inverted in accordance with the external magnetic field. The information signals are recorded by allowing the disc to cool to fix the state of the magnetic domains.

In this manner, it becomes possible with the magneto-optical disc to record the information signals by modulating the direction of the external magnetic field or the intensity of the laser beam for inverting the magnetic domains of the signal recording layer in a controlled manner, or to erase or re-record information signals, while running the disc in rotation.

The disc recording and/or reproducing apparatus for recording information signals using the above-described magneto-optical disc is comprised of a rotating unit for rotating a magneto-optical disc in unison, a magnetic head for applying an external magnetic field to the magneto-optical disc, and an optical pickup unit for radiating a converged laser beam to the magneto-optical disc. The magnetic head and the optical pickup unit are arranged facing each other with the magneto-optical disc in-between. Besides, the magnetic head and the optical pickup unit are mounted, along with an arm member as coupling means, for movement radially of and across the inner and outer peripheries of the disc.

The magnetic head is comprised of a magnetic core and a coil wound about the magnetic core for generating a magnetic field. The magnetic head is mounted in close proximity to the signal recording layer with the interposition of e.g. a lubricious layer and a protective layer of a synthetic material. The optical pickup unit includes a light source, such as a laser diode, and an optical device, such as an object lens, for guiding and converging a light beam radiated from the light source. The optical pickup unit is arranged at a distance from the signal recording layer substantially equal to a focal length of an object lens converging the light beam so that the point of convergence of the light beam is at a boundary between the signal recording layer and the disc substrate.

With such disc recording and/of reproducing apparatus, employing a magneto-optical disc as a recording medium, it has been customary that not only the information signals can be recorded on the disc, but also the information signals can be reproduced from the disc. The information signals may be reproduced from the magneto-optical disc by radiating a converged light beam in a linearly polarized state and detecting the direction of polarization of the light beam reflected from the signal recording layer. That is, the light beam when reflected by the surface of the signal recording layer has its direction of polarization changed under the Kerr effect. Consequently, the change in the direction of magnetization in the signal recording layer can be read by detecting the direction of polarization of the reflected light beam.

Detection of the reflected light beam is by a detector and a photodetector arranged within the optical pickup unit. The detector is a so-called Wollaston prism of a ½ wavelength plate etc. for converting the difference in the direction of light polarization into changes in light intensity. The photodetector is a photodiode of a phototransistor for converting the light intensity of the received light beam into corresponding electrical signals.

The disc recording and/or reproducing apparatus, employing the magneto-optical disc as a recording medium, enables the information signals recorded on a reproduce-only optical disc as a pattern of pits and lands to be reproduced. That is, the information signals recorded in the form of the pattern of pits and lands are reproduced by detecting the volume of light reflected from the optical disc.

When recording the information signals on the magneto-optical disc in the above-mentioned recording and/or reproducing apparatus, both the magnetic head and the optical pickup unit are run in operation. However, when reproducing the information signals from the magneto-optical disc or from a reproduce-only optical disc with the disc recording and/or reproducing apparatus, only the optical pickup unit is driven in operation, while the magnetic head is not driven in operation.

The sliding contact of the magneto-optical disc with the magnetic head causes wear to the magnetic head and to the magneto-optical head. Consequently, if the magnetic head is slidingly contacted with the magneto-optical disc a large number of times, the magnetic head or the magneto-optical disc is lowered in durability.

For this reason, the code information indicative of the type of the recording disc previously recorded in a table-of-contents (TOC) area provided in the radially inner most zone in the recording region of the disc is reproduced on loading the disc cartridge for finding if the disc loaded in the disc recording and/or reproducing apparatus is a magneto-optical disc, that is a re-recordable disc, or an optical disc, that is a read-only optical disc.

If the code information indicates that the disc loaded is the magneto-optical disc, the magnetic head is driven in a direction of approaching the magnetic head towards the magneto-optical disc, whereas, if the code information indicates that the disc loaded is the reproduce-only optical disc, the magnetic head is not driven in operation and is positioned at a distance from the disc.

However, the disc recording and/or reproducing apparatus for discerning the disc type by the code information recorded on the recording disc for driving the magnetic head towards and away from the recording disc, it is necessary to provide special circuitry for discerning the disc type or a special mechanism for driving the magnetic head, thus complicating the structure. Besides, the recording or reproducing operation can not be performed quickly because of time involved in discerning the disc type on loading the disc cartridge.

OBJECTS AND SUMMARY OF THE INVENTION

It is an object of the present invention to provide a disc recording and/or reproducing apparatus which is free from the above-mentioned inconveniences inherent in the previously proposed disc recording and/or reproducing apparatus.

It is another object of the present invention to provide a disc recording and/or reproducing apparatus in which the magnetic head is brought into sliding contact with the recording disc only when the recording disc on which information signals can be recorded is loaded, whereby it becomes possible to prevent wear to the magnetic head and to the recording disc.

It is yet another object of the present invention to provide a disc recording and/or reproducing apparatus whereby the information signal s can be recorded and/or reproduced expeditiously.

It is a further object of the present invention to provide a disc recording and/or reproducing apparatus whereby the magnetic head brought into or out of contact with the loaded recorded disc can be reliably controlled in its position to assure protection of the magnetic head.

Other objects and advantages of the present invention will become more apparent from the following description of the preferred embodiments and the claims.

SUMMARY OF THE INVENTION

In accordance with the present invention, there is provided a disc recording and/or reproducing apparatus comprising an optical pickup unit movable radially of a disc on which information signals are pre-recorded or are to be recorded, for radiating a laser light beam on a recording surface of the disc, a magnetic head mounted on a supporting member adapted for facing the optical pickup unit with the disc in-between and designed to perform a movement in unison with the optical pickup unit, magnetic head applying an external magnetic field to the disc, a recording/reproducing unit on which a disc cartridge housing the disc therein is loaded, a magnetic head supporting member carrying the magnetic head on its distal end and having its proximal end supported by a supporting shaft, the magnetic head supporting member supporting the magnetic head for movement radially of the disc and towards and away from the disc, and a disc type detection arm rotated by having its distal end thrust by a disc type index portion provided on the disc cartridge when the disc cartridge is loaded on the recording/reproducing section for moving the magnetic head supporting member in a direction towards and away from the disc.

The recording/reproducing section includes a movement limiting member for limiting the movement of the disc type detection arm relative to the recording/reproducing section along the axis of the supporting shaft.

The disc type detecting arm has its proximal end supported by a supporting shaft supporting the magnetic head supporting member so as to be rotated about and along the axis of the supporting shaft.

The head supporting member of the disc recording and/or reproducing apparatus includes a rotation limiting member for limiting the rotation of the disc type detection arm relative to the magnetic head supporting arm about the supporting shaft as the center.

The recording/reproducing section includes an abutment member for limiting rotation of the magnetic head supporting member about the supporting shaft as the center when the disc cartridge is not loaded on the recording/reproducing section, with the abutment member being moved by abutment on the disc cartridge on loading the disc cartridge on the recording/reproducing section for releasing limitation of rotation of the magnetic head supporting member about the supporting shaft as the center, whereby impact waves etc. are prevented from being applied to the magnetic head supported by the magnetic head supporting member when the disc cartridge is not loaded on the recording/reproducing section.

The recording and/or reproducing apparatus according to the present invention comprises a connecting arm having the optical pickup unit mounted on its one end and having the magnetic head supporting member mounted at its other end for rotation by the supporting shaft, a positioning member mounted at one end of the supporting shaft of the connecting arm, and a resilient member mounted between the connecting arm at the other end of the supporting shaft and the magnetic head supporting member, the magnetic head supporting member being positioned in the axial direction of the supporting shaft by being thrust against the positioning member under resiliency of the resilient member, for assuring accurate positioning of the magnetic head.

The disc recording and/or reproducing apparatus according to the present invention comprises an optical pickup unit movable across the inner and outer peripheries of a disc on which information signals are pre-recorded or are to be recorded, a magnetic head facing the optical pickup unit with the disc in-between for radiating a laser light beam to a recording surface of the disc, a disc loading section for loading a disc cartridge rotatably housing the disc therein, a cartridge holder for removably holding the disc cartridge therein, with the cartridge holder supported by the cartridge loading section for movement in a direction of shifting the disc cartridge towards and away from the disc loading section, a magnetic head supporting member arranged for movement across the inner and outer peripheries of the disc loaded on the disc loading section along with the optical pickup unit, with the magnetic head supporting member supporting the magnetic head for movement between a first position in which the magnetic head is proximate to the disc and a second position in which the magnetic head is spaced apart from the disc, and magnetic head controlling means operated to loading the disc on the disc loading section responsive to the disc type index portion provided on the disc cartridge for indexing the disc type, with the magnetic head controlling means being responsive to such operation for shifting the magnetic head in the second position to the first position.

The magnetic head supporting member includes a head arm member having the magnetic head pivotally mounted at its distal end and having its proximal end rotatably supported via a supporting shaft by a movable member mounting the optical pickup unit, and a head arm movement limiting member rotated in unison with the head arm member. The magnetic head controlling means includes a head arm controlling member rotatably supported by a chassis mounting the disc loading section, a shaft member connected to the free end of the head arm controlling member in parallel with the direction of movement of the head arm member, with the shaft member being abutted against the head arm movement limiting member for limiting the range of the rotational movement of the head arm, and a detection plate member carrying a detection pin mounted upright thereon for detecting the disc type index portion of the disc cartridge loaded on the disc loading section, whereby the range of rotation of the head arm is controlled depending on whether the disc cartridge housing the recordable disc therein or the disc cartridge housing the reproduce-only disc therein is loaded o the disc loading section.

DETAILED DESCRIPTION OF THE PREFERRED EMBODIMENTS

Figure 1:
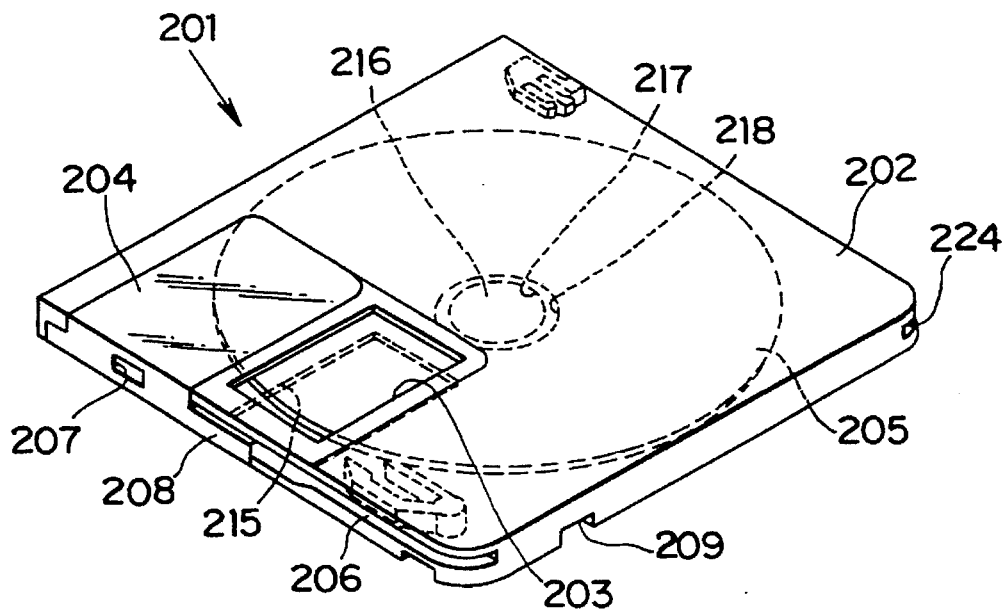
FIG. 1 is a perspective view showing an arrangement of a disc cartridge for a recordable disc employed in the disc recording and/or reproducing apparatus according to the present invention.
Figure 2:
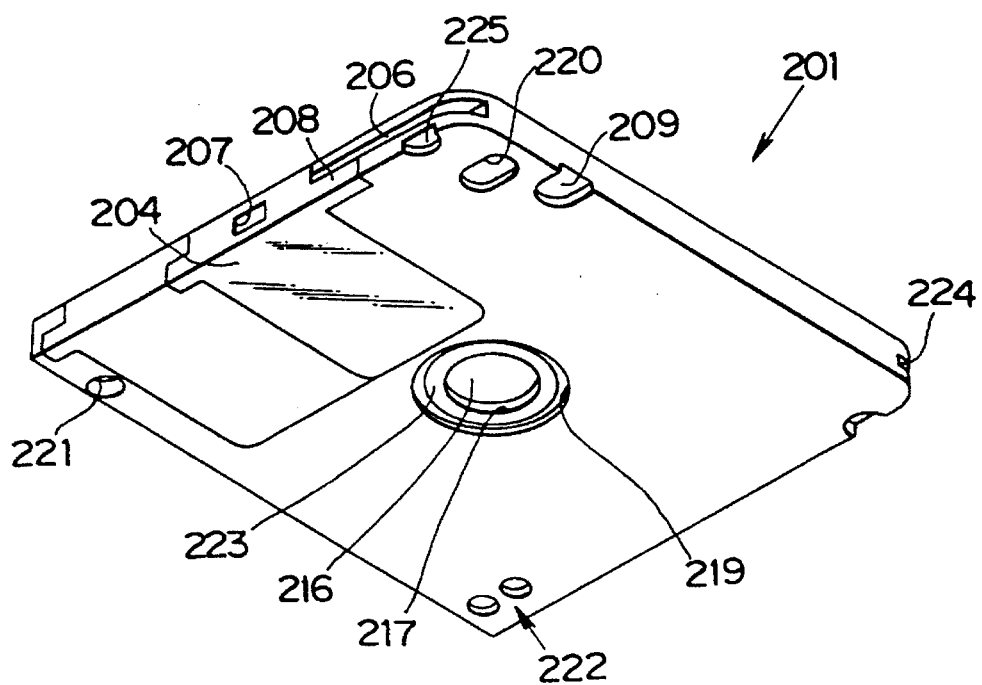
FIG. 2 is a perspective view showing the disc cartridge shown in FIG. 1 from the bottom side.
Figure 3:
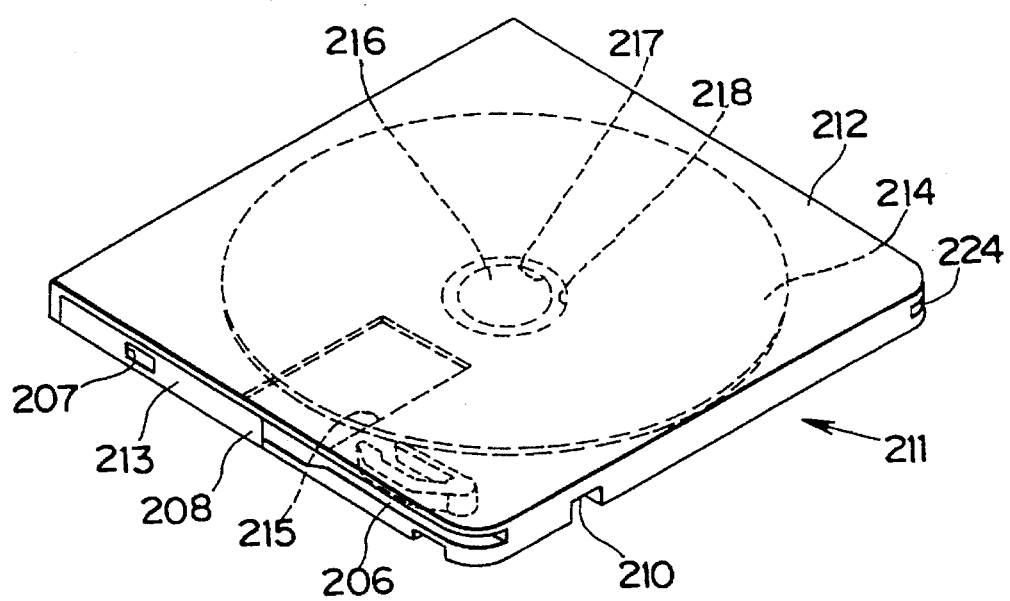
FIG. 3 is a perspective view showing an arrangement of a disc cartridge for a reproduce-only disc employed in the disc recording and/or reproducing apparatus according to the present invention.
Figure 4:
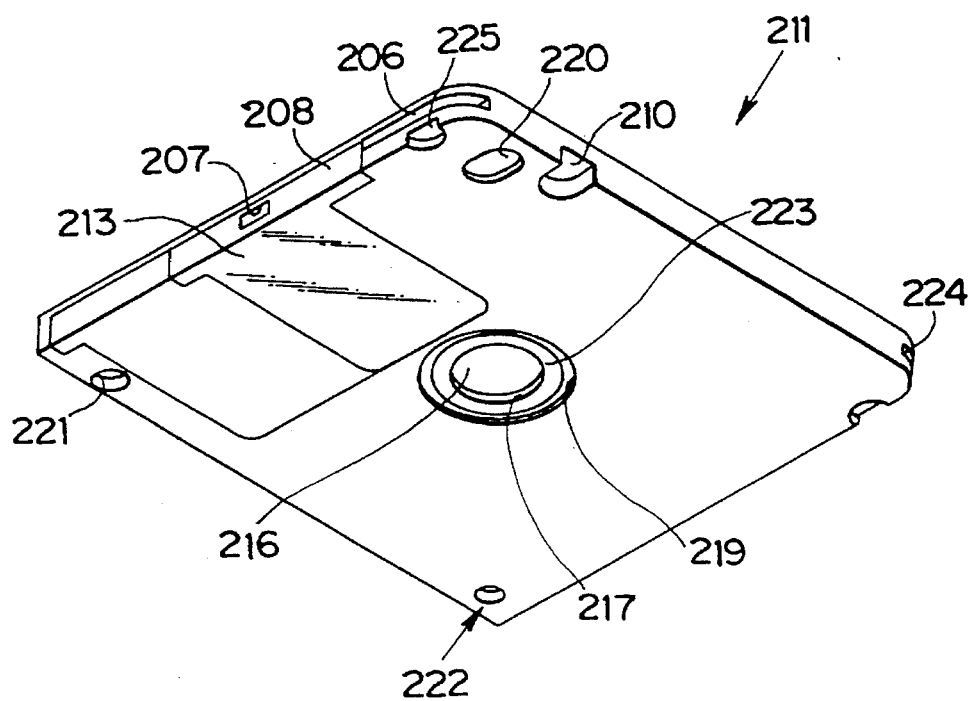
FIG. 4 is a perspective view showing the disc cartridge shown in FIG. 3 from the bottom side.

In the disc recording and/or reproducing apparatus according to the present invention, a recording/reproducing type disc cartridge 201, having an overwrite type recording disc for rerecording the information signals, as shown in FIGS. 1 and 2, a read-only disc cartridge 211, having housed therein a play-only recording disc, carrying previously recorded information signals thereon, as shown in FIGS. 3 and 4, may be loaded selectively.

The overwrite type or the read-write type disc cartridge 201 is first explained. The recording disc housed within the disc cartridge 201 is a magneto-optical disc comprised of a disk-shaped disc base plate or substrate, formed of synthetic resin, and a signal recording layer, formed of a magnetic material, deposited on one of the major surfaces of the disc. The disc substrate is of a diameter of an order of 64 mm.

A chucked part is provided at the middle of the disc substrate. The chucked part includes a circular through-hole 217, bored in the disc substrate, and a metallic plate 216 closing the through-hole 217. The through-hole 217 in the chucked part has its center aligned with the center of curvature of the spirally extending recording track(s) formed on the signal recording layer.

Meanwhile, the distal end face of an annular protuberance surrounding the through-hole 217 on the opposite major surface of the disc substrate serves as a positioning reference section 223. The metallic plate 216 is provided in a recess 218 formed around the through-hole 217 in the recording layer side major surface of the disc substrate so as not to be protruded above the major surface of the disc substrate.

The recording/reproducing type cartridge main body 202 is formed as a thin casing capable of housing the recording/reproducing type disc 205 therein. The upper major surface of the recording/reproducing type disc cartridge 202 has an aperture for the magnetic head 203 for causing the recording layer side major surface of the disc 205 to be exposed to outside across the inner and outer peripheries of the disc. The lower major surface of the recording/reproducing type cartridge main body 202 has an aperture for the optical pickup unit 215 for causing the aforementioned opposite major surface of the overwrite type disc 205 to be exposed to outside across the inner and outer peripheries of the disc. These apertures 203, 215 are of the same shape and size and provided in register with each other. That is, these apertures 203, 215 are substantially rectangular in shape and provided for extending from the mid portion on each major surface of the recording/reproducing type cartridge main body 202 to the vicinity of the lateral side of the disc cartridge 201 as viewed in the loading direction of the disc cartridge 201 on a disc cartridge loading unit. A chucking aperture 219 is also provided at a mid part of the lower major surface of the recording/reproducing type cartridge main body 202 for causing the chucked part and the positioning reference section 223 to be exposed to outside.

A shutter member 204 for opening or closing the apertures 203, 215 is slidably mounted on the recording/reproducing type cartridge main body 202. The shutter member 204 is a thin rectangular plate member of synthetic resin or metal, bent in the form of a letter U, and is adapted for closing the apertures 203, 215 by its opposite lateral side lobe portions. The shutter member 204 has its central web portion supported by a lateral side of the cartridge main body 202 so that the shutter member may be slid in the fore-and-aft direction with respect to the cartridge main body 202. The shutter member 204 is slid with respect to the recording/reproducing cartridge main body 202 for opening or closing the apertures 203, 215.

The central web portion of the shutter member 204, supported by the lateral side of the cartridge main body 202, is provided with a shutter closing operating opening 207 for operating the shutter member 204 to the closing position.

The lower major surface of the recording/reproducing cartridge main body 202 has paired front and rear positioning openings 220, 221. These positioning openings 220, 221 are engaged by positioning pins in the recording and/or reproducing apparatus for positioning and loading the recording/reproducing cartridge main body 202 with respect to the recording/reproducing section of the recording and/or reproducing apparatus. A disc index portion 209 for indicating the recording/reproducing disc functioning as a disc type indicator is provided at the forward bottom portion of the recording and/or reproducing apparatus. The present disc reproducing index portion 209 is a recess formed in the bottom surface of the recording/reproducing cartridge main body 202 with a shallow depth on the order of 0.7 mm.

The lateral side of the cartridge main body 202 fitted with the shutter member is formed with a shutter opening groove 206 extending from the forward end as far as a mid part of the shutter member 204. In a disc cartridge loading unit, when a shutter opening member provided in the recording/reproducing apparatus is introduced into the shutter opening groove 206 from the forward side, the shutter member 204 is slid towards the rear of the cartridge main body 202 for closing the apertures 203, 215. The mid part of the shutter member 204 supported by the lateral side of the cartridge main body 202 is provided with a shutter supporting lug 208 for extending towards the forward side in the direction of the shutter opening groove 206. In proximity to the shutter opening groove 206 on the bottom of the lateral side of the recording/reproducing cartridge main body 202 is a retention recess engaged by a locking unit of the main body of the recording/reproducing apparatus.

On the opposite lateral side of the recording/reproducing cartridge main body 202 is formed a mistaken insertion inhibiting groove 224 for extending from the forward side. The read-only type disc 214 is comprised of a disk-shaped disc substrate formed of a transparent synthetic resin, such as a polycarbonate resin exhibiting light-transmitting properties, and a reflective layer of a metallic material, such as aluminum, deposited on one of the major surfaces of the disc substrate. The read-only disc 214 is similar size and shape to the recording/reproducing type disc 205. The information signals are recorded on the reflective layer side major surface of the disc substrate of the read-only disc 214 by forming micro-sized projections and recesses by a stamper when molding the disc substrate by injection molding. A chucked part is provided at the mid part of the disc substrate. Similarly to the chucked part of the recording/reproducing disc 205, the chucked part is comprised of a circular through-hole 217 bored in the disc base plate and a metallic plate 216 as a magnetic plate closing the through-hole 217.

The read-only cartridge main body 212 is formed as a thin casing of a size capable of housing the reproduce-only disc 214. The lower major surface of the reproduce-only cartridge main body 212 has an aperture for the optical pickup unit 215 for causing the opposite side major surface of the reproduce-only disc 214 to be exposed to outside across the inner and outer peripheries of the disc. The aperture for the optical pickup unit 215 is substantially rectangular in shape and extended from a mid position of each of the major surfaces of the cartridge main body 211 to the vicinity of the lateral side of the cartridge main body 211 as viewed in the direction of insertion of the read-only disc cartridge 211 into the disc cartridge loading unit provided within the recording/reproducing apparatus. A chucking aperture 219 for causing the chucked part and the positioning reference section 23 to face outside is provided at a mid part of the lower major surface of the cartridge main body 212.

A shutter member 213 for opening and closing the aperture for the optical pickup unit 215 is slidably mounted within the read-only cartridge main body 212. The shutter member 213 is formed as a thin rectangular plate member bent at its one side for closing the aperture for the optical pickup unit 215. The shutter member 213 is slid with respect to the read-only cartridge main body 212 for opening or closing the aperture for the optical pickup unit 215.

Similarly to the shutter member 204 for the recording/reproducing disc cartridge 201, the shutter member 213 is provided with the shutter closure opening 207 and a shutter supporting lug 208.

Similarly to the recording/reproducing type cartridge main body 202, the read-only type cartridge main body 212 has paired fore and aft positioning holes 220, 221, a shutter opening groove 206, a retention recess 225 and a mistaken insertion inhibiting groove 224.

At a forward side of the bottom of the read-only cartridge main body 212 is formed an indexing portion 210 as a disc type indicating portion indicating that the disc is the read-only disc. The indexing porton 210 is a recess with a depth deeper than the similar indexing portion 209 for the read-only disc and is formed in the bottom surface of the read-only cartridge main body 212.

Figure 5:
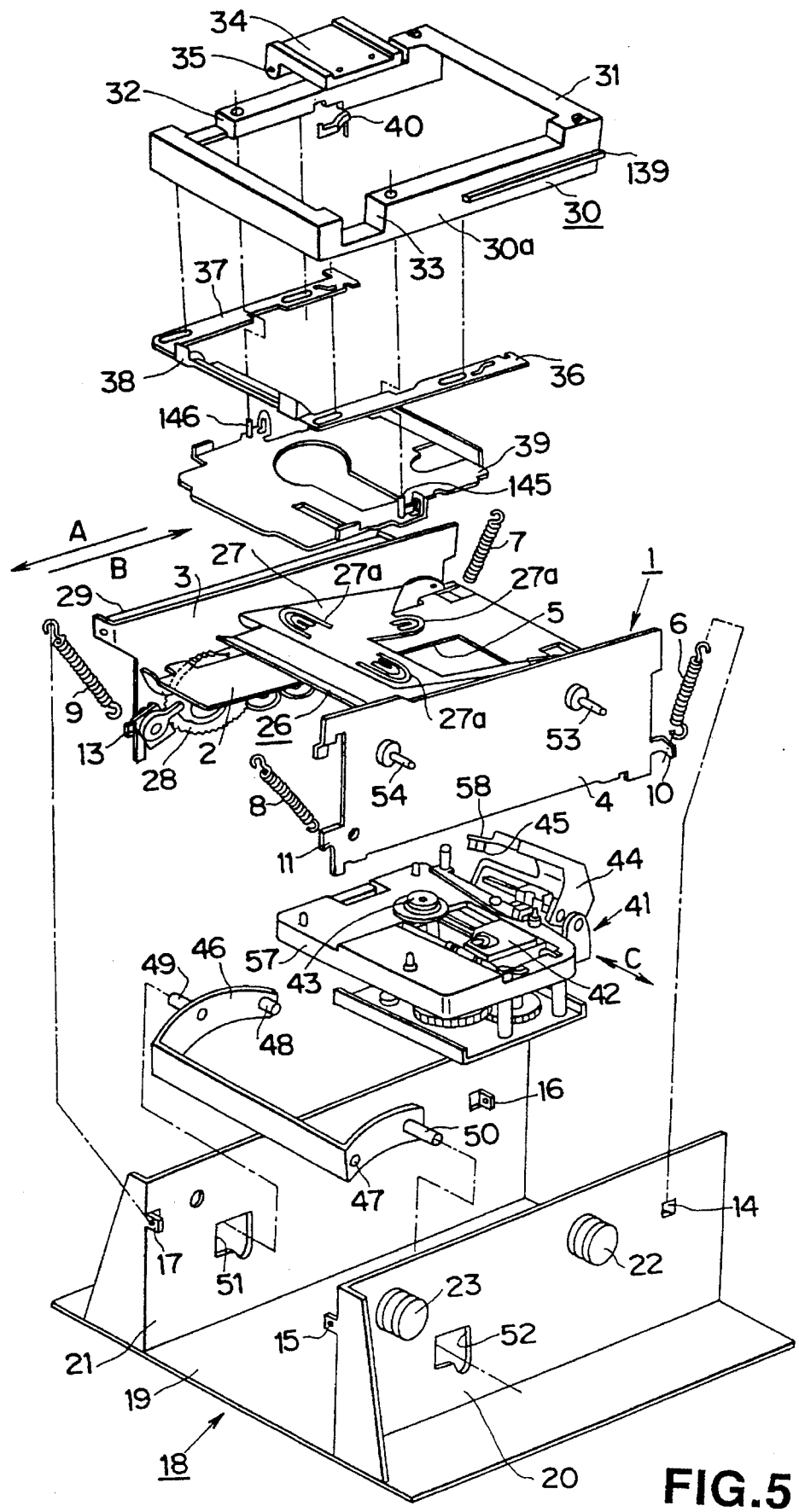
FIG. 5 is a exploded perspective view showing a typical arrangement of the disc recording and/or reproducing apparatus according to the present invention.
Figure 6:
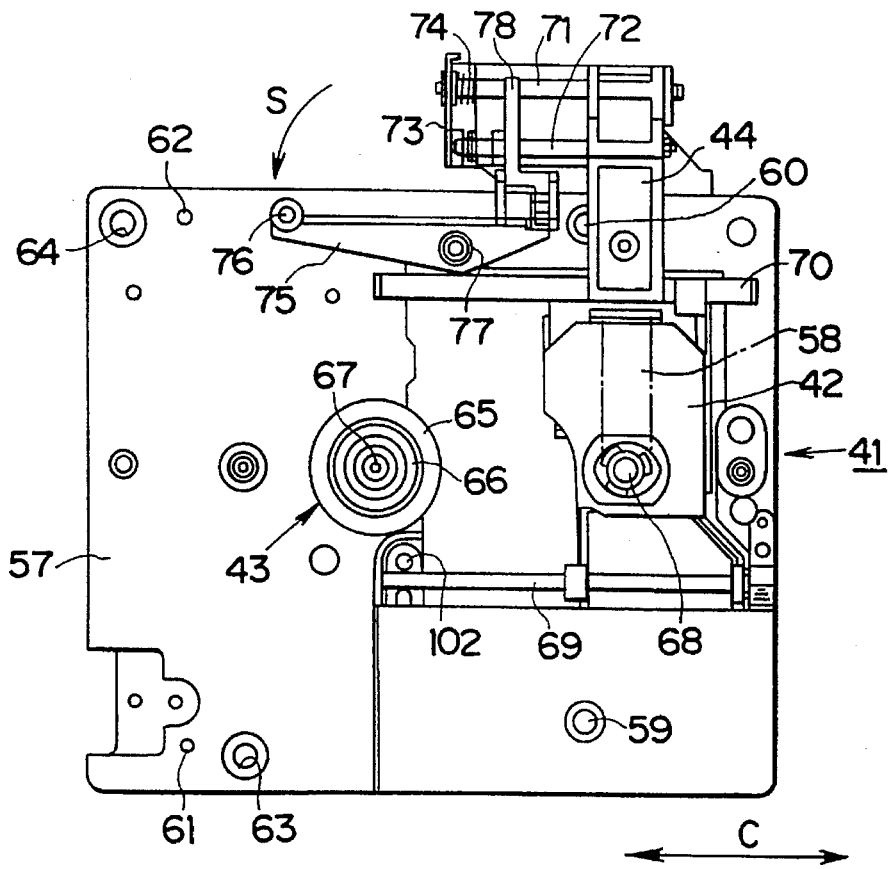
FIG. 6 is a plan view showing an arrangement of a recording/reproducing section of the apparatus shown in FIG. 5.

As shown in FIG. 5, the disc recording and/or reproducing apparatus according to the present invention has a disc cartridge loading unit having a chassis 1. The chassis 1 is formed of a metallic material and made up of a chassis bottom section 2 and left and right side plate sections 3, 4 extending on both sides of and substantially at right angles to the chassis bottom section 2. On the bottom section 2 of the chassis 1, there is fixedly mounted a recording/reproducing section 41 for recording/reproducing the information signals on or from the overwrite type disc 205 or reproducing the information signals from the reproduce-only disc 214. The recording/reproducing section 41 has a base plate section 57 mounted on the chassis base plate section 2, as shown in FIG. 6. The base plate section 57 has its upper surface exposed via a cut-out 5 in the chassis bottom section 2 substantally in its entirety to a space above the bottom plate section 2. A spindle motor for running the discs 205 or 214 in rotation is mounted at a mid part of the base plate section 57. The spindle motor has its driving shaft 67 extended above the upper surface of the base plate section 57. A disc table 43 for setting the disc 105 thereon is mounted on the distal end of the driving shaft 67. The disc table 43 is substantially disk-shaped and has a center aperture engaged by the driving shaft 67 so that the disc table is supported in unison with the driving shaft. A substantially frusto-conical centering section 66 is provided at a mid part of the upper surface of the disc table 43. The rim part of the centering section 66 functions as a disc setting section 66. The centering section 66 has an outside diameter capable of being engaged in a through-hole 217 of the chucked part of the recording/reproducing disc 205 or the reproduce-only disc 214. When the disc 205 or 214 has its positioning reference section 223 placed on the disc setting section 65, the centering section 66 has its outer peripheral portion slidingly abutted on thee inner peripheral surface of the through-hole 217 for centering the discs 205, 214 with respect to the discs 205, 214.

A magnet for attracting the metallic plate 216 of the chucked part of the disc 205 of 214 is provide on the disc table 43. The disc 205 or 214 is positioned and maintained by the magnet with respect to the disc table 43.

On the base plate section 57 are mounted pal red fore and aft positioning pins 59, 60 which are tapered towards the distal ends and present a spindle shape. These positioning pins 59, 60 are engaged in positioning apertures 220 and 221 provided in the recording/reproducing type disc cartridge 201 and reproduce-only disc cartridge 211, respectively, for positioning the disc cartridges 202, 212 with respect to the base plate section 57.

On the base plate section 57 are provided paired fore and aft positioning protuberances 61, 62. These positioning protuberances 61, 62 are caused to bear against the bottom surfaces of the disc cartridges 201, 202 loaded on the base plate section 57 for setting the height positions of the disc cartridges 202, 212 with respect to the base plate section 57.

On the base plate section 57 of the recording/reproducing section 41 is mounted the optical pickup unit 42 for movement towards and away from the disc table 43, as shown by arrow C in FIGS. 5 and 6.

The optical pickup unit 42 has an optical block 42 within which a light source, such as a laser diode, an optical device for guiding the light beam from the light source, a photodetector for receiving the light beam reflected from the recording/reproducing disc 205 or the read-only disc 214 are mounted and which is provided with an object lens driving unit, not shown. The light beam emanated from the light source is transmitted through the optical block so as to fall on an object lens 68 supported by an object lens driving unit. The object lens 68 converges the incident light beam on the signal recording surface of the disc 205 or 214. The object lens driving unit caused the object lens 68 to be moved in two perpendicular directions, that is in a direction along the optical axis of the object lens and in a direction normal thereto.

The optical pickup unit 42 has the object lens driving device facing towards a space above the base plate section 57. The object lens 68 has its optical axis perpendicular to the base plate section 57, that is to the chassis bottom section 2.

Figure 7:
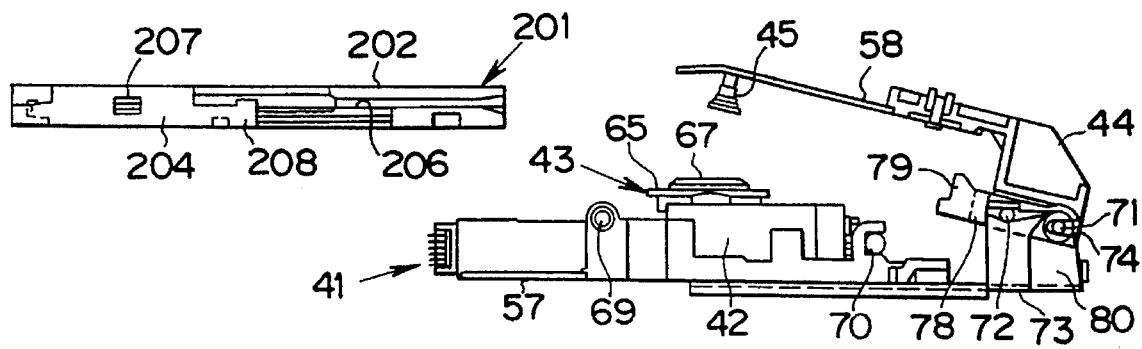
FIG. 7 is a side view showing the recording/reproducing section shown in FIG. 5 and an arrangement of a disc cartridge loaded thereon.
Figure 8:
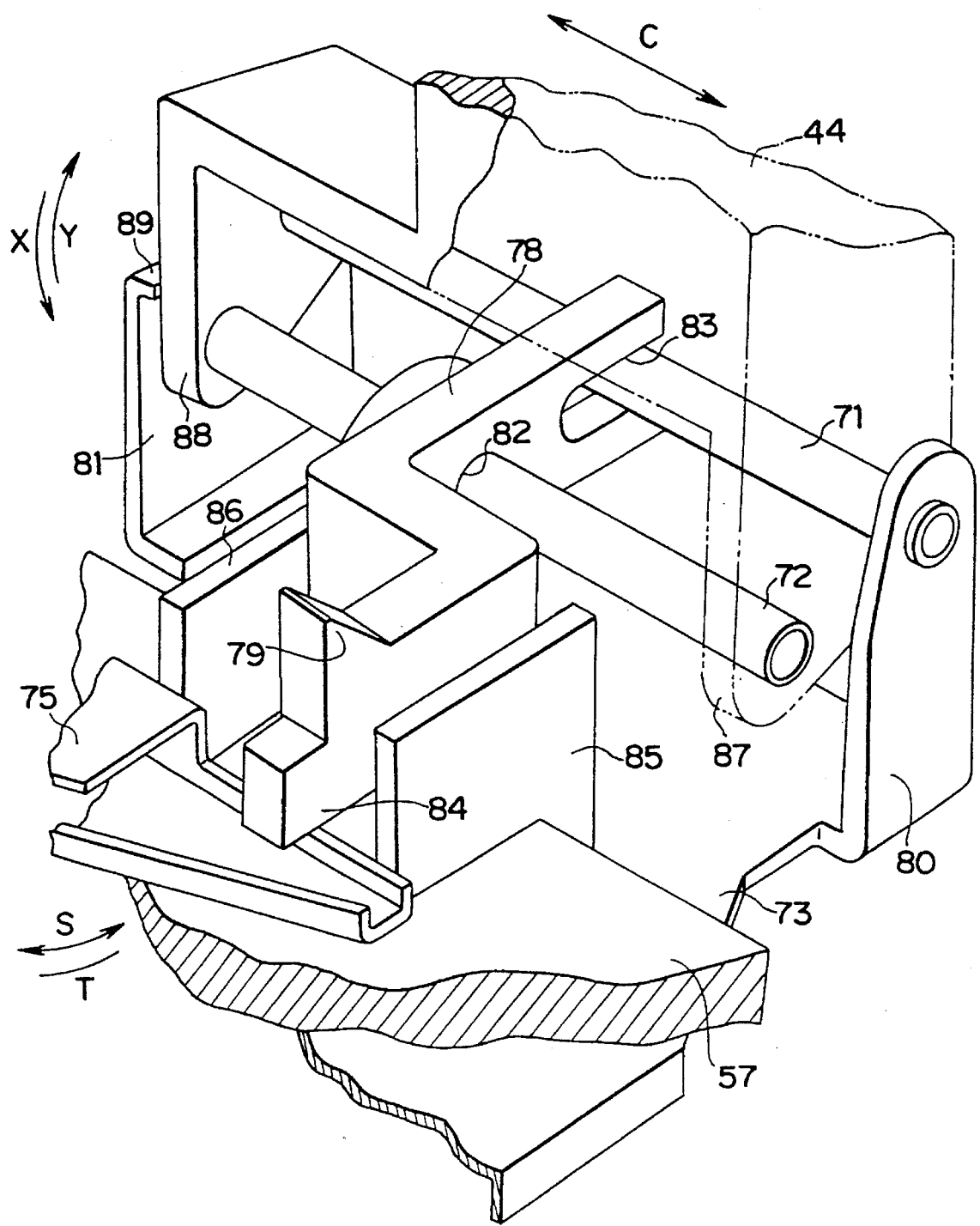
FIG. 8 is an enlarged perspective view showing essential portions of the magnetic head supporting arm of the apparatus shown in FIG. 5, with portions thereof being broken way.

To the optical pickup unit 42 is mounted the magnetic head 45 via a connecting arm 73. As shown in FIGS. 7 and 8, the connecting arm 73 has its proximal end mounted on the optical block of the optical pickup unit 42 and has a pair of upstanding bent portions 80, 81 at the distal end thereof for supporting a magnetic head supporting arm 44 functioning as a magnetic head supporting member. These bent portions 80, 81 are bent upwards from both lateral sides of the connecting arm 73 for facing in a parallel relation to each other. The magnetic head supporting arm 44 has its proximal side spanning the bent portions 80, 81 and is supported for rotation by a pivot shaft 71 mounted on the connecting arm 73 for extending from the rear side towards the front side of the base plate section 57 as indicated by an arrow C in FIG. 6. The magnetic head supporting arm 44 is rotated about the pivot 71 so as to be moved in a direction towards and away from the base plate section 57.

On the proximal side of the magnetic head supporting arm 44 are mounted a pair of projecting tabs 87, 88 within the inside of the upstanding bent portions 80, 81. A rotation limiting shaft 72 is mounted for bridging the tabs 87, 88 for functioning as a rotating limiter. The rotation controlling shaft 72 is parallel to the pivot 71. The shaft 72 has its one end passed through the tab 88 towards one of the upstanding bent portions 81. A position limiting piece 89 formed by bending a part of the upstanding bent portion 81 is provided at the upper end of the upstanding bent portion 81 for extending inwards in the direction of the magnetic head supporting arm 44. When the magnetic head supporting arm 44 causes the magnetic head 45 to be rotated in a direction away from the base plate section 57, the one end of shaft 72 is caused to bear against the position limiting piece 89. That is, the magnetic head supporting arm 44 is not rotated in the direction of displacing the magnetic head 45 away from the base section 57 beyond a position at which the one end of the rotating controlling shaft 71 is caused to bear against the position limiting piece 89.

Figure 9:
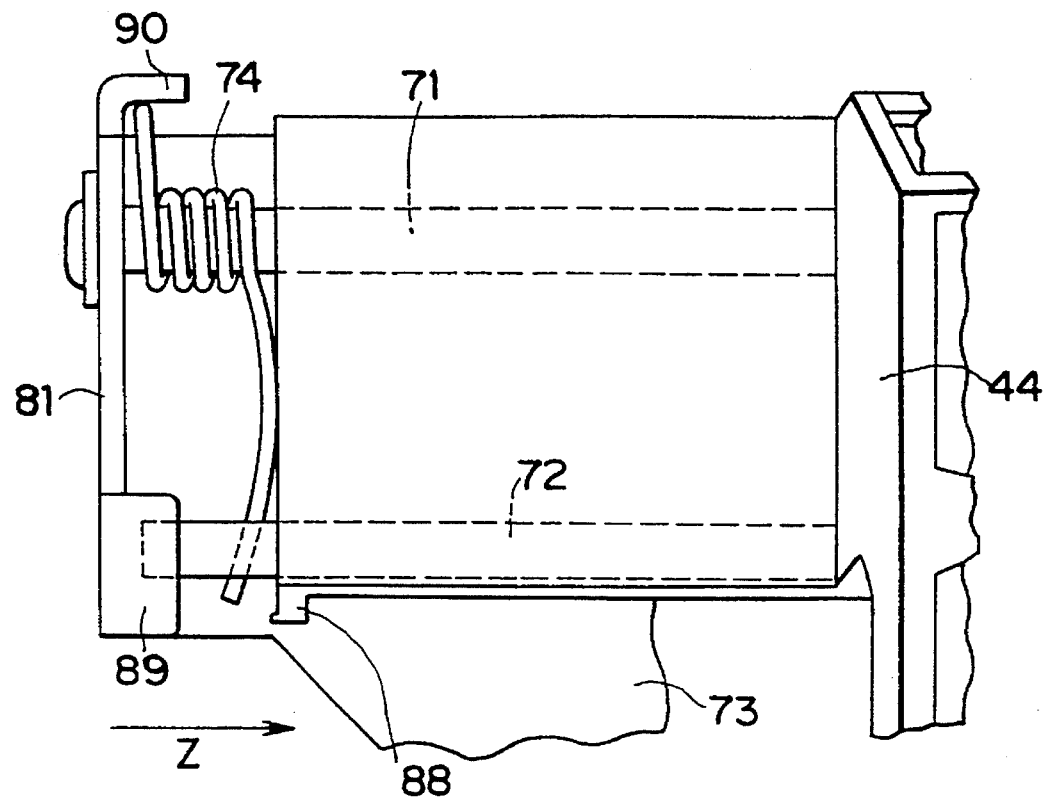
FIG. 9 is an enlarged plan view showing essential portions of the magnetic head supporting arm, with portions thereof being broken away.
Figure 10:
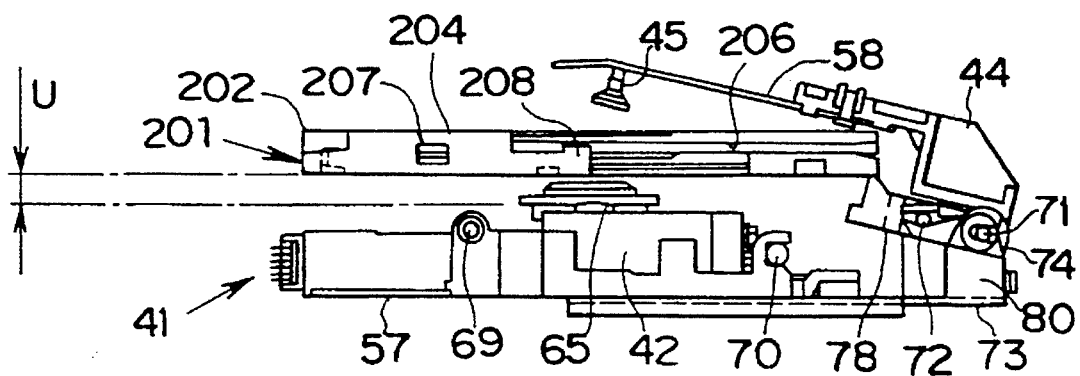
FIG. 10 is a side view showing the disc cartridge being loaded on the recording/reproducing section shown in FIG. 5.

A torsion coil spring 74 acting as a resilient member is fitted on one end of the pivot 71, as shown in FIG. 9. The pivot 71 is interposed between the upstanding bent portion 81 and the magnetic head supporting arm 44. The torsion coil spring 74 biases the magnetic head supporting arm 44 in the direction shown by arrow Z in FIG. 9. That is, the coil spring causes the arm 44 to be thrust against the upstanding bent portion 80. That is, the upstanding bent portion 80 acts as a positioning member functioning as a reference for magnetic head supporting arm 44 along the axial position of the pivot 71. The torsion coil spring 74 has its arm retained by a spring retainer 91 formed by partially bending the upstanding bent portion 81 and has its other arm retained by one end of the rotation limiting shaft 72 for rotationally biasing the magnetic head supporting arm 44 in a direction away from the object lens 68. Therefore, in an initial state in which the disc cartridge 201 or 214 is not loaded in position, the magnetic head supporting arm 44 causes one end of the rotation limiting shaft 72 to be abutted against the position limiting piece 89 for maintaining the magnetic head 45 at an initial position at which the magnetic head 45 is spaced apart from the object ,lens 68, as shown in FIGS. 7 and 10.

A disc type detecting arm 78 has its mid part mounted on the rotation limiting shaft 72. The rotation limiting shaft 72 is passed through a through-hole 82 formed halfway so that the arm 78 may be rotated about and slid along shaft 72. An engaging cut-out 83 to be engaged by the supporting shaft 71 is formed at a rear end of the disc type detecting arm 78. The pivot 71 is passed in and engaged with the cut-out 83. In this manner, the detection arm 78 may be rotated about and slid along the pivot 71. Consequently, the disc type detecting arm 78, thus supported by the pivot 71 and the rotation limiting shaft 72, is limited in its rotational movement about pivot 71 with respect to the magnetic head supporting arm 44.

At a forward end of the disc type detecting arm 78, there is provided an abutment projection 79 for extending upwards in FIG. 8 and a mating engaging projection 84 for extending towards the front side.

On the base plate section 57, there is provided a pair of movement limiting pieces 85, 86 acting as movement limiters. These movement limiting pieces 85, 86 are formed for holding the forward portion of the disc type detecting arm 78 from both sides. These limiting pieces 85, 86 inhibit axial movement of the disc type detecting arm 78 with respect to the base plate section 57 along the axis of the pivot 71.

On the base plate section 57 is mounted an abutment arm 75 acting as an abutment member, as shown in FIGS. 6 and 8. The abutment arm 75 has its mid part rotatably supported by a pivot 77 with respect to the rear part of the base plate section 57. The abutment arm 75 has a cartridge abutment pin 76 on its upper surface at its one end. The abutment arm 75 has its cartridge abutment pin 76 rotationally biased by a coil spring or the like biasing member, as shown by arrow S in FIG. 6, in a direction of shifting the cartridge abutting pin 76 towards the front side, and is set in this manner in its initial position. At this time, the other end of the abutment arm 75 is situated below the mating engaging projection 84 of the disc type detection arm 78, that is between the projection 84 and the-base block section 57. In this state, the magnetic head supporting arm 44 is inhibited in its rotation of approaching the magnetic head 44 towards the base plate section 57 from the initial position via the disc type detection arm 78.

Figure 11:
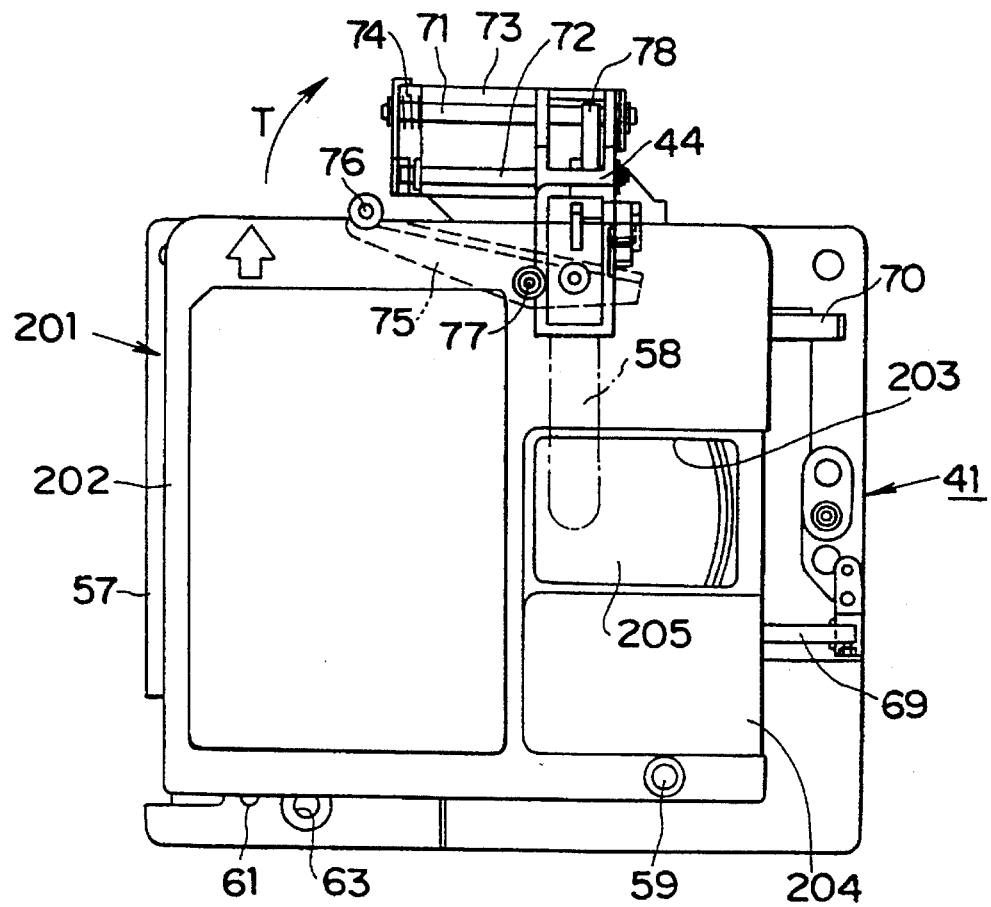
FIG. 11 is a plan view showing the state in which the disc cartridge is loaded on the recording/reproducing section shown in FIG. 5.

When the disc cartridge 201 or 211 is loaded on the base plate section 57, the cartridge abutting pin 76 is caused to bear against the forward end of the disc cartridge 201 or 211 so as to be shifted towards rear for rotating the abutment arm 75 as shown by arrow T in FIG. 11. The other end of the abutment arm is moved at this time more forwards than the lower end of the mating engaging projection 84 to release the limitation on rotation of the disc type detection arm 78.

Figure 12:
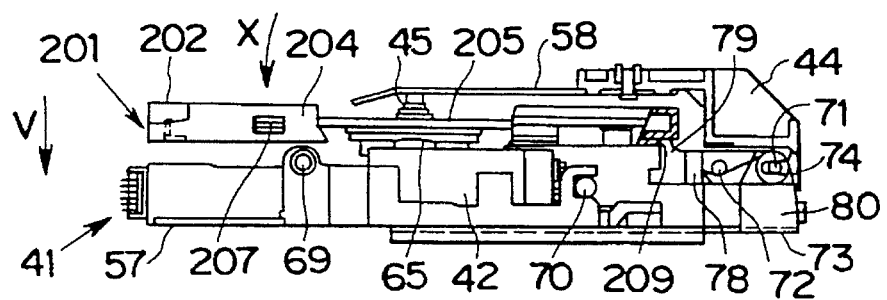
FIG. 12 is a side view showing the state in which the recordable disc is loaded on the recording/reproducing section.
Figure 13:
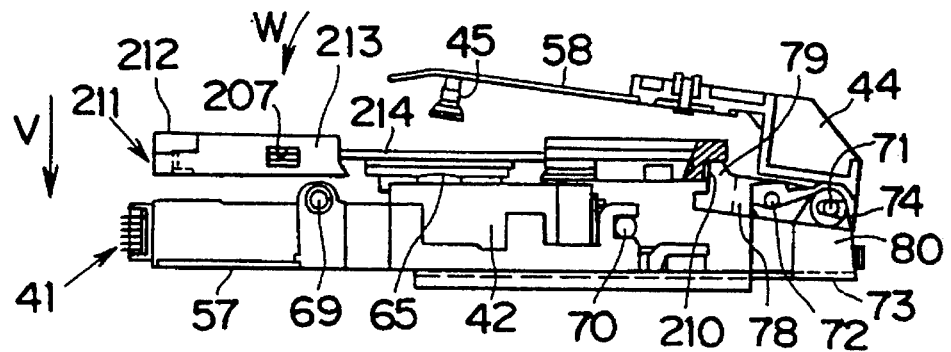
FIG. 13 is a side view showing the state in which the reproduce-only disc is loaded on the recording/reproducing section.

When the recording/reproducing type disc cartridge 201 is loaded on the base block section 57, the magnetic head supporting arm 44 has its abutment projection 79 thrust by the bottom of the index portion for the overwrite type disc 209 and thereby rotated about the pivot 71, so that, as shown in FIG. 12, the magnetic head supporting arm 44 is brought to a first position in which the magnetic head 45 is slidingly contacted with the overwrite type disc 205. When the reproduce-only type disc cartridge 211 is loaded on the base block section 57, the magnetic head supporting arm 44 has its abutment projection 79 thrust by the bottom of the index portion for the reproduce-only type disc 209 and is thereby rotated about the pivot 71, so that, as shown in FIG. 13, the magnetic head supporting arm 44 is at a second position in which the magnetic head 45 is moved slightly more than the initial position towards the reproduce-only type disc 214 but in which the magnetic head 45 is spaced apart from the reproduce-only cartridge main body 212.

On the chassis .bottom section 2 is mounted a cartridge holder 26, into which one of the recording/reproducing type disc cartridge 201 or the reproduce-only disc cartridge 211 is introduced from the forward side and held, is mounted, as shown in FIG. 5. The cartridge holder 26 is supported by a cartridge retention plate 27. The cartridge retention plate 27 is formed of a metallic plate so as to have a planar major surface section substantially equal in size and shape to the major surface of the disc cartridge 201 or 211, and a sidewall section depending from both lateral sides of the major surface section. The cartridge retention plate 27 is provided on the chassis base section 2 and is mounted for being moved towards and away from the chassis bottom section 2 by having the rear portion of the sidewall portion rotatably supported with respect to the chassis bottom section 2. A plurality of spring plate sections 27a for thrusting and supporting the cartridge main body 202 or the cartridge main body 212 towards the chassis bottom section 2 are formed by segmenting part of the cartridge retention plate 27.

The cartridge holder 26 is a casing substantially corresponding in size to each of the cartridge main bodies 202, 212 and partially opened in upper and lower surface sections and at a front side to permit the cartridge main body 202 or the cartridge main body 212 to be introduced into the cartridge holder from its front side. The cartridge holder 26 is provided on the lower surface of the cartridge retention plate 27 for extending substantially therealong and has its rear sides rotatably supported at a mid part of the cartridge retention plate 27. That is, the cartridge holder 26 is movable towards and away from the cartridge retention plate 27 and is clamped between the cartridge retention plate 27 and the chassis bottom section 2 when the cartridge retention pate 27 is turned towards the chassis bottom section 2.

When the disc cartridge 201 or 211 is introduced into the cartridge holder 26 from its front side, which is the introducing side, the shutter opening piece provided within the cartridge holder 26 is intruded into the shutter opening groove 206. When the disc cartridge 201 or 211 thus introduced is caused to bear against the forward end of a shutter supporting lug 208, a shutter closure piece provided in the cartridge holder 26 is engaged with a shutter closure opening 207. As the disc cartridge 201 or 211 is further introduced into the inside of the cartridge holder 26, since the shutter member 204 or 213 is halted at a position at which the forward end of the shutter supporting lug 208 is caused to bear against the shutter opening piece, the cartridge holder 204 or 214 is moved relative to the cartridge main body 202, 212 for opening the apertures 203, 215.

A disc tray 30 is provided above the chassis bottom section 2. The disc tray 30 is made up of a cartridge rest 39 on which the disc cartridge 201 or 211 is set and a frame section 30a for vertically movably supporting the cartridge rest 39. The cartridge rest 39 is of a shape and size substantially corresponding to the major surface of the disc cartridge 201 or 211 and is formed by a thin metallic plate. The cartridge rest 39 has plural apertures, each having the role of exposing aperture 215 of the disc cartridge 201 or 211 for the optical pickup unit, chucking aperture 219, positioning hole 220 and the indexing portions 209, 210 to the lower side of the cartridge rest 39 when the disc cartridge 201 or 211 is set on the cartridge ret 39.

The frame section 30a is formed of a synthetic resin as a U-shaped member comprised of a straight section at a front side of the cartridge rest 39 and straight sections on both lateral sides of the cartridge rest 39. That is, the frame section 30a is opened at the rear side. The frame section 30a has a length in the fore-and-aft direction substantially twice that of the major surfaces of the disc cartridge 201 or 211. The rear ends of the straight sections on both lateral sides of the frame section 30a are connected to each other by a connecting plate 31 in the form of a thin metallic plate attached to the upper surface of the frame section 30a.

The cartridge rest 39 is supported for vertical movement by the frame section 30a. On both lateral sides of the cartridge rest 39 are mounted a pair of supporting pins 145, 146 introduced from the lower side into a pair of supporting openings formed on both lateral sides of the frame section 30a. The cartridge rest 39 may be moved vertically with the supporting pins 145, 146 being moved along the supporting openings. The cartridge rest 39 has its forward edge positioned in the vicinity of te forward straight section of the frame section 30a. The cartridge rest 39 is biased upwardly in FIG. 5 by a spring, not shown, provided in the frame section 30a.

For facilitating the setting and detachment of the disc cartridge 201 or 211 on or from the cartridge rest 39, the frame section 30a is provided with a pair of cut-outs 32, 33 facing both lateral sides of the disc cartridge 201 or 211 for exposing part of both lateral sides of the disc cartridge 201 or 211 to outside.

The disc tray 30 is provided on the chassis bottom section 2 so as to be moved between a position of positioning the disc cartridge 201 or 211 set on the cartridge rest 39 on top of the recording/reproducing section 41 and a position of loading and unloading the disc cartridge 201 or 211. That is, a guide member 34 mounted on one of the lateral sides of the frame member 30a. The guide member 34, formed of synthetic resin, has a shaft inserting through-hole 35, and is mounted on the frame section 30a so as to be protruded outwards from its lateral side. A guide shaft 29 mounted on the left side plate section 3 is introduced into the through-hole 35. The guide shaft 29 is mounted on the left side plate section 3 of the chassis 1 for being extended in the fore-and-aft direction by having its forward side supported by an outwardly bent forward portion of the left side plate section 3 and by having its rear side supported by a similar outwardly bent rear portion of the left side plate section 3. A guide rib 139 is provided on the opposite lateral side of the frame section 30a for being extended in the fore-and-aft direction. The guide rib 139 is supported for sliding movement by the upper side of the right side plate section 2 of the chassis 1. The disc tray 30 may be slid in the fore-and-aft direction along guide shaft 29 and guide rib 139.

When moved rearwards as shown by arrow B in FIG. 5, the disc tray 30 sets the cartridge rest 39 to a loading position overlying the recording/reproducing position and, when moved forwards as shown by arrow A in FIG. 5, the disc tray 30 sets the cartridge rest 39 to a forwardly protruded position or an unloading position enabling the disc cartridge 201 or 211 to be loaded or unloaded on or from the cartridge rest 39.

The disc tray 30 is moved by a cam gear 28 rotationally driven by a loading motor mounted on the left side plate section 3 of the chassis 1. The cam gear 28 has an outer peripheral gear formed on its outer periphery and also has a first cam groove formed on one of its major surfaces. The outer peripheral gear interrupted, that is devoid of teeth over an angular extent of 90°, that is over an angular extent substantially one-half the entire extent of the outer peripheral gear.

On the bottom of the frame section 30a is formed a rack gear meshing with that one half portion of the entire extent of the outer peripheral gear which is devoid of the gear teeth. That is, when the cam gear 28 is rotated, the frame section 30a is moved within a range of rotation of the cam gear 28, that is over an extent in which the outer peripheral gear is engaged with the rack gear. The frame section 30a is not moved within the range of rotation through 90° of the cam gear 28, that is within the range in which the interrupted portion is facing the rack gear.

The cam gear 28 not only causes the disc tray 30 but also the cartridge retention plate 27 to be moved. Such movement of the cartridge retention plate 27 by the cam gear 28 is incurred by rotation through an angular range of substantially 90° in which the interrupted portion faces the rack gear of the frame section 30a.

That is, the cartridge retention plate 27 is engaged with a first cam groove via a follower arm, not shown. That is, when the cam gear 28 is rotated, the cartridge retention plate 27 is rotated relative to the chassis bottom section 2.

Meanwhile, the chassis 1 is floatingly supported with respect to a supporting base plate 18 fixedly mounted in an outer casing of the disc recording and/or reproducing apparatus. The chassis 1 is carried by the supporting substrate 18 via four tension coil springs 6, 7, 8 and 9 and four dampers 22, 23, 24 and 25 for precluding the effect of disturbances occasionally applied to the outer casing. These dampers 22 to 25 are each comprised of a pouch-shaped member of an elastic material, such as rubber, and a highly viscous liquid sealed therein.

When loading the disc cartridge 201 for recording/reproduction or the reproduce-only disc cartridge 211 in the above-described recording and/or reproducing apparatus, the disc tray 30 is brought to an unloading position. The cartridge retention plate 27 is held at this time at a position spaced apart from the chassis bottom section 2. In this state, the disc cartridge 201 or 211 is set on the cartridge rest 39.

When the loading motor is run into rotation for rotating the cam gear 28, disc tray 30 is moved rearwards as indicated by arrow B in FIG. 5. When the disc tray 30 is moved further rearwards, the disc cartridge 201 or 211 is introduced from the front side. In the disc cartridge 201, 211, the shutter member 204 or 213 is moved by the shutter opening piece with respect to the cartridge main body 202 or 212 for opening the aperture 215 for the optical pickup unit or both the aperture 203 for the magnetic head or the aperture 215 for the optical pickup unit. The shutter closure piece is intruded at this time into the shutter closure opening. The magnetic head supporting arm 44 is maintained at this time at an initial position of holding the magnetic head device 45 at a raised position, as shown in FIGS. 7 and 9.

When the disc tray 30 is moved further as far as the loading position, the gear of the disc tray is faced by the interrupted portion so that the rack gear is halted despite continued rotation of the cam gear 28. At this time, the disc cartridge 201 or 211 introduced into the cartridge holder 36 is transported as far as a position overlying the recording/reproducing section 41, as shown in FIG. 10. The distance of the order of 4 mm is maintained at this time between the bottom of the disc cartridge 201 or 211 and the disc table 43, as indicated by arrow U in FIG. 10.

When the cam gear 28 is rotated further, the cartridge retention plate 27 is rotated to approach to the chassis bottom section 2. The disc cartridge 201 or 211 is set and loaded on the base plate section 57 of the recording/reproducing section 41 to complete the loading operation, as shown in FIGS. 12 and 13. The disc cartridge 201 or 211, thus introduced, is biased by the spring plates 27a of the cartridge retention plate 27 towards the base plate section 57. The cartridge main body 202 or 212 is positioned at the cartridge loading position on the base plate section 57 by the positioning pins 59, 60 and the positioning protuberances 61, 62.

When the recording/reproducing disc cartridge 201 is loaded, the magnetic head supporting arm 44 is at a second position in which the magnetic head 45 is spaced apart from the disc, as shown in FIG. 12. On the other hand, when the reproduce-only disc cartridge 211 is loaded, the magnetic head supporting arm 44 is at a first position in which the magnetic head 45 is close to he disc, as shown in FIG. 13. The disc 205 or 214 is loaded in position on the disc table 43. The disc 205 or 214 at this time may be rotated in unison with the rotation of the spindle motor.

The optical pickup unit 42 at this time has its object lens 68 facing the opposite major surface of the recording/reproducing disc 205 or the reproduce-only disc 214. The optical pickup device 42 is moved across the inner and outer peripheries of the disc 205 or 214, with the object lens 68 facing the disc 205 or 214, for radiating the light beam on the disc 205 or 214. When the optical pickup device 42 is moved radially across the inner and outer peripheries of the disc 205 or 214, the disc type detection arm 78 remains stationary because it is prohibited from performing a movement along the axis of the pivot 71 by the movement limiting pieces 85, 86. The pivot 71 and the rotation limiting shaft 72 are moved at this time along with the magnetic head supporting arm 44 while being slid axially with respect to the disc type detection arm 78.

The information signals may be recorded on the recording/reproducing disc 205 by the driving of the optical pickup unit 42 and the magnetic head device 45. That is, the information signals may be recorded by the light beam being converged by the optical pickup device 42 on the signal recording layer of the recording/reproducing disc 205 for heating the irradiated region and by an external magnetic field being applied to the heated region by the magnetic head device 45, while the recording/reproducing disc 205 is kept in rotation. The information signals may also be reproduced from the reproduce-only disc 214. That is, the information signals are reproduced by the light beam being converged by the optical pickup device 42 and radiated on the reflective layer and by detecting the reflected light beam, with the reproduce-only disc 214 being then kept in rotation.

When the disc cartridge 201 or 211 loaded in the recording/reproducing apparatus is to be taken out of the recording and/or reproducing apparatus, cam gear 28 is rotated in an opposite direction to that for the above-mentioned loading operation in a direction of transporting the disc tray 30 forwards as shown by arrow A in FIG. 5. The cartridge retention plate 27 is rotated in a direction away from the chassis bottom section 2 for moving the cartridge holder 26 to a region above the chassis bottom section 2. The disc cartridge 201 or 211 to be ejected is disengaged from the base plate section 57 of the recording/reproducing section 57 so as to be placed on the cartridge rest 39. The magnetic head supporting arm 44 is reset to an initial position under the bias of the torsion coil spring 74, as shown in FIG. 10.

The cam gear 28 is rotated further for moving the disc tray 30 forwards as shown by arrow A in FIG. 5. The disc cartridge 201 or 211 to be ejected is transported forwards as it is placed on the cartridge rest 39. In the disc cartridge 201 of 211, the shutter member 204 of 213 is closed by the shutter member 204 or 213. As the cam gear 28 is rotated further so that the disc tray 30 reaches the unloading position, the disc cartridge 201 of 211 may be detached from the disc tray 30.

Figure 14:
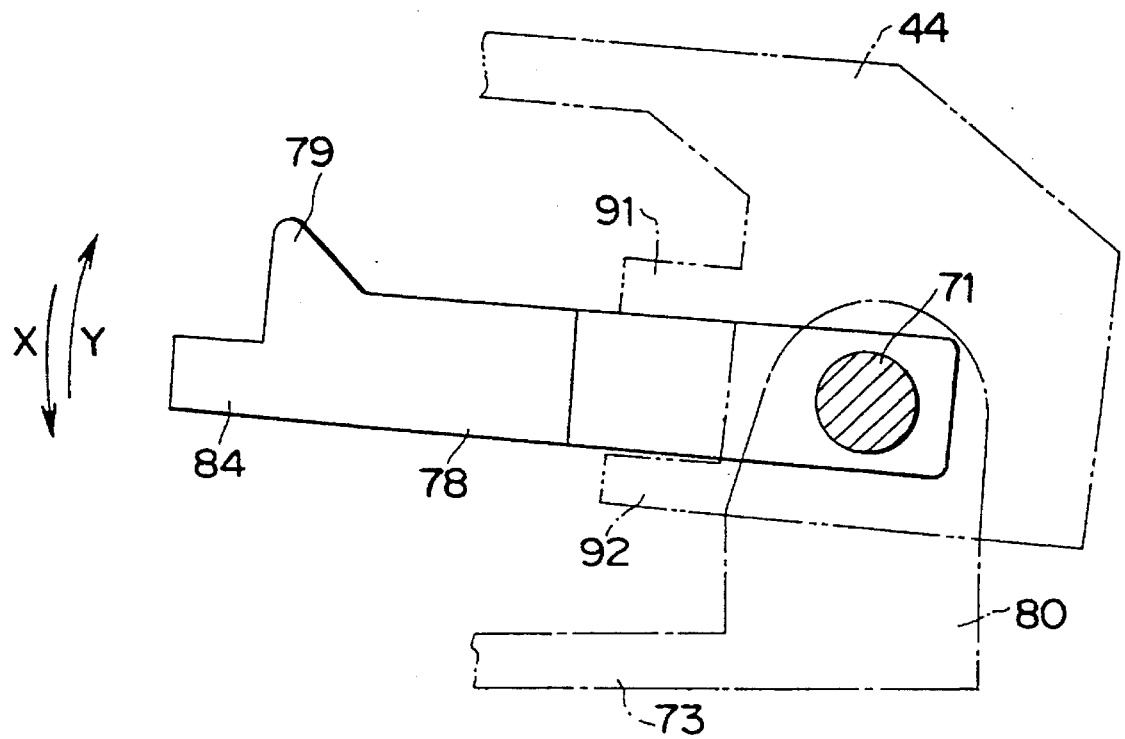
FIG. 14 is an enlarged side view showing a modified arrangement of essential portions of the magnetic head supporting arm.

It is noted that the rotation limiting member for limiting the rotation of the disc type detection arm 78 with respect to the magnetic head supporting arm 44 is not limited to the rotation limiting shaft 72 shown in the above-described embodiments. FIG. 14 shows a second embodiment of the disc recording and/of reproducing apparatus provided with a modified rotation limiting member. The rotation limiting member applied to the disc recording and/or reproducing apparatus is made up of a pair of rotation limiting pieces 91, 92 protruded from the magnetic head supporting arm 45 on both sides of the disc type detection arm 78. With the present embodiment, when the disc type detection arm 78 is rotated about the pivot 71 in a direction as shown by arrow X or Y in FIG. 14, the relative rotation between the disc type detection arm 78 and the magnetic head supporting arm 44 is inhibited by the rotation limiting pieces 91, 92, the magnetic head supporting arm 44 being rotated to follow the disc type detection arm 78.

A disc recording and/or reproducing apparatus according to a third embodiment of the present invention is hereinafter explained by referring to the drawings.

Figure 15:
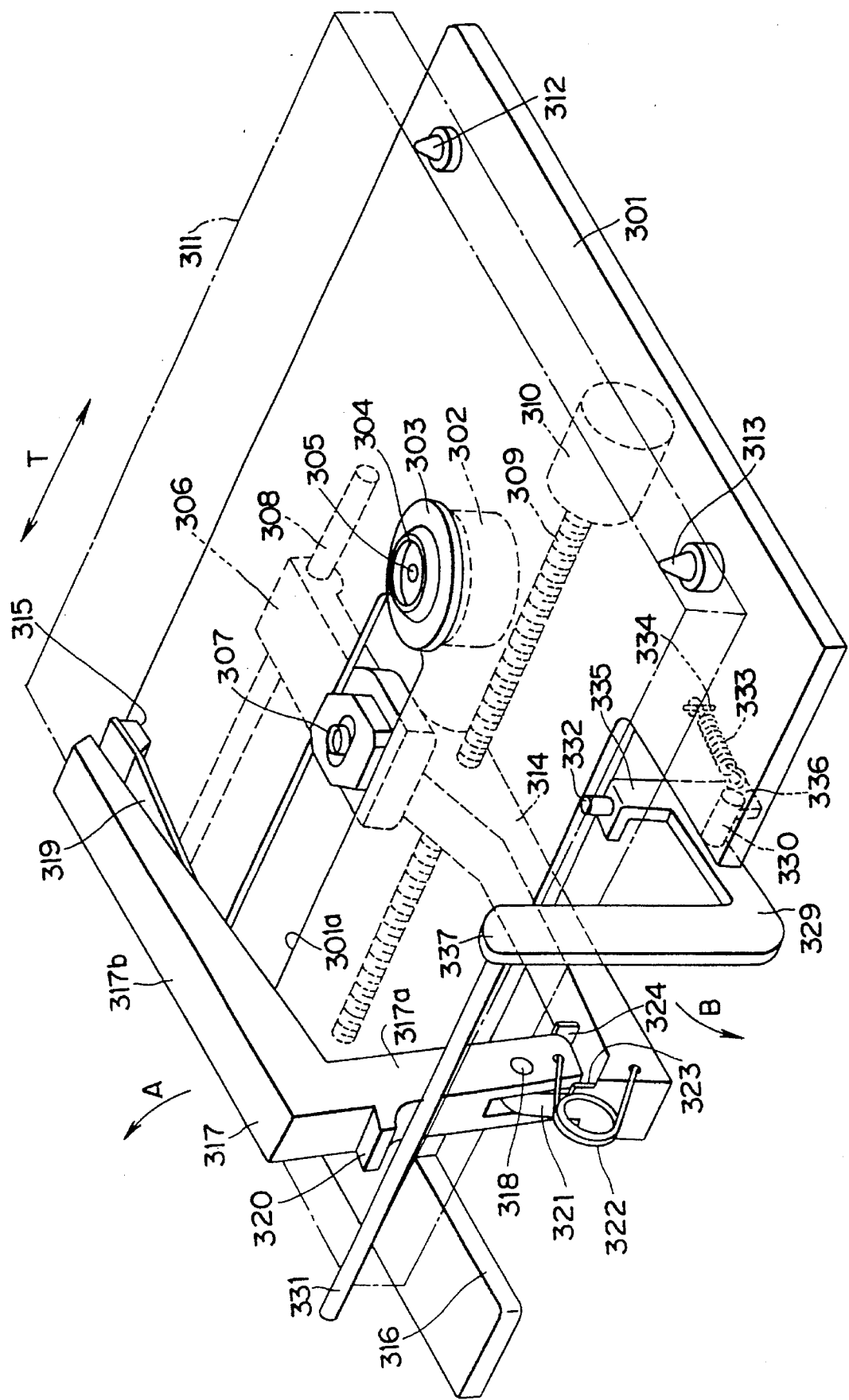
FIG. 15 is a perspective view showing a modified arrangement of the recording/reproducing section of the recording and/or reproducing apparatus according to the present invention.

The disc recording and/or reproducing apparatus is provided with a chassis 301, as shown in FIG. 15. A disc loading section on which the disc is loaded for recording and/or reproduction is provided on the chassis 301. A spindle motor 302 is mounted at a mid portion on the lower surface of the chassis 301. The spindle motor 302 has its driving shaft 305 protruded above the upper surface of the chassis 301 via a through-hole in the chassis. A disc table 303 making up the disc loading section 301 is integrally mounted at the distal end of the driving shaft 305. The disc table 303 is substantially disk-shaped and mounted position by fitting the driving shaft 305 in a supporting through-hole formed at the middle of the disc table. A substantially cortically-shaped centering member 304 is provided on the upper surface of the disc table 303. The centering member 304 is of an outside diameter that may be engaged in a throughhole 217 of a chucked part of the disc 205 or 214 shown in FIGS. 1 or 3, respectively. When the disc 205 or 214 is placed on the disc table 303, the outer peripheral surface of the centering member 304 is slidingly contacted with the inner peripheral surface of the through-hole 217 of the chucked part of the disc 205 or 214 for centering the disc 205 or 214.

A magnet for attracting a metallic plate 216 of the chucked part of the disc 205 or 214 is mounted on the disc table 303. The disc 205 or 214 may be held in position on the disc table 303 by the magnetic attraction exerted by the magnet.

On the chassis 301 are mounted paired forward and rear positioning pins 312, 313. These positioning pins 312, 313 substantially conically shaped and are tapered towards the distal ends. These positioning pins 312, 313 are engaged in positioning holes 220, 221 in the disc cartridge 201 or 211 for positioning the cartridge main body 202 or 212 with respect to the chassis 301.

The optical pickup unit 306 is movably mounted on the chassis 301 in a direction towards and away from the spindle motor 302, as shown by arrow T in FIG. 15.

The optical pickup unit 306 includes an optical block within which a light source 306, such as a laser diode, an optical device for guiding the light beam radiated from the light source, and a photodetector for receiving the light beam reflected from the disc 205 or 214. An object lens driving unit is also mounted on the optical block. With the optical pickup unit 306, the light beam radiated from the light source is transmitted through the optical block so as to be incident on an object lens 307 carried by the object lens driving unit. The object lens 307 converges the incident light beam on the disc 205 or 214. The object lens 307 is driven by the object lens driving unit in two perpendicular directions, that is in a direction along the optical axis of the object lens and in a direction normal thereto.

The optical pickup unit 306 is supported by a guide shaft 306 and a screw shaft 309 supported in parallel to each other on the lower surface of the chassis 301 so as to be moved along the axes of the shafts 306 and 309. The guide shaft 308 is passed through a bearing hole formed in the optical block. The screw shaft 309 is threadedly passed through screw bearing holes formed in the optical block. The screw shaft 309 is rotated about its own axis by a feed motor for the optical pickup unit provided on the lower surface of the chassis 301. When the feed motor 310 is rotated for rotating the screw shaft, the optical pickup unit 306 is moved axially of the screw shaft 309 and the guide shaft 308 as shown by arrow T in FIG. 15.

A magnetic head 315 is mounted via a magnetic head supporting member by the optical pickup unit 306. The magnetic head supporting member is made up of a connecting arm section 314 extended substantially parallel to the chassis 301 and having its proximal end mounted on the optical block of the optical pickup unit 315 and a magnetic head supporting arm 314 rotatably mounted at the distal end of the connection arm section 314. The magnetic head supporting arm 317 is made up of a vertically extending portion 317a having its lower end carried by the connecting arm section 314 and protruded above the chassis 301 via a cut-out 316 provided at a rear part of the chassis 301 and a horizontally extending portion 317b integrally connected to the upper end of the vertically extending portion 317a and extended towards the optical pickup unit 306 substantially parallel to the connecting arm section 314. The proximal end of the magnetic head supporting arm 317, that is the lower end of the vertically extending portion 317a, is rotatably supported via a pivot 318 by a supporting lug 321 formed as one with the distal end of the connecting arm section 314. The magnetic head supporting arm 317 is rotated about the pivot 318 so that its distal end, that is a free end of the horizontally extending portion 317b, may be displaced in a direction towards and away from the chassis 301.

A magnetic head 315 is mounted via a spring plate 319 on the distal end of the magnetic head supporting arm 317 facing the chassis 301. The magnetic head 315 is held at a position of facing the object lens 307. That is, the magnetic head 315 is positioned on the optical axis of the object lens 307 so as to be moved in a direction towards and away from the object lens 307.

When the recording and/or reproducing disc cartridge 201 is loaded, the magnetic head supporting arm 317 is at a first position of causing the magnetic head 315 to be slidingly contacted with the recording/reproducing disc 205 by the rotation of the arm 317 about the axis of pivot 318. Similarly, when the reproduce-only disc cartridge 201 is loaded, the magnetic head supporting arm 317 is at a second position of displacing the magnetic head 315 away from the reproduce-only disc 214 by the rotation of the arm 317 about the axis of pivot 318.

First and second rotation limiting pieces 323, 324 for limiting the range of rotation of the magnetic head supporting arm 317 are protuberantly formed at the distal end of the connecting arm section 314 for extending on both sides of the proximal end of the magnetic head supporting arm 317, as shown in FIG. 15. That is, when the proximal end of the magnetic head supporting arm 317 is caused to bear against the first rotation limiting piece 323 and thereby limited in its rotation, the magnetic head supporting arm 317 is at the above-mentioned first position in which the arm is slidingly contacted with the disc 205. On the other hand, when the proximal end of the magnetic head supporting arm 317 is caused to bear against the second rotation limiting piece 324 and thereby limited in its rotation, the magnetic head supporting arm 317 is at the above-mentioned second position in which the arm is moved away from the disc 205.

A torsion coil spring 322 is mounted between a part of the magnetic head supporting arm 317 closer than the pivot, 318 to the proximal end of the arm 317 and the distal end of the connecting arm 314. That is, the torsion coil spring 322 has one of its arms retained by the distal end of the magnetic head supporting arm 317 and its other arm by the distal end of the connecting arm 314. The torsion coil spring 322 biases the magnetic head supporting arm 317 in a direction away from a neutral position intermediate between the first position in which the magnetic head supporting arm 317 is in sliding contact with the reproduce-only disc 205 and the second position in which the magnetic head supporting arm is spaced apart from the disc 205. The neutral position means a position in which the point of retention of the one arm of the torsion coil spring 322, the point of retention of the other arm of the spring 322 and the pivot 318 are on a straight line. With the magnetic head supporting arm 317 in this neutral position, the direction of the force of bias is through the axis of pivot 318 so that no force of rotating the magnetic head supporting arm 317 is generated.

Figure 17:
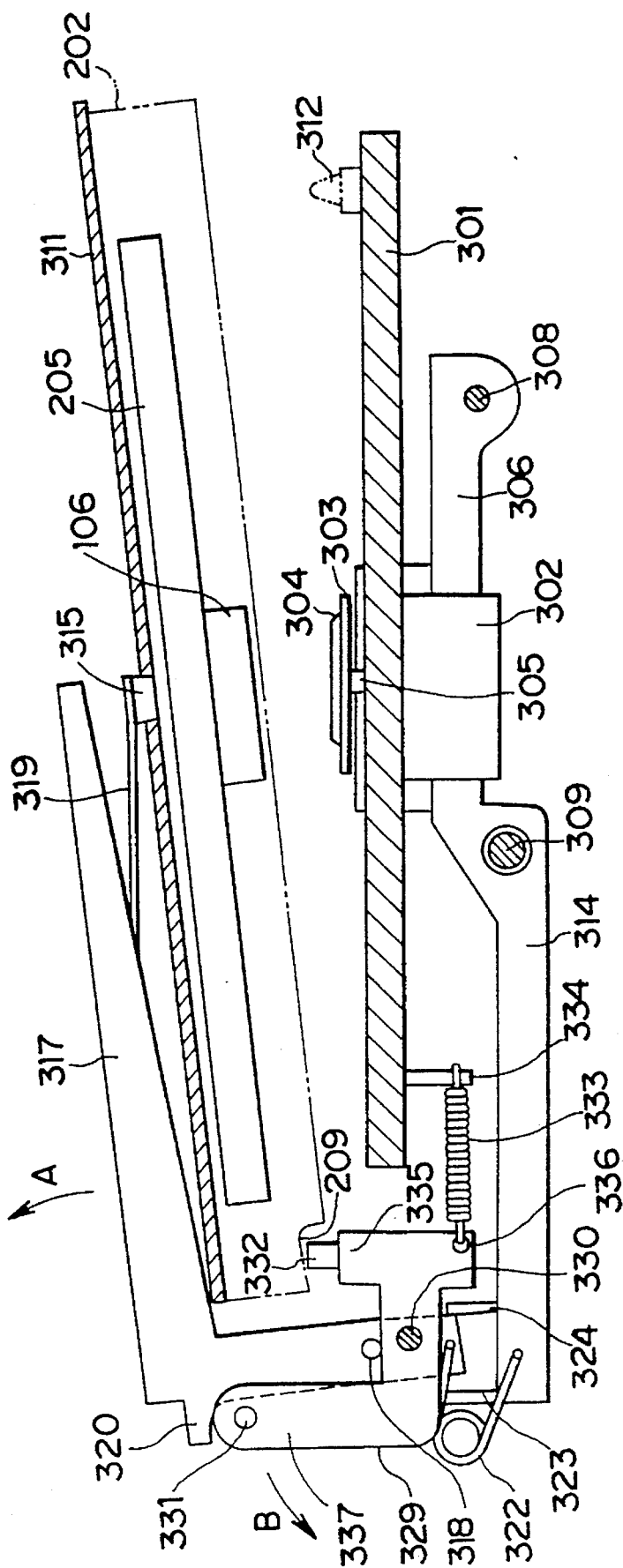
FIG. 17 is a side view showing the state in which the disc cartridge is being loaded on the recording/reproducing apparatus shown in FIG. 15, with portions being broken away.

In the initial state in which the disc cartridge 201 or 211 is not loaded, the cartridge holder 311 is turned-upwards as shown in FIG. 17, so that, even although the magnetic head supporting arm 317 is at the aforementioned neutral position, the cartridge holder 311 is caused to bear against a part of the magnetic head supporting arm 317 for placing the magnetic head supporting arm 317 towards the second position in which the arm 317 is spaced apart from the disc 205 or 211. The torsion coil spring 322 biases the proximal end of the magnetic head supporting arm 317 for rotationally biasing the magnetic head supporting arm in a direction of separating the magnetic head 315 from the object lens 307 as shown by arrow A in FIG. 17. The magnetic head supporting arm 317 is maintained at this time at the aforementioned second position. When the magnetic head supporting arm 317 is rotated beyond the neutral position towards the aforementioned fi rat position, the torsion coil spring 322 thrusts the proximal end of the magnetic head supporting arm 317 for biasing it towards the first position in which the magnetic head supporting arm 317 is slidingly contacted with the reproduce-only disc 205 or the recording/reproducing head 214.

On the vertically extending portion 317 a of the magnetic head supporting arm 317 is protuberantly formed a controlled pawl 320, as shown in FIG. 15. The controlled pawl 320 is protruded towards the rear side of the vertically extending portion and is moved upwards or downwards in FIG. 15 when the magnetic head 315 is lowered towards or raised away from the chassis 301, respectively.

Within the cut-out 316 of the chassis 301 is mounted an indexing portion detection arm 329 constituting the magnetic head controlling member. The indexing portion detection arm 329 has its mid portion rotatably supported via pivot 330 with respect to chassis 301 while having its one end directed towards the rear of the chassis 301. The indexing portion detection arm 329 is rotatable so that its one end may be moved vertically with respect to chassis 301. The indexing portion detection arm 329 as an indexing portion detection pin 332 at its other end via an upwardly directed lug 335. The detection pin 32 is protruded towards the upper side of the chassis 301. A controlling arm 337 is extended towards a region overlying the chassis 310 substantially vertically with respect to the chassis 301. The controlling arm 337 has its distal end at substantially the same level as the controlled pawl 320. A magnetic head controlling shaft 331 constituting the magnetic head controlling member is mounted in parallel with guide shaft 308, as shown in FIG. 15. The magnetic head controlling shaft 331 is supported in the initial state at a level slightly below the controlled pawl 320, as shown in FIG. 17.

The index portion detection arm 329 is rotationally biased by a tension, coil spring 333, provided under tension between a lower lug 336 provided at the lower side at the other end of the index portion detection arm 329 and a spring retention pin 334 mounted upright on the chassis 301, in a direction of protruding the indexing portion detection pin 332 above the chassis 301 and displacing the magnetic head controlling shaft 331 away from the controlled pawl 320, as shown by arrow B in FIG. 15.

A cartridge holder 311 for holding the disc cartridge 201 or 211 introduced from its front side is provided on the chassis 301. The cartridge holder 311 is supported for rotation about its rear side as an axis in a direction towards and away from the chassis 301, as shown in FIGS. 17 and 18.

For loading the recording/reproducing disc cartridge 201 or the reproduce-only disc cartridge 211 in the above-described disc recording/reproducing apparatus, the cart ridge holder 311 is first rotated in a direction away from chassis 301, as shown in FIG. 17. The magnetic head supporting arm 317 is at the above-mentioned second position in which the magnetic head 315 is spaced apart from the disc 205 or 214. If the magnetic head supporting arm 317 is not at the above-mentioned second position, it is raised upwards by the cartridge holder 311 to the second position.

When the recording/reproducing disc cartridge 201 is introduced at its forward side as an inserting end into the cartridge holder 311, the shutter member 204 is moved by a shutter opening pin, not shown, by a shutter opening pin, not shown, with respect to the recording/reproducing cartridge main body 202, for opening the aperture for the magnetic head 203 and the aperture for the optical pickup unit 215.

Figure 18:
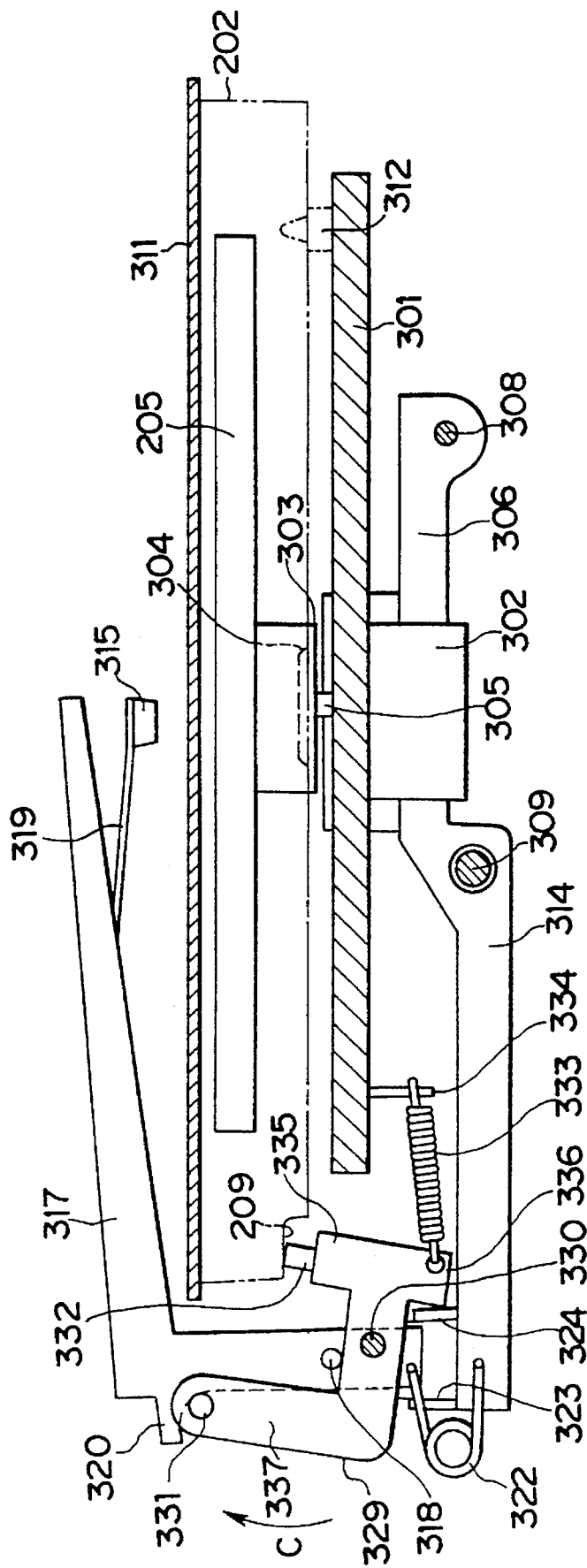
FIG. 18 is a side view showing the state in which the recordable disc cartridge has been loaded on the recording/reproducing apparatus shown in FIG. 15, with portions being broken away.

When the cartridge holder 311 is moved towards chassis 301, the recording/reproducing disc cartridge 202 is set and loaded on chassis 301, as shown in FIG. 18. The cartridge main body 202 is loaded in position on the chassis 301 at this time with the positioning pins 312, 313 introduced into the positioning holes 220, 221. The recording/reproducing disc 205 is loaded in position on the disc table 303 as it is centered by the centering member 304. The spindle motor 302 renders it possible to rotate the recording/reproducing disc 205 in unison with the disc table 303.

When the indexing portion detection pin 332 is thrust by the index portion for the recording/reproducing disc 209, the indexing portion detection arm 329 is rotated against the bias of the tension coil spring 209 in the direction of intruding the index portion detection pin 322 into a space below the chassis 301, as indicated by arrow C in FIG. 19. This causes the magnetic head controlling shaft 331 to be abutted against the controlled pawl 320 to thrust it upwards, with the magnetic head arm 317 being rotated beyond the aforementioned neutral position towards the first position in which the magnetic head 315 is slidingly contacted with the recording/reproducing type disc 205.

Figure 19:
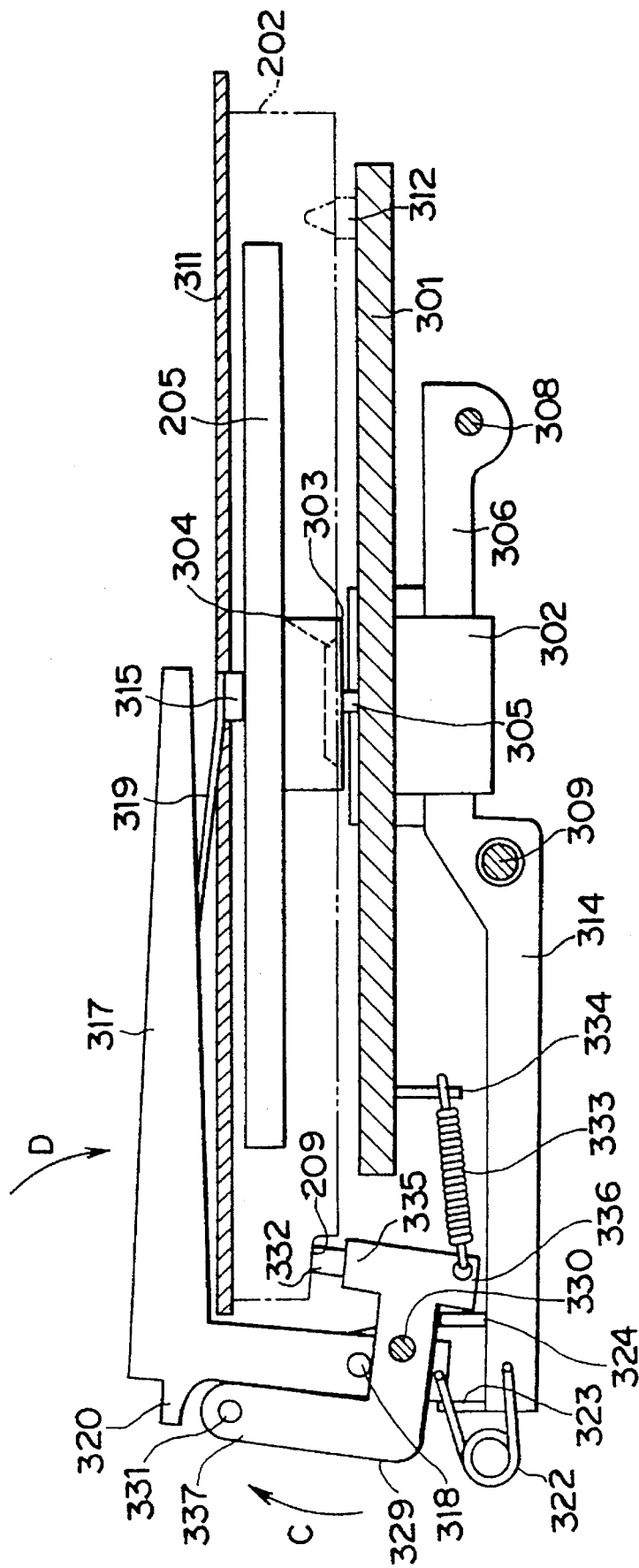
FIG. 19 is a side view showing the state in which the recordable disc cartridge has been loaded on the recording/reproducing apparatus shown in FIG. 15 and in which subsequently the magnetic head is brought to a position in which the magnetic head is slidingly contacted with the a disc base plate of the disc cartridge, with portions thereof being broken away.

That is, the magnetic head supporting arm 317, rotated towards the first position from the neutral position, is turned by the torsion coil spring 322 as shown by arrow D in FIG. 19. The magnetic head 315 is intruded at this time into the inside of the recording/reproducing cartridge main body 202 via aperture for the magnetic head 203 so as to be abutted against the recording layer side major surface of the recording/reproducing disc 205. The magnetic head controlling shaft 331 and the controlled pawl 320 are detached from each other at this time by the magnetic head supporting arm 317 being rotated to the above-mentioned first position.

In this state, shown in FIG. 19, the optical pickup unit 306 has its object lens 307 faced by the opposite major surface of the disc 205 via the aperture 215 for the optical pickup unit formed in the disc cartridge 201. The optical pickup unit 206 is movable across the inner and outer peripheries of the disc 205 as it has the object lens 307 faced by the disc 205 for radiating the light beam on the signal recording layer of the disc 205. The information signals may be recorded on the disc 205 by the spindle motor 2, optical pickup unit 306 and the magnetic head 315 being run in operation. That is, the information signals are recorded by the recording/reproducing disc 205 being run in rotation, the light beam being converged and radiated to the signal recording layer of the disc 205 by the optical pickup unit 306 for heating the radiated region, and by an external magnetic field being applied by the magnetic head 315.

Meanwhile, when the power for the disc recording/reproducing apparatus is turned on or control is made to command the start of the recording mode, the optical pickup unit 306 is moved to a position corresponding to the radially inner most region of the signal recording region for reading the table-of-contents information (TOC information) recorded on the recording/reproducing disc 205. The table-of-contents information is recorded at the radially inner most zone of the signal recording region of the recording/reproducing disc 205.

If the reproduce-only disc cartridge 211 is inserted from the front side as the inserting side into the cartridge holder 311, the shutter member 213 is moved by the shutter opening pin, not shown, with respect to the reproduce-only cartridge main body 212 for opening the aperture for the optical pickup unit 215.

Figure 20:
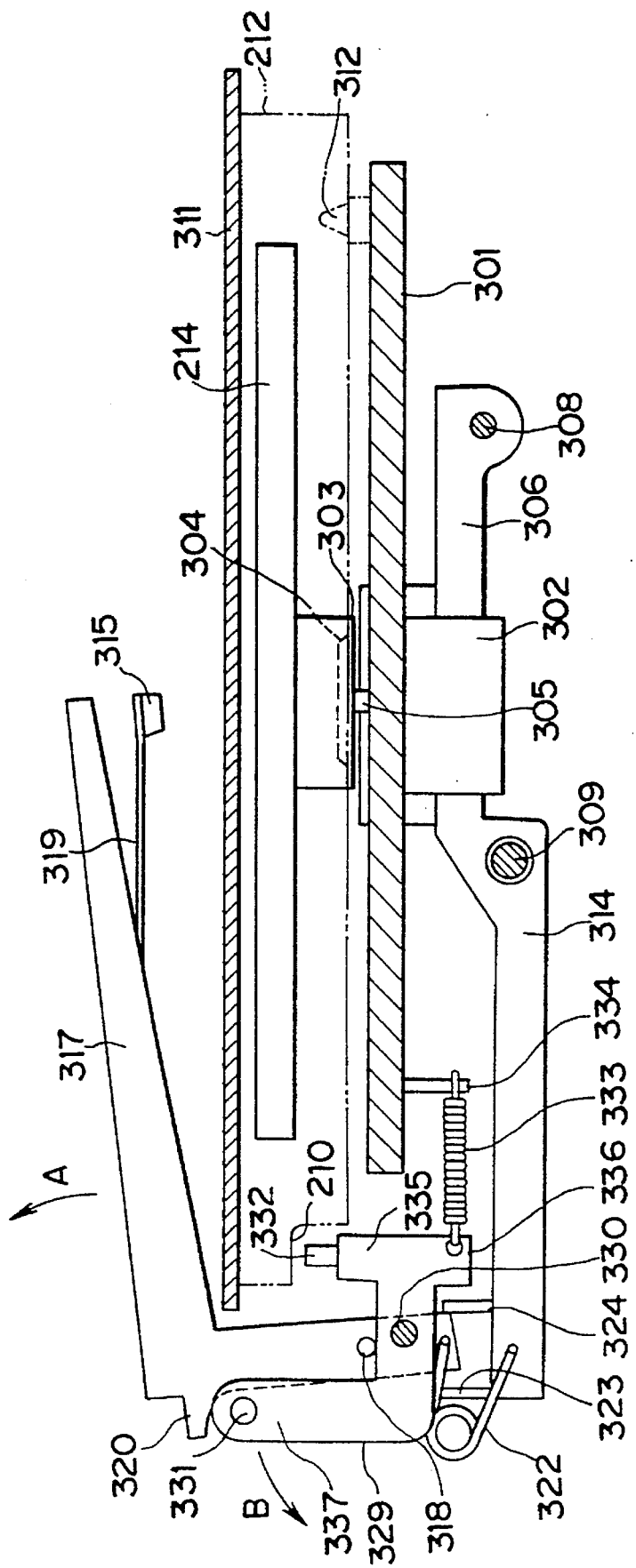
FIG. 20 is a side view showing the state in which the reproduce-only disc cartridge has been loaded on the recording/reproducing apparatus shown in FIG. 15, with portions being broken away.

When the cartridge holder 311 is moved towards the chassis 301, the reproduce-only disc cartridge 211 is set and loaded on the chassis 301, as shown in FIG. 20. The reproduce-only cartridge main body 212 is loaded in position at this time with respect to the chassis 301 by the positioning pins 312, 313 being engaged in the positioning holes 220, 221. On the other hand, the reproduce-only disc 214 is loaded in position on the disc table 303 as it is centered by the centering member 304. The spindle motor 302 then causes the recording/reproducing disc 205 to be rotated in unison with the disc table 303 along with the disc table 303.

Figure 16:
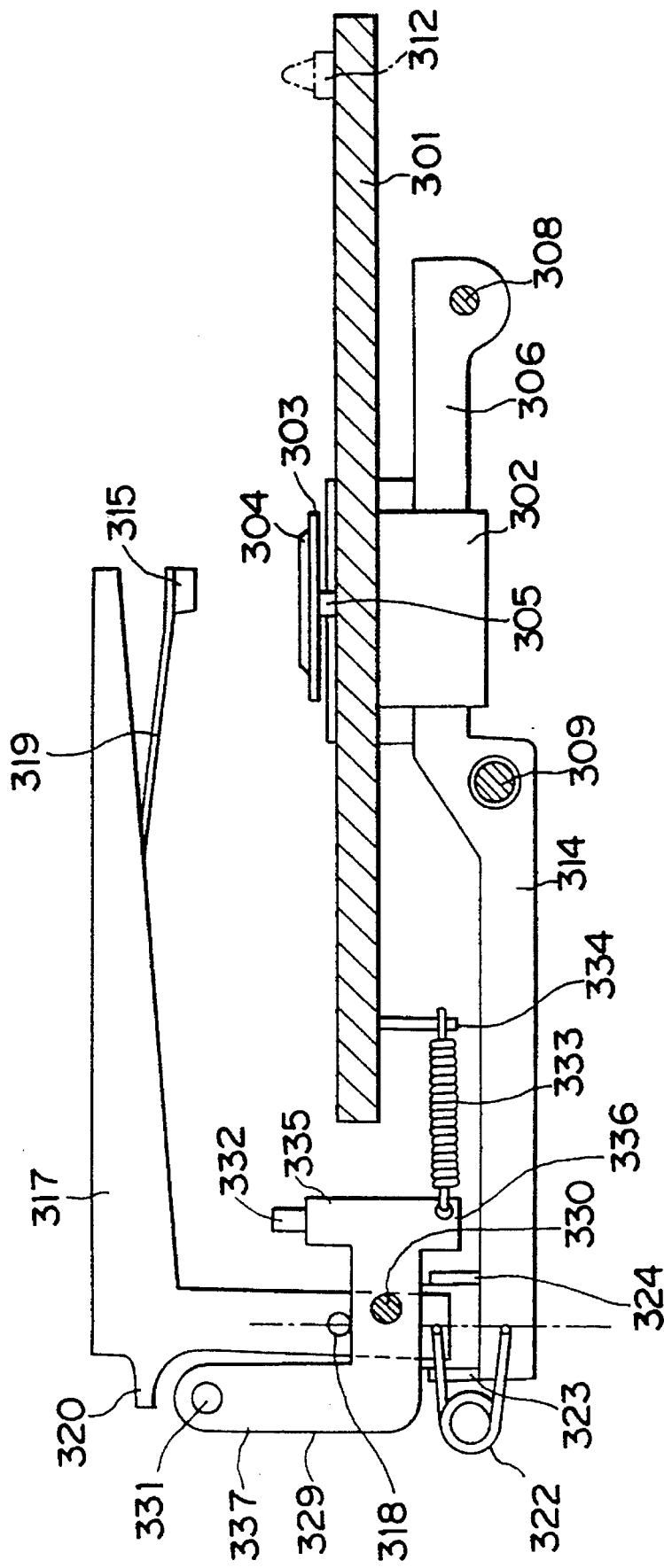
FIG. 16 is a side view showing the state in which the magnetic head supporting arm of the recording/reproducing section of FIG. 15 in its neutral position, with portions thereof being broken away.

Since the indexing portion for the reproduce-only disc 210. is deeper in depth than the indexing portion for the recording/reproducing disc 209, the indexing detection pin 332 is intruded into the indexing portion for the reproduce-only disc 210 without being thrust by the reproduce-only cartridge main body 212. Thus the indexing portion detection arm 329 is maintained in its initial state, under the bias of the tension coil spring 333, for protruding the indexing portion detection pin 332 above the chassis 301. Consequently, the magnetic head controlling shaft 331 is moved from the initial position shown in FIG. 16 without being abutted against the controlled pawl 320. The magnetic head supporting arm 317 is rotationally biased under the bias of the torsion coil spring 322 in the direction as shown by arrow A in FIG. 20 for maintaining the magnetic head 315 at the second position in which the magnetic head supporting arm 317 is spaced from disc 205.

In the state shown in FIG. 20, the optical pickup unit 306 has the object lens 307 faced by the opposite major surface of the reproduce only disc 214 via the aperture for the optical pickup unit 215. On the other hand, the optical pickup unit 306 is movable across the inner and outer peripheries of the reproduce-only disc 205 so as to enable the light beam to be radiated to the reflective layer. The spindle motor 302 and the optical pickup unit 306 are run in operation in this state for enabling the information signals to be reproduced from the reproduce-only disc 214. That is, the information signals are reproduced by the light beam being converged and radiated by the optical pickup unit 306 on the reflective layer of the reproduce-only disc 214 run in rotation, and by detecting the light beam reflected from the reflective layer.

Meanwhile, when the power source for the disc recording and/or reproducing apparatus is turned on, or when a control is made for commanding the start of the play mode, the optical pickup unit 306 is first moved to a position in register with the radially inner most zone of the signal recording region of the reproduce-only disc 214 for reading the table-of-contents information.

For taking out the disc cartridge 201 or 211 loaded on the disc recording/reproducing apparatus, the cartridge holder 311 is rotated in a direction away from chassis 301, as shown in FIG. 17.

If the magnetic head supporting arm 317 is at the first position in which it has been turned towards the disc cartridge 201, the magnetic head supporting arm 317 is raised by the cartridge holder 311 so as to be turned further towards the aforementioned second position away from the neutral position, as a result of which the magnetic head supporting arm 317 is rotated under the bias of the torsion coil spring 322 as shown by arrow A in FIG. 20 to the aforementioned second position in which it is spaced apart from the disc cartridge 201. When the magnetic head supporting arm 317 is rotated by the cartridge holder 317 to the aforementioned neutral position, the magnetic head controlling shaft 311 is reset to the initial position in which it is not abutted against the controlled piece 320 without obstructing the rotation towards the second position of the magnetic head supporting arm 317.

It is noted that when the reproduce-only disc cartridge 211 is loaded in the disc recording and/or reproducing apparatus, and the magnetic head supporting arm 317 is at the aforementioned second position in which it is spaced apart from the disc cartridge 211, the magnetic head supporting arm 317 is maintained at the second position when taking out the disc cartridge 211.

Figure 21:
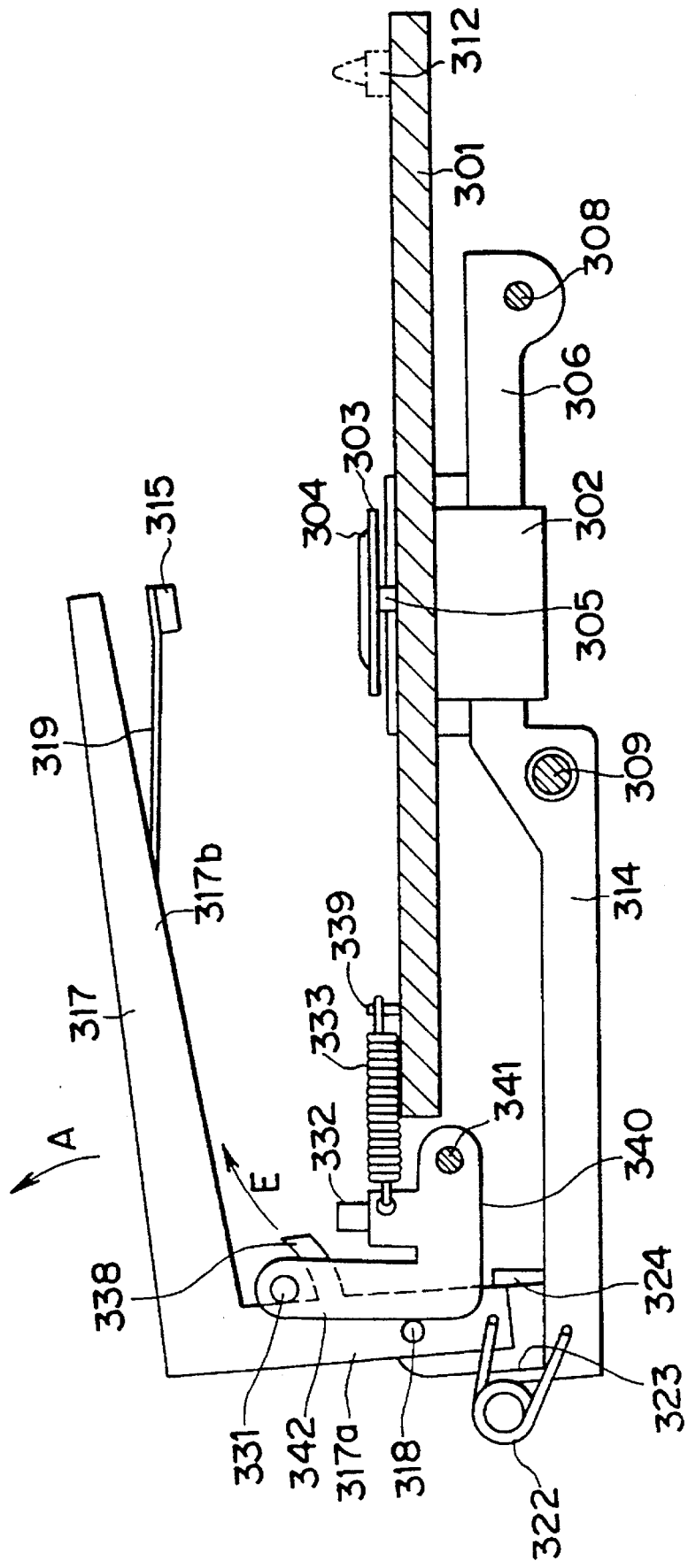
FIG. 21 is a side view showing another arrangement of essential portions of the recording/reproducing apparatus shown in FIG. 15, with portions thereof being broken away.

Meanwhile, the disc recording and/or reproducing apparatus may be designed using an index portion detection arm 340 rotatably supported at its proximal end by chassis 301, as shown in FIG. 21. The index portion detection arm 340 shown in FIG. 21 has its proximal end rotatably supported via pivot 341 by the chassis 301 and its distal end directed towards rear of chassis 301 so that the distal end may be moved vertically relative to chassis 301. The index portion detection arm 340 has an index portion detection pin 332 at a mid part for being projected upwards in FIG. 21. The index portion detection pin 332 is protruded above chassis 301. A controlling arm section 342 is integrally extended from the distal end of the indexing portion detection arm 340. The controlling arm 342 is extended substantially vertically relative to chassis 301 upwards from chassis 301. A magnetic head controlling shaft 331 is mounted upright on the distal end of the controlling arm 342 in parallel with the guide shaft 308.

The index portion detection arm 340 is rotational by biased by a tension coil spring 333, provided under tension between the proximal end of the index portion detection pin 332 and the spring retention pin 339 mounted upright on the chassis 301, in a direction of protruding the index portion detection pin 332 upwards from chassis 301, as indicated by arrow E in FIG. 21.

In the disc recording and/or reproducing apparatus, a controlled pawl 338 is protuberantly formed on the front side of the vertically extending portion 317a of the magnetic head supporting arm 317. That is, the controlled pawl 338 is moved downwards in FIG. 21 when the magnetic head 315 is moved down towards chassis 301, and is moved upwards in FIG. 21 when the magnetic head 315 is moved upwards away from chassis 301. In the initial state, the magnetic head controlling shaft 331 is supported slightly above and at a distance from the controlled pawl 338.

In the present disc recording and/or reproducing apparatus, when the recording/reproducing disc cartridge 201 is loaded on chassis 301, the indexing portion detection arm 340 is rotated against the bias of the torsion coil spring 301, the magnetic head controlling shaft 331 thrusting the controlled pawl 333 downwards to rotate the magnetic head supporting arm 317 for setting the magnetic head supporting arm 317 to the above-mentioned first position. Conversely, when the reproduce-only disc cartridge 211 is loaded on chassis 301, the detection arm 340 is not turned, with the magnetic head supporting arm 317 being maintained at the above-mentioned second position in which it is spaces apart from the disc cartridge 211.

A modified embodiment of essential portions of the above-described embodiment of the disc recording and/or reproducing apparatus is hereinafter explained. It is noted that parts or components common to those of the preceding embodiment are indicated by the same reference numerals and the corresponding explanation is omitted for simplicity.

Figure 22:
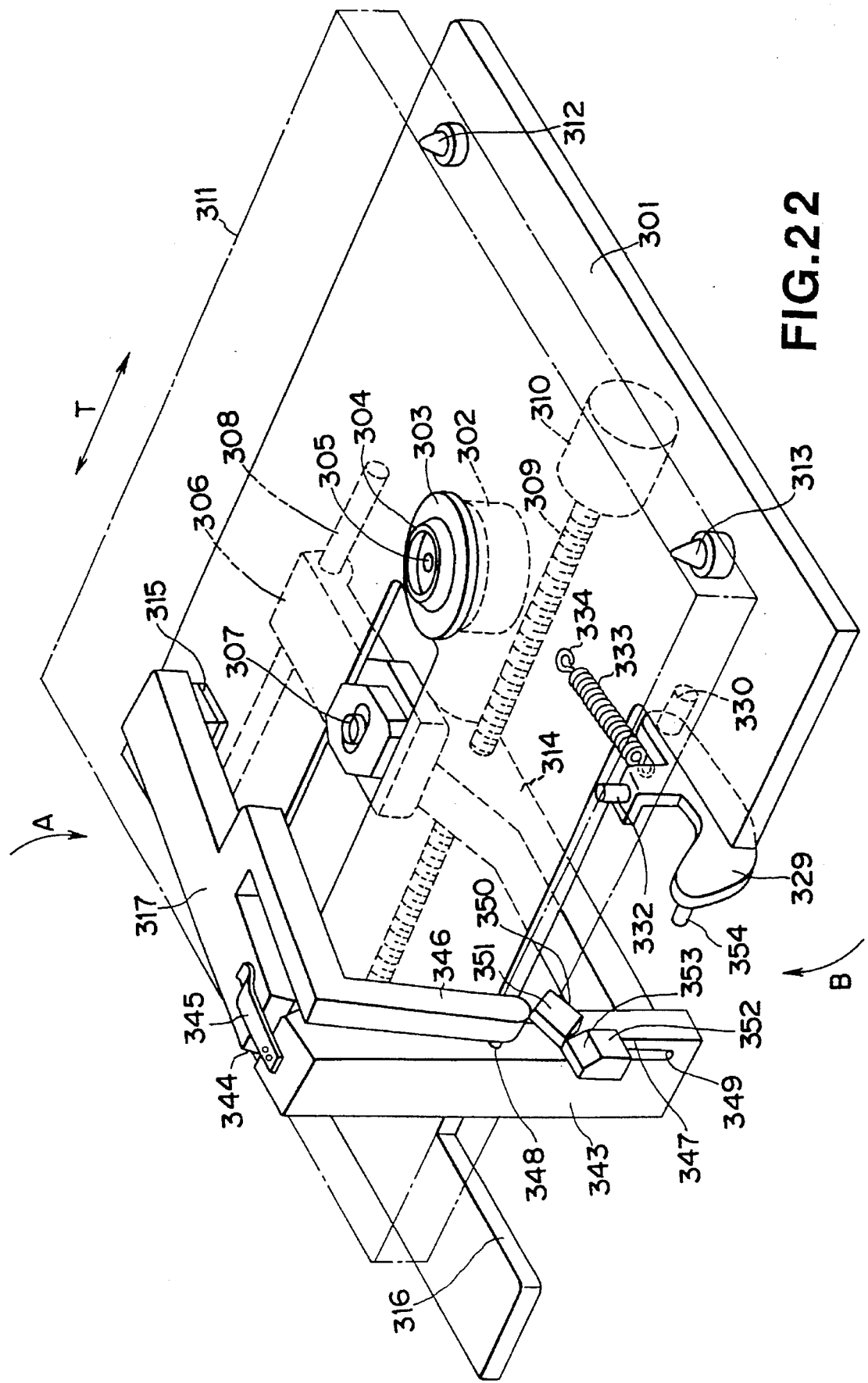
FIG. 22 is a perspective view showing another arrangement of the recording/reproducing section of the recording and/or reproducing apparatus according to the present invention.

FIG. 22 shows a fourth embodiment of the disc recording and/or reproducing apparatus modified in essential portions from the embodiment shown in FIG. 15.

In the present embodiment a magnetic head 315 is mounted on the optical pickup unit 306 via a magnetic head supporting member. The magnetic head supporting member is made up of a connecting arm 314 having its proximal end mounted on the optical block of the optical pickup unit 306 and extended substantially parallel to chassis 301, a supporting pillar 343 formed as one with the connecting arm 314 at a distal end of the connecting arm 314 for extending upwards substantially at right angles to chassis 301, and a movable arm 317 having its proximal end supported via a hinge 344 by the upper end of the supporting pillar 343. The supporting pillar has its distal end protruded upwards from chassis 301 via a cut-out 316 formed at the rear part of chassis 301. The movable arm 316 may be rotated about the hinge 344 as a center of rotation by flexible deformation of hinge 344 which is formed of a thin-walled part of synthetic resin. The movable arm 317 is extended towards the optical pickup nit 306 substantially parallel to chassis 301 so that its distal end may be flexed in the direction towards and away from chassis 301.

A magnetic head 315 is mounted on the distal end side of the movable arm 317 facing the chassis 301. The magnetic head 301 is maintained at a position of facing the object lens 307. That is, the magnetic head 315 is positioned on the optical axis of the object lens 307 and may be moved in the directions towards and away from the object lens 307. The magnetic head 315 is at the aforementioned first position in which it approaches to the chassis 301 when the recording/reproducing disc cartridge 201 is loaded for recording information signals in the recording/reproducing disc 205. On the other hand, it is at the aforementioned second position in which it is moved away from the chassis 301 when the reproduce-only disc cartridge 211 is loaded for recording information signals in the reproduce-only disc 205.

A spring plate 345 is mounted between the distal end of the supporting pillar 343 and the proximal end of the movable arm 317. The spring plate 345 biases the proximal end of the movable arm 317 for rotationally biasing the movable arm 317 in a direction of approaching the magnetic head 315 towards the object lens 307, as shown by arrow A in FIG. 22.

The magnetic head supporting member is provided with a locking arm 346 and a locking member 347 making up locking means. The locking arm 346 is formed as one with the movable arm 317 and extended from a lateral side of the movable arm 317 in the form of a letter L from near the distal end of the supporting pillar 343 to the vicinity of the mid part of the supporting pillar 343. The distal end of the locking arm 346 carries a locking pin 348 directed towards the supporting pillar 343. The locking member 347 has its proximal part connected to the proximal part of the supporting pillar 343 via a hinge 349 which is formed of synthetic resin with a reduced thickness. The locking member 347 has its distal end directed towards te distal end of the supporting pillar 343. The distal end of the locking member 347 is located between the locking pin 348 provided at the locking arm 346 and the supporting pillar 343.

A locking pawl 350 is protuberantly formed at a part of the locking member 347 facing the locking pin 348 so as to be protruded towards the locking pin 348. The upper part of the locking pawl 350, that is the distal side of the supporting pillar 343, is an inclined surface 351 extending from the distal end of the locking member 347 to the distal end of te locking pawl 350. A thrust boss 352 is provided at the proximal end of the locking member 347 opposite to the supporting pillar 343. The lateral side of the thrust boss 352 directed to the distal end of the locking member 347 is an inclined surface 353 having an amount of projection of the thrust boss 353 gradually decreased towards the distal end of the locking member 347.

Within the cut-out 316 of chassis 301 is provided an indexing portion detection arm 329 acting as a magnetic head controlling member. The indexing portion detection arm 329 has its proximal end rotatably supported via pivot 330 by chassis 301 and has its distal end directed towards the rear of the chassis 301. The indexing portion detection arm 329 has an upwardly protruded indexing portion detection pin 332 at its middle, as shown in FIG. 22. The detection pin 332 is projected upwards from chassis 301. An unlocking pin 354 is mounted upright on the distal end of the index portion detection arm 329 for extending in the direction of the locking member 347.

A tension coil spring 333 is provided under tension between the proximal part of the indexing portion detection pin 332 of the indexing portion detection arm 329 and the spring retention pin 334 mounted upright on the chassis 301. The tension coil spring 333 rotationally biases the indexing portion detection arm 329 in a direction of protruding the indexing portion detection pin 332 upwards from chassis 301, as shown by arrow B in FIG. 22.

On the chassis 301 is mounted a cartridge holder 311 into which the disc cartridge 201 or 211 is inserted from the front side so as to be held therein. The cartridge holder 311 is mounted by the chassis 301 with its rear part as a center of rotation so as to be moved towards and away from chassis 301, as shown in FIGS. 23 and 24.

Figure 23:
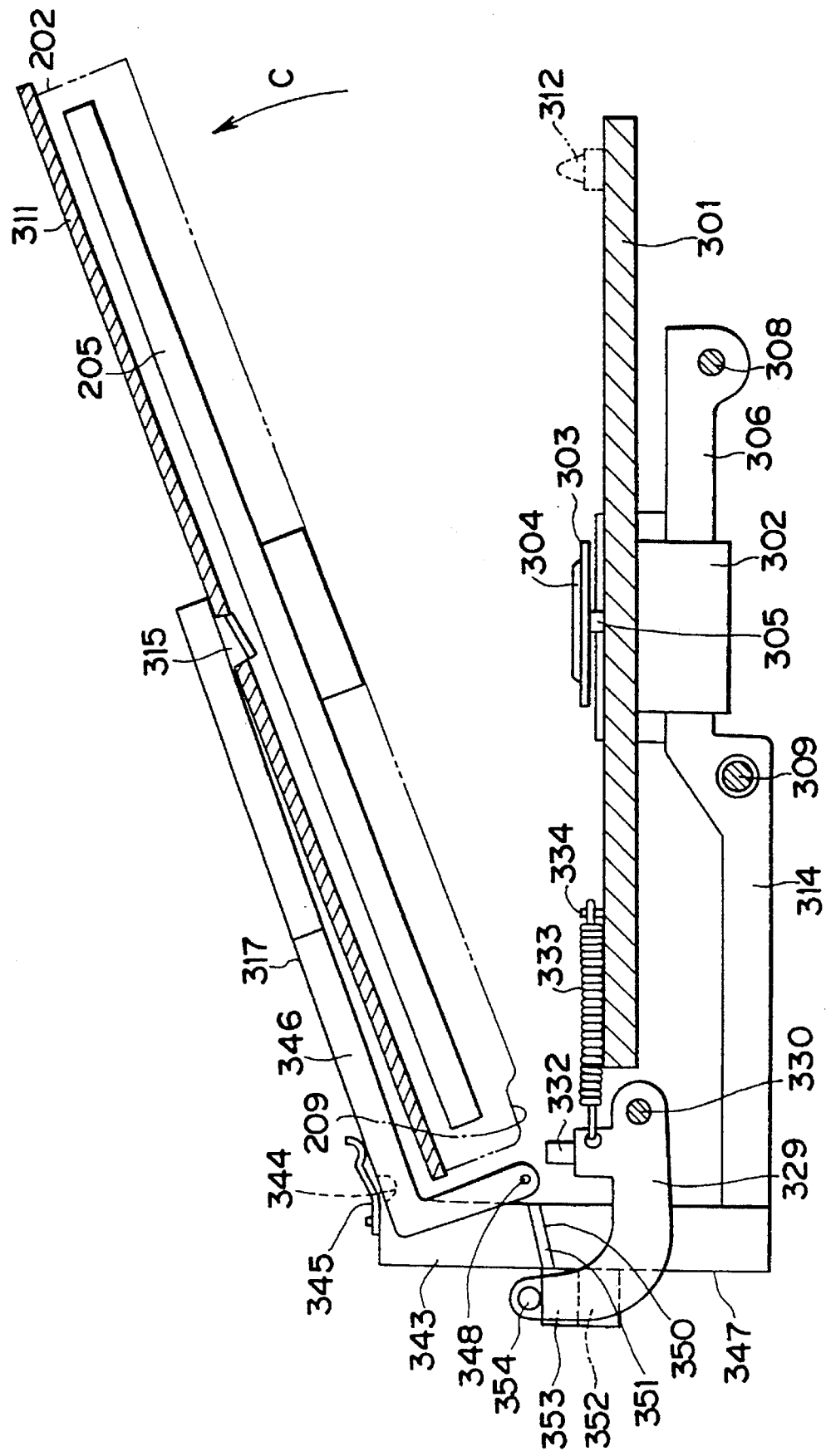
FIG. 23 is a side view showing the state in which the disc cartridge is being loaded on or taken out from the recording/reproducing section of the recording/reproducing apparatus shown in FIG. 22, with portions being broken away.

For loading the recording/reproducing disc cartridge 201 or the reproduce-only disc cartridge 211 on the above-described disc recording and/or reproducing apparatus according to the present invention, the cartridge holder 311 is rotated in a direction of displacing the cartridge holder 311 in a direction away from chassis 301, as indicated by arrow C in FIG. 23. The movable arm 317 is abutted by the cartridge holder 311 and thereby raised in its position. The locking arm 346 is caused to follow the rotary arm 317 so as to be rotated with the hinge 344 as the center of rotation, with the locking pin 348 being ahead of and spaced apart from the locking pawl 350, as shown in FIG. 23.

When the recording/reproducing disc cartridge 201 is introduced into cartridge holder 311 from the front side, the shutter member 204 of the recording/reproducing disc cartridge 201 is moved relative to the recording/reproducing cartridge 202, by a shutter opening pin or the like, for opening the aperture for the magnetic head 203 and the aperture for the optical pickup unit 215.

Figure 24:
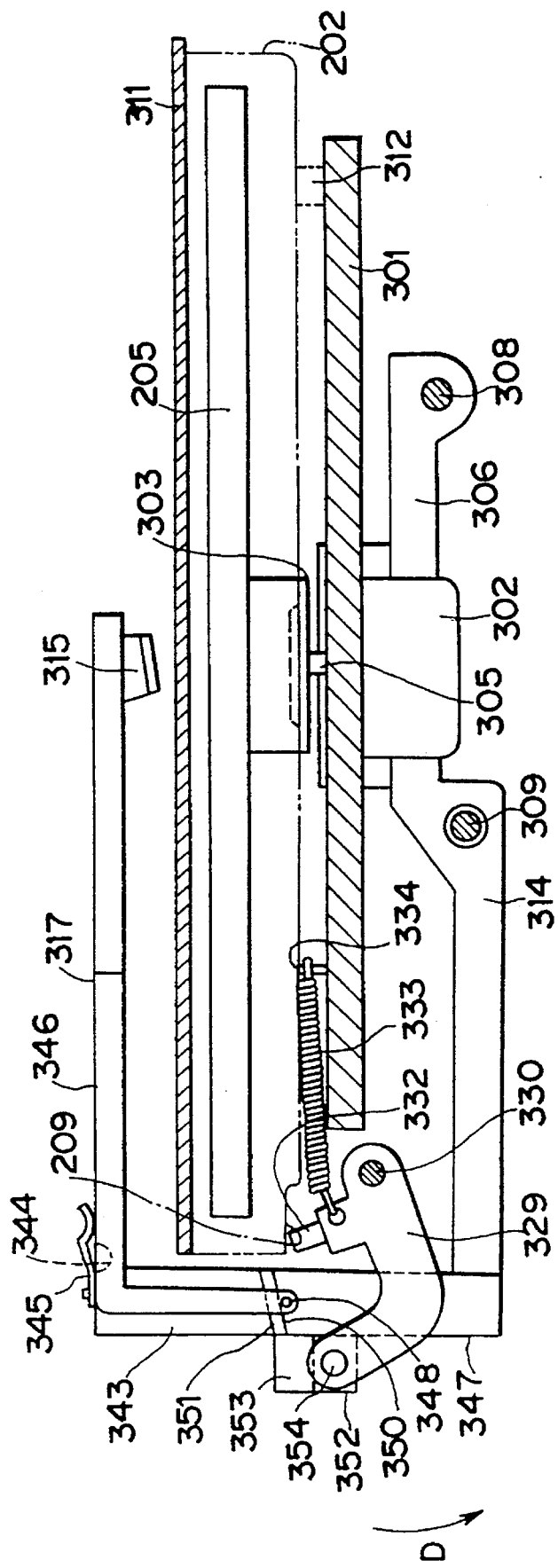
FIG. 24 is a side view showing the state in which the reproducible disc cartridge is loaded on the recording/reproducing section shown in FIG. 22.

When the cartridge holder 311 is moved towards chassis 301, the recording/reproducing cartridge main body 202 is loaded in position on the chassis 301, by the positioning pins 312, 313 being engaged in the positioning holes 220, 221, as shown in FIG. 24. The recording/reproducing disc 205 is loaded in position on the disc table 303 as it is centered by the centering member 304. At this time, the recording/reproducing disc 205 may be rotated in unison with the disc table 303 by the spindle motor 302.

When the indexing portion detection pin 332 is thrust by the indexing portion for recording/reproducing disc 209, the indexing portion detection arm 329 is rotated against the bias of the tension coil spring 333 in a direction of guiding the indexing portion detection pin 332 to a space below chassis 301, as shown by arrow D in FIG. 24. At this time, the unlocking pin 331 has its distal end facing the thrust boss 352 of the locking member 347, as shown in FIG. 25.

Figure 26:
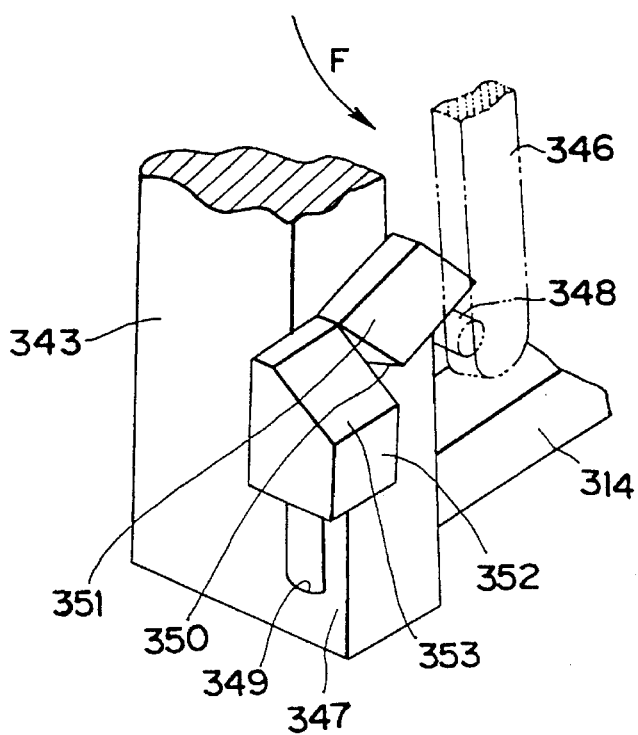
FIG. 26 is an enlarged perspective view showing the state in which the holding unit holds the magnetic head.

The movable arm 317 is moved under the bias of the spring plate 345 so as to follow the movement of the cartridge holder 311 for approaching the chassis 301. The locking arm 346, at this time is rotated to follow the movement of the rotary arm 317 to cause the locking pin 348 towards the locking member 347 from the obliquely lower front side. The locking pin 348 is retained by the locking pawl 350, as shown in FIG. 26, to halt the rotation of the locking arm 348 and the movable arm 317 in the direction of following the movement of the cartridge holder 311. That is, although the magnetic head 315 is moved in a direction of approaching the chassis 301 to follow the movement of cartridge holder 311, such movement of the magnetic head 315 towards the chassis 301 is halted by the locking pin 348 being engaged with the locking pawl 350 for maintaining the above-mentioned second position.

In such state, shown in FIG. 26, the optical pickup unit 306 has its object lens 307 facing the opposite side major surface of the recording/reproducing disc 205 via the aperture for the optical pickup unit 215, and is movable across the inner and outer peripheries of the disc 205. A light beam from the optical pickup unit 306 may be radiated via the opposite side major surface of the recording/reproducing disc 205 on the signal recording layer of the disc. When the power source of the disc recording/reproducing apparatus is turned on, or a start of the recording mode is commanded, the optical pickup unit 306 is moved to a position in register with the inner most zone of the signal recording region of the recording/reproducing disc 205 for reproducing the TOC data recorded on the recording/reproducing disc 205. The TOC data are recorded on the radially inner most zone of the signal recording region of the recording/reproducing disc 205.

Figure 25:
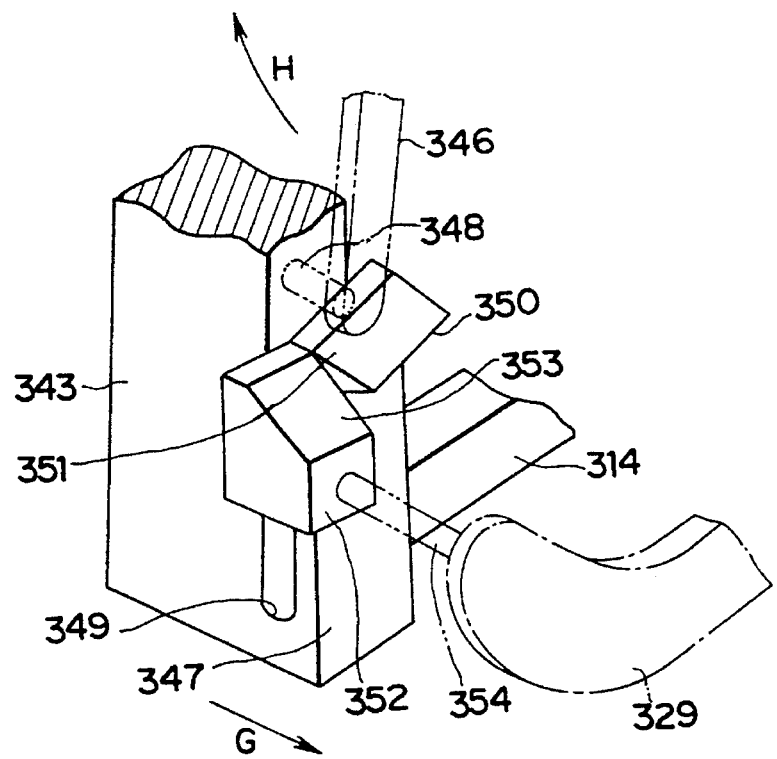
Figure 27:
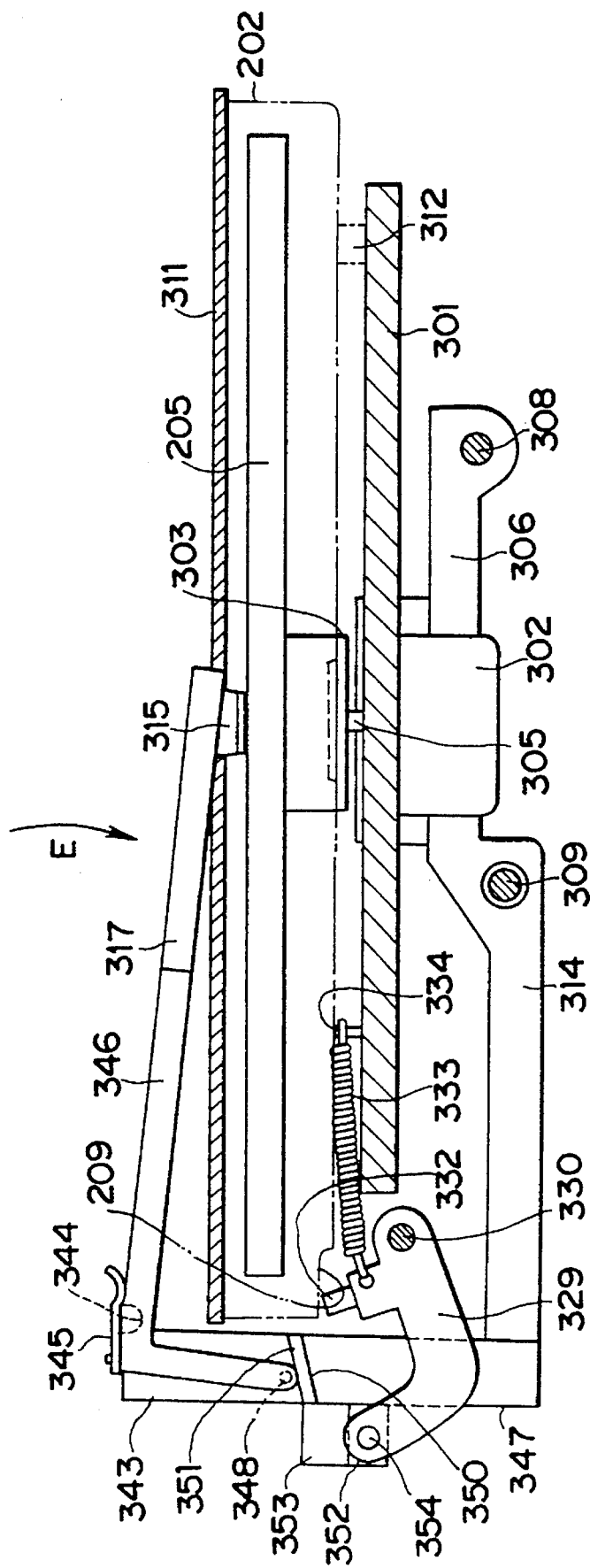
FIG. 27 is a side view showing the state in which the recordable disc cartridge is loaded on the recording/reproducing section of FIG. 22, and subsequently the holding of the magnetic head is released, with portions thereof being broken away.

When the optical pickup unit 306 is moved to the inner most side of the signal recording region of the recording/reproducing disc 205, the magnetic head supporting member is moved towards the indexing portion detection arm 329 as indicated by arrow G in FIG. 25. This causes the distal end of the unlocking pin 354 to be abutted against the thrust boss 352 of the locking member 347. The locking member 347 is moved towards the supporting pillar 343 by being thrust by the distal end of the unlocking pin 352. This disengages the locking pawl 350 from the locking pin 348 so that the locking arm 346 is rotated under the bias of the spring plate 345, along with the movable arm 317, in the direction of approaching the magnetic head 315 towards the chassis 310, as shown in FIG. 27. That is, the locking pin 348 is moved towards the upper oblique rear side of the locking pawl 350, as indicated by arrow H in FIG. 25. At this time, the magnetic head 315 is intruded via the aperture for the magnetic head 203 into the inside of the recording/reproducing cartridge main body 202 and set at the first position of being abutted against the recording layer side major surface of the recording/reproducing disc 205.

In this state, shown in FIG. 27, the spindle motor 302, optical pickup unit 306 and the magnetic head 315 are run in operation for enabling the information signals to be recorded on the recording/reproducing disc 205. That is, the information signals are recorded by the recording/reproducing disc 205 being run in rotation, the light beam from the optical pickup unit 306 being converged and radiated on the signal recording region of the signal recording layer for heating the signal recording region and by the external magnetic field being applied to the heated region 306 by the magnetic head 315.

On the other hand, if the reproduce-only disc cartridge 211 is inserted into the cartridge holder 311 at the inserting or front side, the shutter member 213 of the reproduce-only disc cartridge 211 is moved relative to the reproduce-only cartridge main body 212, by the shutter opening pin or the like, for opening the aperture for the optical pickup unit 215.

Figure 28:
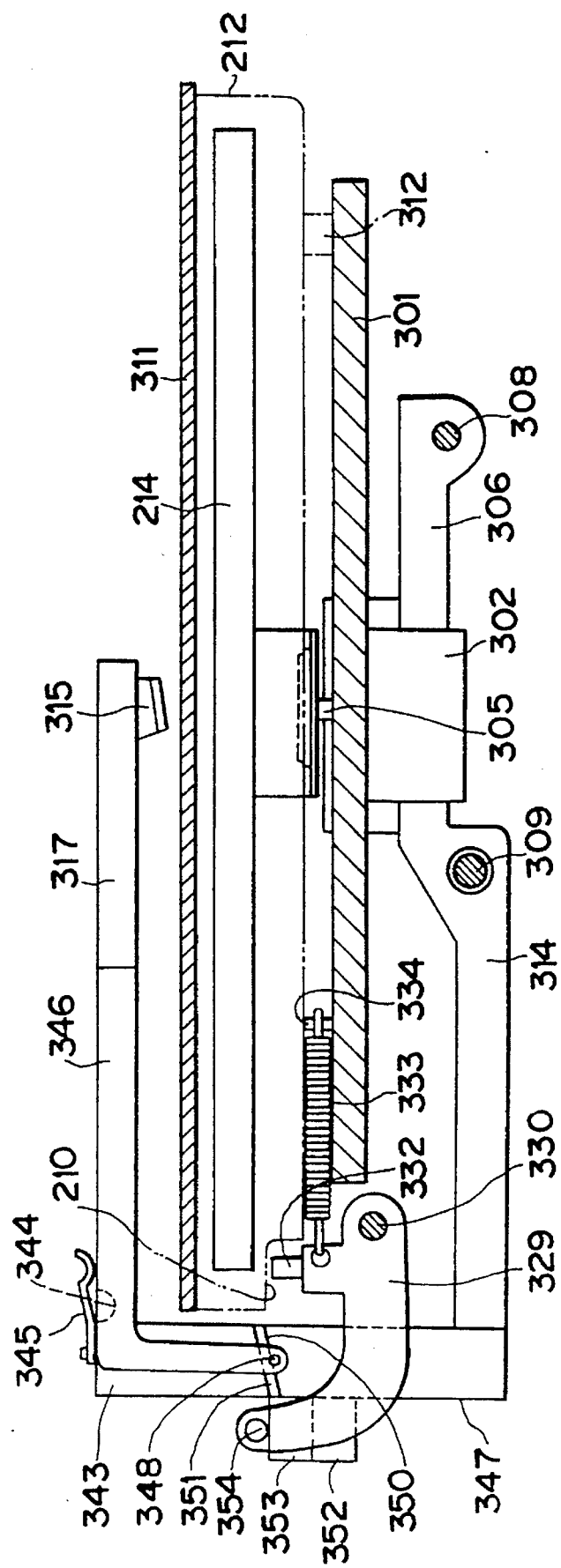
FIG. 28 is a side view showing the state in which the reproduce-only disc is loaded on the recording/reproducing section of FIG. 22, with portions thereof being broken away.

When the cartridge holder 311 is moved towards the chassis 301, the reproduce-only disc cartridge 211 is loaded on chassis 301, as shown in FIG. 28. The reproduce-only disc 214 is loaded in position on the disc table 303 as it is centered by the centering member 304. At this time, the recording/reproducing disc 205 may be rotated by the spindle motor 302 in unison with the disc table 205.

Since the indexing portion for the reproduce-only disc 210 is deeper in depth than the recording/reproducing indexing portion 209, the indexing portion detection pin 332 is intruded into the inside of the indexing portion for the reproduce-only disc 210 without being thrust by the reproduce-only cartridge main body 212. Consequently, the indexing portion detection arm 329 is maintained at the initial position, under the bias of the tension coil spring 333, for causing the indexing portion detection pin 332 to be protruded above the chassis 301. The unlocking pin 354 at this time is at such a position in which its distal end is located between the thrust boss 352 of the locking member and the locking pawl 350, as shown in FIG. 29.

The movable arm 317 is moved under the bias of the spring plate 345 in a direction of approaching the chassis 301 to follow the movement of the cartridge holder 311. The locking arm 346 is rotated at this time to follow the movement of the movable arm 319 for moving the locking pin 348 towards the locking member 347 from the front side. This causes the locking pin 348 to be retained by the locking pawl 35b, as shown in FIG. 26, for halting the rotation of the locking arm 348 and the movable arm 317 in a direction of following the movement of the cartridge holder 311. The magnetic head 315 is then moved towards the cartridge holder 311 to follow the movement of the cartridge holder 311. However, such movement of the magnetic head in a direction of approaching the chassis 301 is halted, as shown in FIG. 28, by the locking pin 311 being engaged with the locking pawl 350, for maintaining the above-mentioned second position.

In this state, the optical pickup unit 306 has its object lens 307 facing the opposite major surface of the reproduce-only disc 214 via the aperture for the optical pickup unit 215. The optical pickup unit 306 is also movable across the inner and outer peripheries of the recording/reproducing disc 214. The light beam from the optical pickup unit 306 may be radiated on the reflecting layer via the opposite, major surface of the disc 214. When the power source of the disc recording and/or reproducing apparatus is turned on, or a start of the play mode is commanded, the optical pickup unit 306 is moved to a position in register with the radially inner most zone of the signal recording region of the reproduce-only disc 214 to reproduce the TOC information.

Figure 29:
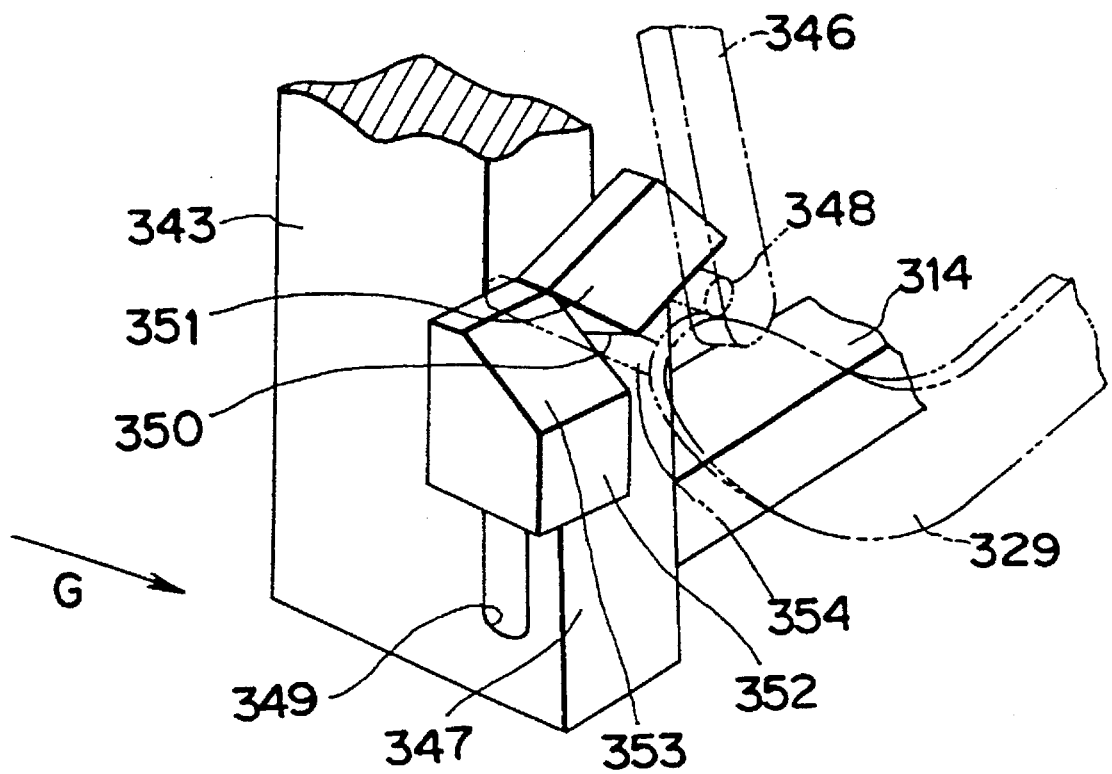
FIG. 29 is an enlarged perspective view showing the state in which the holding of the magnetic head by the holding unit is not released.
Figure 30:
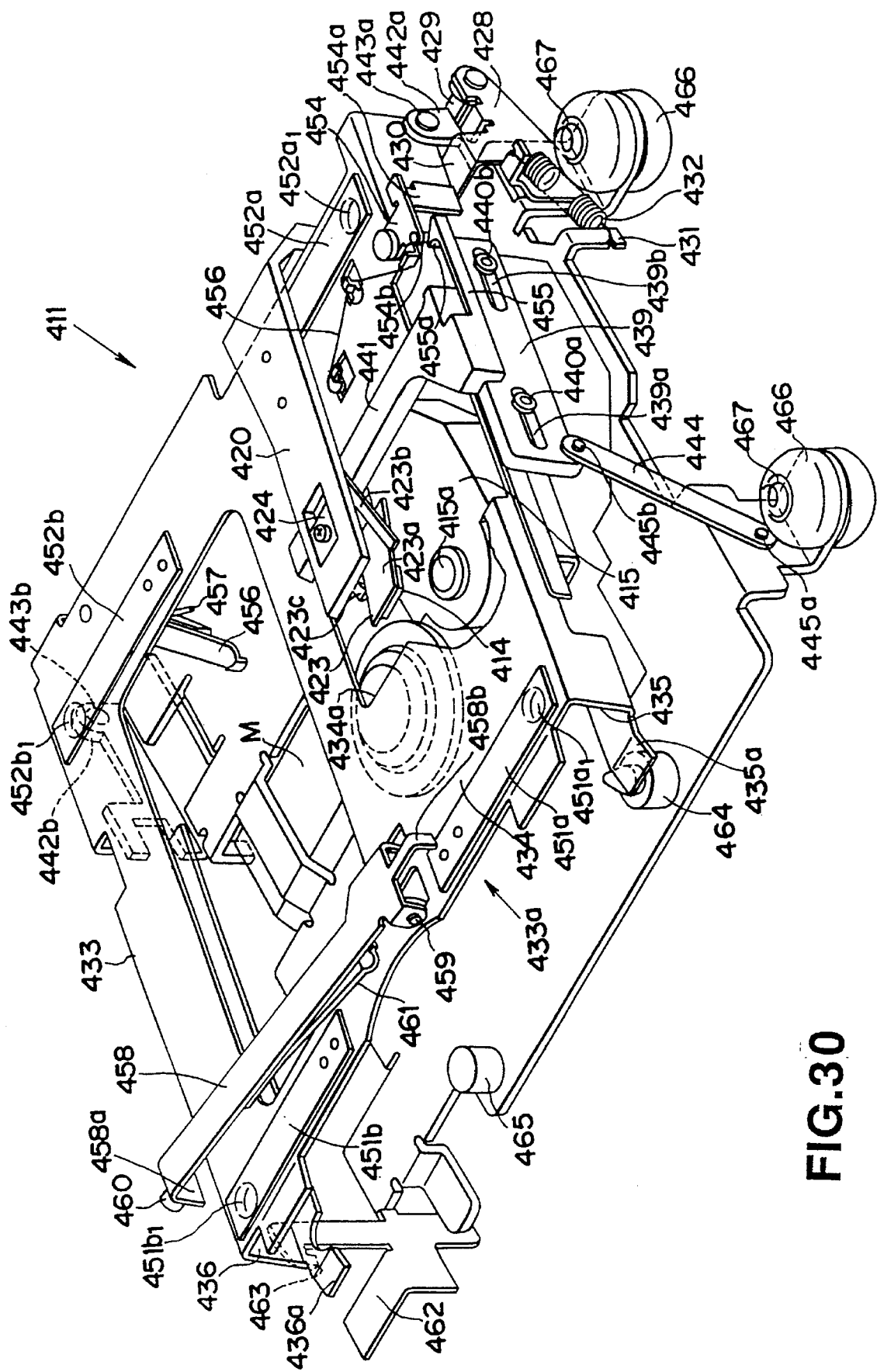
FIG. 30 is a perspective view showing another arrangement of the recording/reproducing section of the recording and/or reproducing apparatus according to the present invention.
Figure 31:
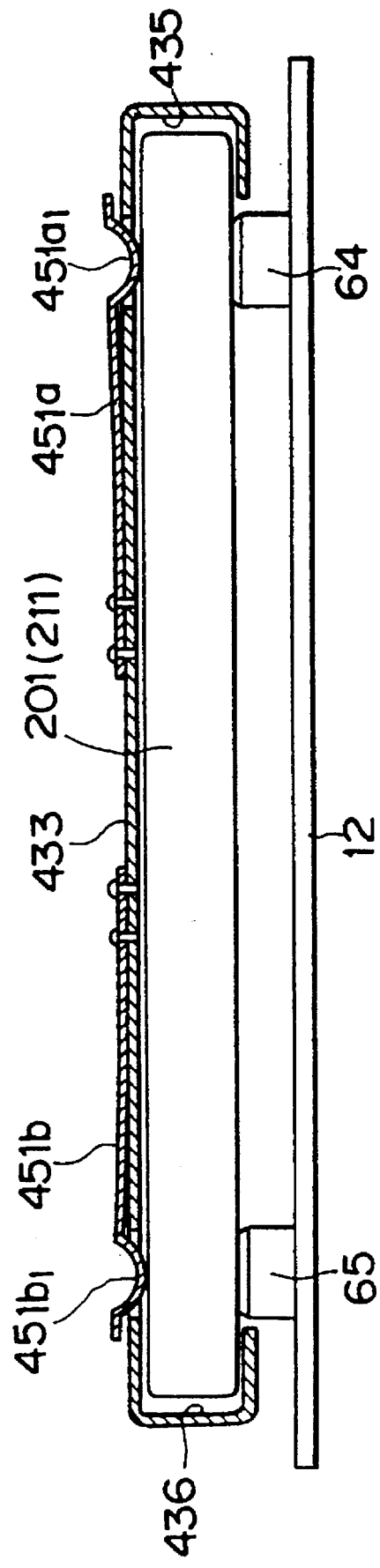
FIG. 31 is a transverse sectional view showing the state in which the disc cartridge has been loaded on the recording/reproducing section shown in FIG. 30.
Figure 32:
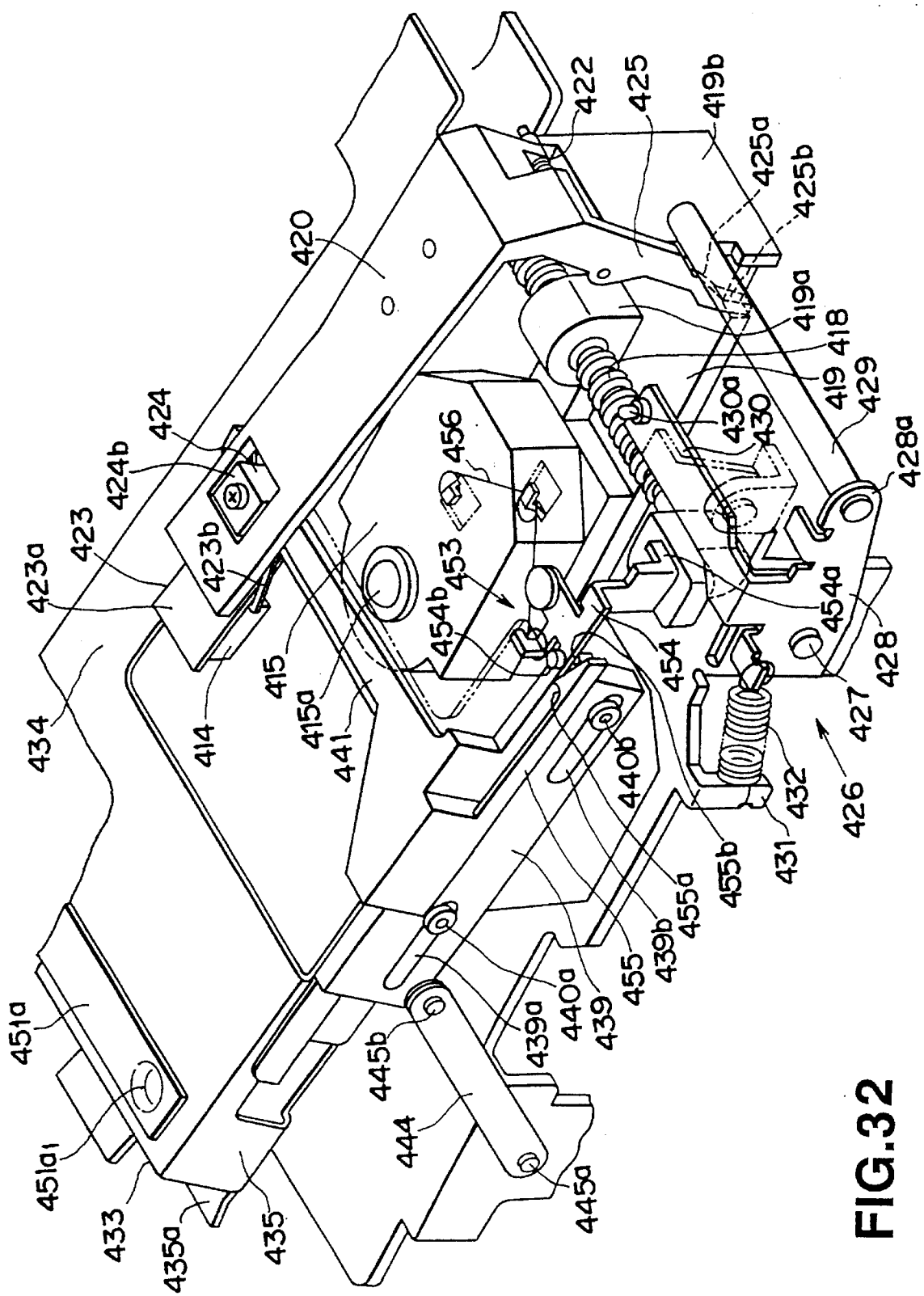
FIG. 32 is a perspective view showing essential parts of the recording/reproducing section of FIG. 30, as viewed from the rear side.

When the optical pickup unit 306 is moved to the radially inner most zone of the signal recording region of the reproduce-only disc 214, the magnetic head supporting member is moved towards the indexing portion detection arm 329, as indicated by arrow G in FIG. 29. Since the distal end of the unlocking pin 354 is out of a position facing the thrust boss 352, the distal end of the unlocking pin 354 is not caused to bear against the thrust boss 352 of the locking member 347. Therefore, the locking pin 350 is not disengaged from the locking pin 348 so that the magnetic head 315 is maintained at the second position spaced apart from the reproduce-only disc 214, as shown in FIG. 28. In this state, the spindle motor 302 and the optical pickup unit 306 are run in operation for enabling information signals to be reproduced from the reproduce-only disc 214. That is, the reproduce-only disc 214 is run in rotation and the light beam from the optical pickup unit 306 is converged and radiated on the reflective layer of the disc 214 for reproducing the information signals.

For taking out the disc cartridge 201 or 211 loaded on the disc recording/reproducing apparatus, the cartridge holder 311 is rotated in a direction of shifting the cartridge holder 311 away from the chassis 301, as indicated by arrow C in FIG. 23. At this time, the movable arm 317 is abutted by the cartridge holder 311 so as to be raised in its position. The locking arm 346 is rotated about the hinge 344 as the center of rotation so as to follow the movement of the movable arm 317. The locking pin 348, if retained by the locking pawl 350, is moved to a position ahead of the locking pal 350 away from the locking pawl 350. If the locking pin 348 is not retained by the locking pawl 350, that is if the magnetic head 315 is at the first position, as indicated by arrow F in FIG. 26, the locking pin 348 is slidingly contacted with the inclined surface 351 to cause the locking member 347 to be elastically deviated towards the supporting pillar 343, the locking member riding over the locking pawl 350, and the locking pin being then moved to a position ahead of and away from the locking pawl 350.

If, in a state in which the disc cartridge 201 or 211 is not loaded in position, and the optical pickup unit 306 is at a position closest to the disc table 303, that is at an inner most position with the disc loaded in position, the disc cartridge 201 is loaded and the indexing portion detection arm 329 is rotated, the unlocking pin 354 reaches a position of facing the thrust boss 352, in sliding contact with the inclined surface 353, the locking member 347 is elastically deformed towards the supporting pillar 343. At this time, the locking pin 348 is disengaged from the locking pawl 350, so that the magnetic head 315 is moved to the first position of being abutted against the recording/reproducing disc 205.

It is noted that unlocking of locking of the magnetic head 315 by the locking means in the second position by the unlocking means is not necessarily performed when the optical pickup unit 306 has been moved to the radially inner most zone of the signal recording region of the recording disc. That is, unlocking of locking by the locking means by the unlocking means may be performed when the optical pickup unit 306 has been moved to the radially outer most zone of the signal recording region. Alternatively, such unlocking may also be performed in operative association with the movement of the optical pickup unit 306 without dependency on its position.

A fifth embodiment of the disc recording and/or reproducing apparatus according to the present invention is hereinafter explained by referring to FIGS. 30 to 36.

The disc recording and/or reproducing apparatus includes a mechanical deck 411 provided with a chassis base plate 412 on which an optical pickup unit 415 making up the disc recording and/or reproducing mechanism along with a disc rotating and driving unit 413 and a magnetic head 414 is mounted for constituting a recording/reproducing section. The disc rotating and driving unit 413 is made up of a turntable 416 and a spindle motor 417 for rotationally driving the turntable 416. The spindle motor 417 is mounted on the lower surface of the chassis base plate 412 so that the spindle 417a is protruded above the upper surface of the chassis base plate. A turntable 416 is secured to the distal end of the spindle 417 for rotation in unison therewith. The optical pickup unit 415 is connected to a movable member or connecting arm 419 which is moved linearly in a direction towards and away from the turntable 416 by being supported by a feed screw 418 horizontally mounted on the lower surface of the chassis base plate 412 and rotationally driven by the pickup feed motor 415. The optical pickup unit 415 is moved in a direction towards and away from the disc turntable 416, that is radially of the disc 205 or 214 on the disc turntable 416, by means of the movable member 419, by rotation of the feed screw 418.

At the rear side of the movable member 419, mounting the optical pickup unit 415, there is provided a bearing member 419a upstanding on the upper surface of the chassis base plate 412. A head arm member, as a magnetic arm member 420, having mounted a magnetic head 414 at its distal end, is carried by this bearing 419a for being levelled up and down and is normally resiliently biased in a levelling down direction, that is in a direction towards the disc chucked on the disc table 416, by a torsion coil spring 421 mounted in the vicinity of the bearing 419a. The magnetic head 414 is slidingly contacted in this manner with the disc in a facing relation with respect to the object lens 415.

To this end, the magnetic head 414 is mounted on the distal end of the head arm member 420 via a gimbal spring 423. The gimbal spring is constituted by a supporting plate section 423a supporting the magnetic head 414 and arm sections 423b, 423c segmented and rearwardly extending from both lateral sides of the supporting plate section 423a and is secured to the inner surface of the head arm member 420 at the terminal ends of the arm sections 423b, 423c. The magnetic head 414 is supported for vertical pivoting movement with respect to the head arm member 420 by the elastic flexure of the arm sections 423b, 423c.

A head movement limiting member 424 is mounted on the head arm member 420 for limiting the vertical pivoting movement of the magnetic head 414 to a necessary minimum.

The head movement limiting member 424 is formed by bending a plate member in the form of a letter U and is supported at the upper surface 424b via a screw on the head arm member 420 so that its lower surface 424a faces the lower surface of the lateral edge of supporting plate section 423a of the gimbal spring 423 supporting the magnetic head 414 with a predetermined distance a in-between. The pivoting of the magnetic head 414 towards below may be limited by the lower surface of the lateral edge of the supporting plate section 423a of the gimbal spring 423 being caused to bear on the lower surface 424a of the head movement limiting member 424 for inhibiting downward flexure of the gimbal spring 423.

The pivoting range for the magnetic head 414 thus limited in movement by the head movement limiting member 424 is about ±0.8 mm from the pressure contact position of the disc to take account of in-plane deviations of the disc and the clearance between the disc and the head arm member 420.

It is noted that the head movement controlling member 424 may be integrally molded from synthetic resin with-the head arm member 420 and, if the head arm member 420 is formed of a metallic sheet the head movement limiting member may be formed integrally by segmenting the sheet metal material.

A supporting piece for the head arm member 420 is provided at the rear side of the head movement limiting member 424.

The magnetic head 414, thus mounted on the hear arm member 420, is moved radially of the disc in unison with the optical pickup unit 415 via the head arm member 420 and the movable member 419, as the magnetic head is kept in contact with the disc set on the disc table 416.

A head arm controlling member 425 is extended integrally downwards from a journal of the head arm member 420 as the magnetic head supporting member mounting the magnetic head 414. A projecting shoulder surface 425a is formed at the upper half of the rear surface of the head arm controlling section 425, while a recessed surface 425b is formed at the lower half of the rear surface of the controlling section 425.

A head arm controlling unit 426 is provided at the rear part of the chassis base plate 412. The head arm controlling unit 426 is made up of a head arm controlling plate 428, pivotally mounted for vertical rotational movement by a shaft pin 427 on the rear lateral side of the chassis base plate 412 and having a free end 428a projected rearwards from the lateral side edge of the chassis base plate 412, a head arm controlling shaft 429 connected to a free end 428a of the head, arm controlling plate 428 parallel to the movement direction of the head arm member 420 and caused to bear against the projecting shoulder surface 425a of the head arm controlling section 425, and a cartridge detection plate 430 extended from the middle of the head arm controlling plate 428 towards the upper surface of the chassis base plate 412 carrying on the upper surface of the distal end thereof a detection pin 430a for detecting a discrimination groove 209 or 210 as an indexing portion for the type of the disc cartridge, that is an indexing portion for indexing whether the disc cartridge is the recording/reproducing disc cartridge 201 or the reproduce-only disc cartridge 211. The head arm controlling plate 428 is normally rotationally biased upwards by a tension spring 432 installed between a spring retainer 431 of the chassis base plate 412 for holding the head arm member 420 in its raised position against the bias of the torsion coil spring 422 with the head arm controlling shaft 429 in register with the projected shoulder surface 425a of the head arm controlling section 425.

Figure 33:
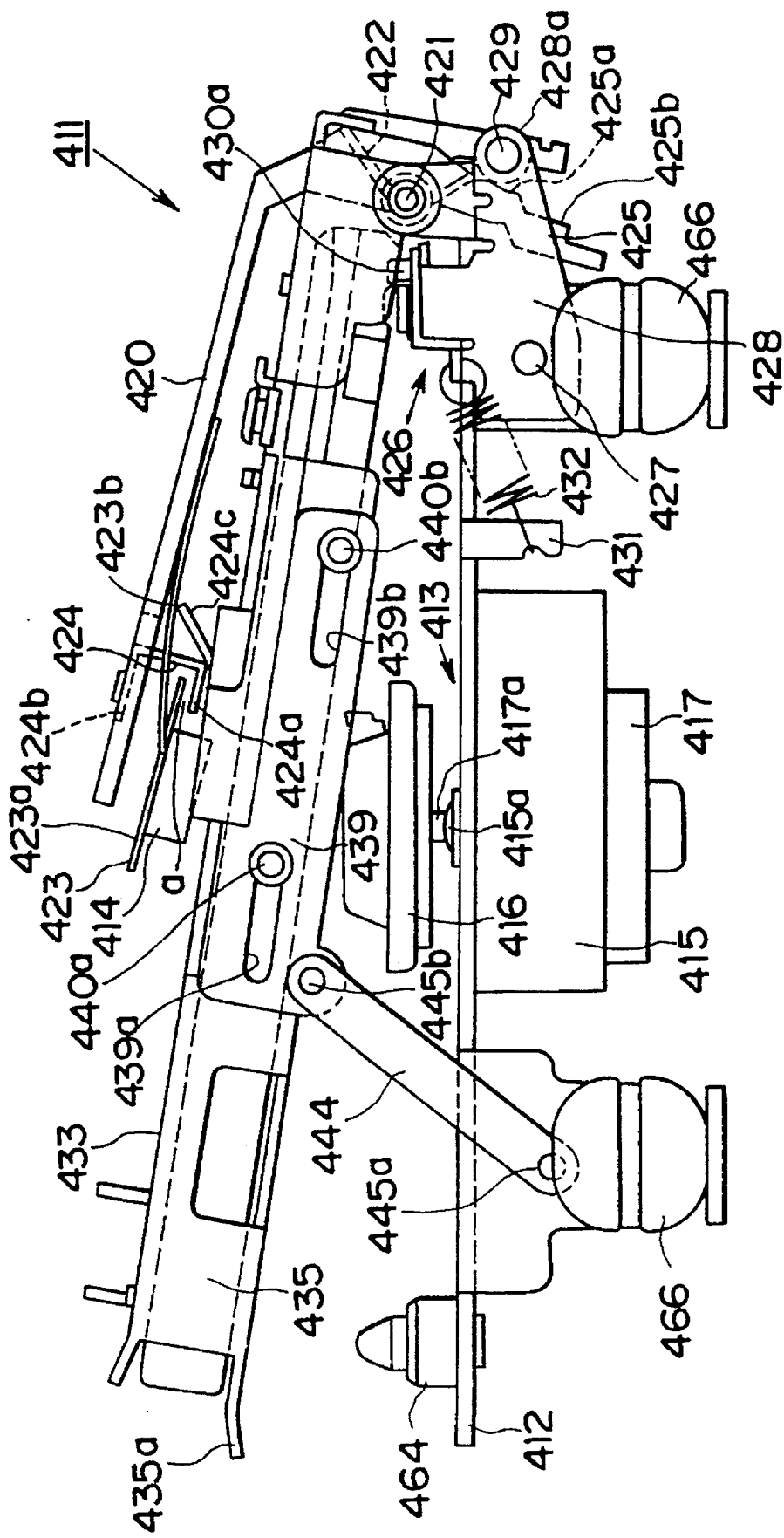
FIG. 33 is a side view showing the disc cartridge being loaded on the recording/reproducing section shown in FIG. 30.

A cartridge holder 433 is provided for being levelled up and down between the chassis base plate 412 and the head arm member 420. The cartridge holder 433 may be-rotated between the disc loading position shown in FIG. 34 in which the cartridge holder is levelled down horizontally with respect to the chassis base plate 412 for overlying the optical pickup unit 415 and the disc table 416 and the cartridge extracting position as shown in FIG. 33 in which the cartridge holder is raised away from the disc table 416 to permit extraction of the disc cartridge 201, 211.

The cartridge holder 433 is substantially in the shape of a planar plate of a size large enough to accommodate the disc cartridge 201 or 211, and has cartridge supporting sections 435, 436 by downwardly bending the lateral sides of the major surface 434 in the cross-sectional shape of a letter L. A housing space 433a for introduction and extraction of the disc cartridge 201 or 211 is defined between these supporting sections 435 and 436. A window 434a is formed in the major surface 434 along the path of movement of the magnetic head 414 and inclined guide surfaces 435a, 436a are formed at the forward ends of the lower surfaces of the supporting sections 435, 436 for guiding the insertion of the disc cartridge 201 or 211.

On the outer lateral surface of the cartridge supporting section 435 adjacent to the window 434a of the major surface 434 of the cartridge holder 433 is mounted a slider 439 having formed therein elongated holes 439a, 439b in the fore-and-aft direction, so that the slider 439 may be slid in the fore-and-aft direction by guide pins 440a, 440b set on the supporting section 4335 via the holes 439a, 439b, and a lifting bar 441 is mounted integrally on the upper surface of the window 434a of the slider 439 for extending in the transverse direction.

The cartridge holder 433 is carried on its rear lateral sides by bearing pieces 442a, 442b mounted upright on the rear lateral sides of the chassis base plate 412. The cartridge holder is normally rotationally biased in the upward direction by a torsion spring, not shown, provided with a journal section, by means of a link piece 444 connected by shaft pins 445a, 445b between the fore part of the chassis base plate 412 and the front end of the slider 439.

The cartridge holder 433, provided in this manner between the chassis base plate 411 and the head arm member 420, is provided with paired cartridge retention springs 451a, 451b; 452a, 452b at the fore and aft parts of the major surface 434 in register with cartridge positioning pins of the chassis base plate 411. These retention springs are spring plates supported at the respective one ends on the upper surface of the major surface 434 in a cantilevered fashion. The retention springs are formed at the free ends with downwardly extending abutment sections $451a_1$, $451b_1$; $452a_1$, $452b_1$ for being extended towards the lower surface or inner surface of the major surface section 434, for being abutted on and resiliently biased against the upper surface of the disc cartridge 201, 211 introduced into a space between the cartridge supporting sections 435, 436.

The cartridge holder 433 is provided with a locking unit 453 for the disc cartridge 201 or 211. The locking unit 453 is made up of a cartridge locking lever 454 and a cartridge unlocking arm 455. The cartridge locking lever 454 is rotatable mounted on the major surface 434 of the cartridge holder 433 for being protruded into the inside of the cartridge supporting section 435 and is provided with an engaging projection 454a engaged with or disengaged from an engagement recess opened on the periphery and downwards and an engaging projection 454b for the cartridge unlocking arm 455. The cartridge locking lever is normally rotationally biased by a torsion spring 456 in a direction in which the retention piece 455a is engaged with the disc cartridge accommodated in the cartridge holder 433.

The cartridge unlocking arm 455 is integrally formed with the slider 439 in register with the outer lateral surface of the cartridge supporting section 433 for being elastically pivoted in a direction of being moved towards and away from the cartridge holder 453. The rear end of the unlocking arm 455 is formed with a hook 455a engaged with the engaging projection 454b of the cartridge locking lever 454 at the rear end of the arm 455 and an inclined guide surface 455 continuous to the hook 455a.

When the slider 439 is slid rearwards, the engaging projection 454b of the cartridge locking lever 454 rides over the inclined guide surface 455b by resiliency of the cartridge unlocking arm 455 so as to be located at back of the hook 455a. When the slider 439 is slid forwards, the hook 454a is engaged with the engaging projection 454b for rotating the cartridge locking lever 454 against the bias of the torsion spring 456 for moving the retention piece 454a outwardly from the cartridge supporting section 435, that is outwardly from the recess of the disc cartridge, for unlocking the disc cartridge 201 or 211.

For extruding the unlocked disc cartridge 201 or 211 out of the cartridge holder 433, an extruding arm 456 is mounted at the rear part of the cartridge holder 433 for being rotated in the fore-and-aft direction and is normally biased by a torsion spring 457. On being unlocked, the cartridge holder 433 is thrust by the extruding arm 456 under its resiliency, with the foremost part of the cartridge holder being protruded out of the cartridge holder 433.

A holder locking lever 458 for locking the cartridge holder 433 is mounted in a levelled down state on the cartridge holder 433 that is in a state in which the disc 205 or 214 housed within the disc cartridge 201 or 211 is chucked on the turntable 416. The holder locking lever 458 is mounted on the foremost part of the major surface 434 section of the cartridge holder 433 by a shaft pin 459 for being leveled towards the other cartridge supporting section 436. A bent section 458a is formed at its distal end so as to be bent towards the outer surface of the cartridge supporting section 436 and a retention projection 460 is provided on the outer surface. A lifting spring 461 is mounted on the lower surface of the holder locking lever 458 for being abutted against the upper surface of the major surface 434 so as to be normally biased in the upward direction. Such upward rotation is controlled to a predetermined angle by an L-shaped controlling piece extended from the pivot being abutted against the upper surface of the major surface section 434.

The cartridge holder 433 is maintained in the locked state in the levelled down position via the holder locking lever 458 by an ejection unit 462 installed on the chassis base plate 412. That is, with the holder locking lever 458 being thrust against the bias of the spring 462 for levelling down the cartridge holder 433 to its lowest position, the retention projection 460 of the holder locking lever 458 is retained by a hook member 463 provided on the ejection unit 462 for locking the cartridge holder 433 in the levelled down position.

The ejection unit is driven in this state for unlocking by the hook member 463 for rotating the cartridge holder 433 upwards. Since the holder locking lever 458 is acted upon by spring 461, retention of the hook member 463 by the retention projection 460 is semiautomatically released by the unlocking operation for rotating the cartridge holder in the upward direction.

On the upper surface of the chassis base plate 412 are mounted a positioning guide pin 464 for setting the horizontal and height positions of the disc cartridge 201 or 211. A shock absorber 466 formed of an elastic material, such as rubber, is mounted on both lateral legs and is provided with an internal coil spring 467 for producing a force of elasticity as required.

The role of the shock absorber 466 is to soften the vibrations applied from outside for inhibiting adverse effects on the feed of the optical pickup unit 415 and rotation of the magneto-optical disc 205 or 214.

The operation of mounting and dismounting the disc cartridge 201 or 211 on or from the mechanical deck 411 of the disc recording and/or reproducing apparatus is hereinafter explained.

Before loading the disc cartridge 201 on the deck 411, the cartridge holder 433 is rotated upwards about shafts 443a, 443b with respect to the chassis base plate 412 so as to be positioned in a tilted position, as shown in FIG. 33. As the connecting link 444 is raised, the slider 439 is slid towards the front side of the cartridge holder 433. The head arm member 420 is lifted by lift bar 441 provided on the slider 439 via supporting piece 424 and is supported at this position so that the magnetic head 414 is at the raised position above the cartridge holder 433.

In this state, the disc cartridge 201 is inserted into a space between the cartridge supporting sections 435 and 436 of the cartridge holder 433, so that the windows 203, 215 are in register with the cartridge supporting section 435. As the disc cartridge is introduced further against the resiliency of the extruding arm 456, the shutter 204 is retained by the holder and only the cartridge main body 202 is moved for opening the windows 203, 215, the retention piece 454a of the locking unit 453 being engaged with the retention recess 225 for locking the disc cartridge 201 with respect to the cartridge holder 433.

The cartridge holder 433 is lowered in this state via the holder locking lever 458 and the locking lever 458 is engaged with the hook 463 of the ejecting unit 462 via the retention projection 460 for maintaining the cartridge holder 433 in the lowered position.

The disc cartridge 201 is positioned in this manner on the chassis base plate 412 in a predetermined state by a horizontal position setting guide pin 464 and a heights position setting pin 465, while a turntable 416 of the disc rotating and driving unit 413 is introduced via a chucking aperture 219 provided in the lower surface of the cartridge main body 202 for chucking the magneto-optical disc 205.

In this state, the indexing portion for the recording/reproducing disc 209 is in register with the detection pin 430a of the cartridge detection plate 430. Since the detection groove 209 is shallow in depth, the detection pin 430a is lowered in its position. This causes the head arm controlling plate 428 of the head arm controlling unit 426 to be rotated downwards via the cartridge detection plate 430 so that the head arm controlling shaft 429 is in register with the recessed shoulder 425b of the head arm controlling section 425, with the head arm member 420 being rotatable downwards under the bias of the torsion spring 422.

Figure 34:
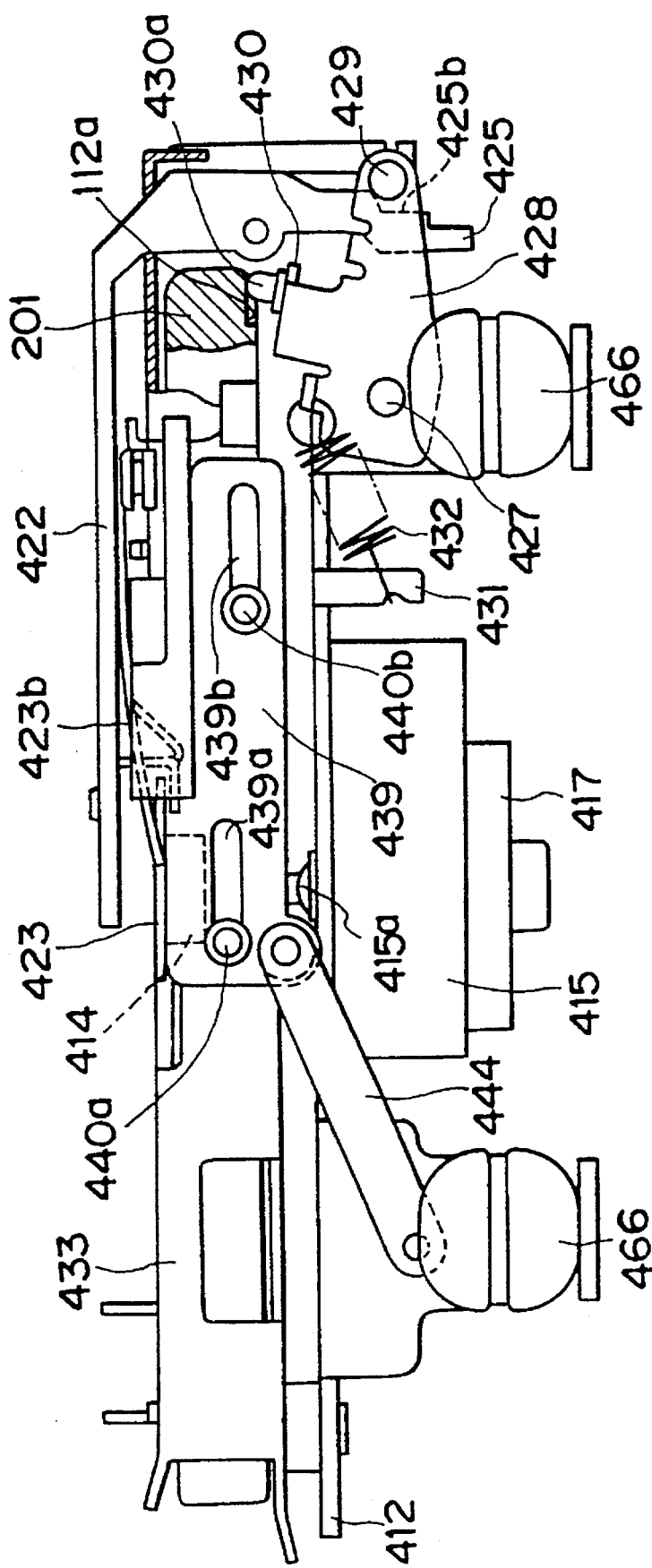
FIG. 34 is a side view showing the state in which the recordable disc cartridge has been loaded on the recording/reproducing apparatus shown in FIG. 30, with portions thereof being broken away.

Besides, since the cartridge holder 433 is lowered in this state, the slider 439 is slid rearwards by connecting link piece 444 and the lifting bar 441 is receded away from the supporting piece 424c of the head arm member 420. This causes the head arm member 420 to be rotated downwards to cause the magnetic head 414 supported by the gimbal spring 423 at its distal end to be introduced into the aperture 203 for the magnetic head 203 of the cartridge main body 202 and into sliding contact with the upper surface of the magneto-optical disc 205 (FIG. 34).

The optical pickup unit 415 is caused to face the lower surface of the magneto-optical disc 205 via the aperture for the optical pickup unit 2154 of the cartridge main body 202. The information signals may be recorded on or reproduced from the magneto-optical disc 205 by the disc rotating and driving unit 416, that is by the disc table 416, being run into rotation.

For ejecting the disc cartridge 201 after recording and reproduction of the magneto-optical disc 205, the ejection unit 462 is actuated for disengaging its hook 463 away from the engaging projection 460 of the holder locking lever 458 for lifting the holder locking lever 458 by the lifting spring 461. Simultaneously, the cartridge holder 433 is rotated upwards under the bias of the torsion spring, with the slider 439 being slid forwards by the upward rotation of the connecting link piece 444.

By the forward sliding of the slider 439, lifting bar 441 lifts the head arm member 420 via supporting piece 424c for raising the magnetic head 414 to a position not conflicting with the disc cartridge 201 and for forwardly moving the cartridge unlocking arm 455 provided on slider 439. This causes hook 455a at the distal end of the cartridge unlocking arm 455 to be engaged with and pull the engaging projection 454b of the cartridge locking lever 454 to cause the locking lever 454 to be rotated against the bias of the torsion spring 456 for disengaging the retention piece 454a from the retention recess 225 of the torsion spring 225 of the disc cartridge 201 for unlocking the disc cartridge 201 from the cartridge holder 433 for extruding and ejecting the disc cartridge 201 from the cartridge holder 433 by the extruding arm 46.

The operation of loading and unloading the reproduce-only disc cartridge 211 is hereinafter explained. Since the operation is substantially the same as that for the disc cartridge 201, only the different operational aspects are explained.

When the disc cartridge 211 is introduced into the cartridge holder 433 for maintaining the cartridge holder 433 at the lowered position, the indexing portion for the reproduce-only disc 210 of the disc cartridge 211 is in register with the detection pin 430a of the cartridge detection plate 430. Since the indexing portion 210 is deeper in depth, the detection pin 430a is not depressed, in distinction from the case of the recording-reproducing disc, so that the head arm controlling plate 428 is not rotated, with the head arm controlling shaft 429 remaining in register with the protruding shoulder 425a of the head arm limiting section 425, for inhibiting the rotation of the head arm member 425.

Figure 35:
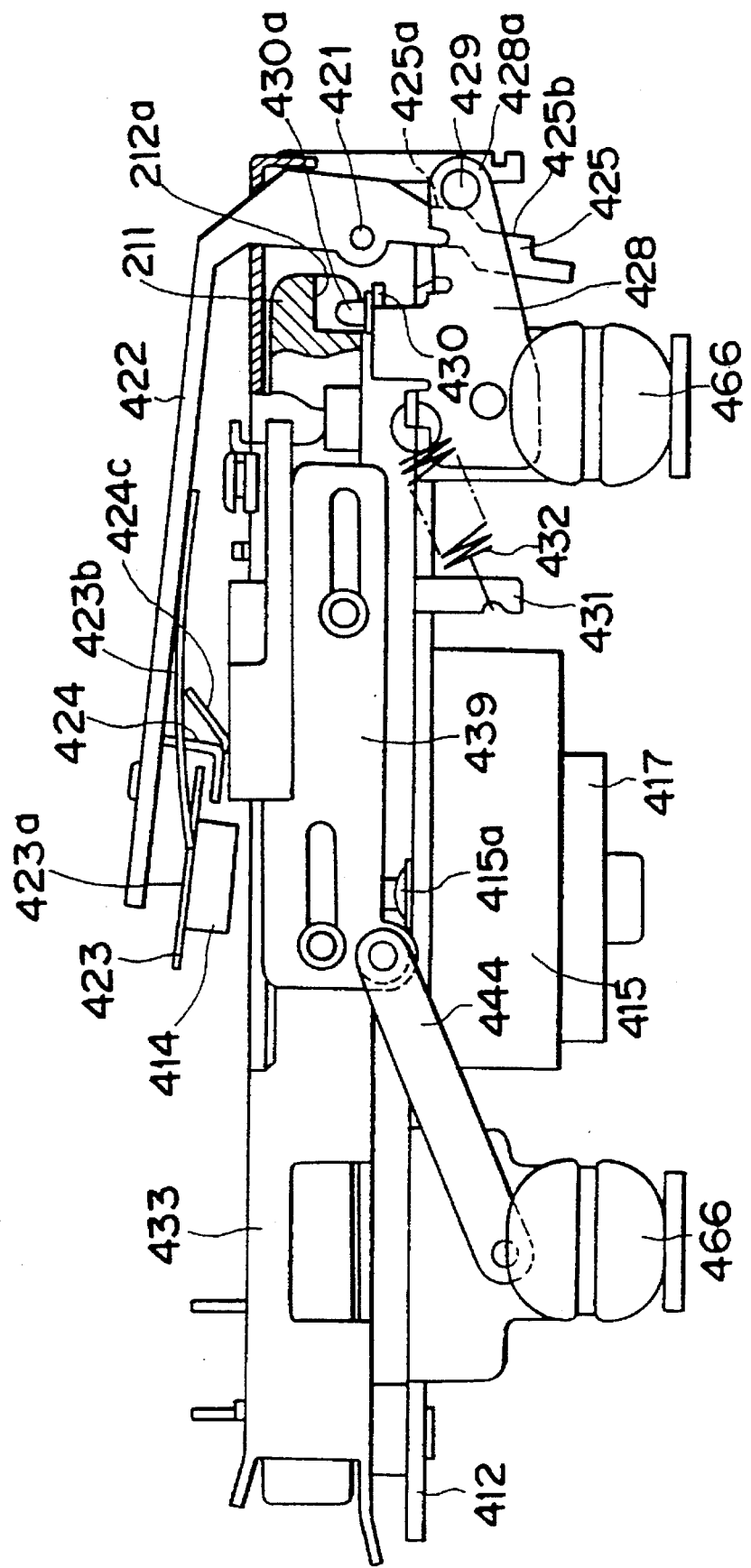
FIG. 35 is a side view showing the state in which the reproduce-only disc is loaded on the recording/reproducing section of FIG. 30, with portions thereof being broken away.

By descent of the cartridge holder 433, the slider 439 is slid rearwards and the head arm member 420 is maintained in the lifted state even although the lifting bar 441 is moved away from the supporting piece 424a of the head arm member 420, with the magnetic head 414 remaining detached from and prevented from being abutted against the disc cartridge 211 (FIG. 35).

The optical pickup unit 415 is in register with the lower surface of the optical disc 214 via the aperture for the optical pickup unit 215 of the cartridge main body 212, so that the optical disc 214 may be reproduced by the turntable 416 being run into rotation.

In the above operation, the disc cartridge 201 is pressed towards the positioning pins 464, 465 under the resiliency of the cartridge retention springs 451a, 451b; 452a, 452b mounted on the cartridge holder 433, with the disc cartridge 201 remaining engaged with the positioning pins 464, 465 of the chassis base plate 412, thereby preventing the disc cartridge from being contacted with the disc 205 under vibrations with the movement of the cartridge main body 202 while improving resistance of the disc cartridge.

Besides, the gimbal spring 423 supporting the magnetic head 414 is limited in its pivoting movement by the head limiting member 424 to prevent the magnetic head arm 414 from conflicting with other component parts as well as to prevent the gimbal spring 423 itself from being deformed and to prevent unforeseen events from being produced in the magnetic head 414 of in the gimbal spring 423 in a state in which the head arm member 420 is lifted during non-use time of the magnetic head 414.

With the above-described disc recording and/or reproducing apparatus, the disc type display section provided on the disc cartridge loaded in the recording/reproducing section on which the disc cartridge is loaded thrusts and rotates the distal end of the disc type detecting arm for moving the magnetic head mounted on the magnetic head supporting member in a direction towards and away from the disc, so that the magnetic head is brought into and out of contact with the disc, such that if the disc is the reproduce-only disc, the magnetic head is not contacted with the disc of the disc cartridge and hence the wear caused to the magnetic head is diminished and the magnetic head is prevented from being destructed by contact with the disc cartridge for improving the reliability and service life of the apparatus.

Besides, with the present disc recording and/or reproducing apparatus, the disc type detection arm, having its proximal end supported by a pivot rotatably and slidably supporting the magnetic head supporting member so as to be rotated about the pivot and slid in the axial direction, is limited in a relative rotation of the pivot with respect to the magnetic head supporting member by the rotation limiting member, while being limited in an axial movement of the pivot with respect to the recording/reproducing section by the movement limiting member.

Consequently, when the disc cartridge is loaded on the recording/reproducing section, the disc type detection arm has its distal end thrust by the disc type index portion provided on the disc cartridge for rotating the magnetic head supporting member without inhibiting axial movement of the magnetic head supporting member along the pivot axis.

In addition, if the rotation limiting member is a shaft mounted on the magnetic head supporting member parallel to the pivot, the disc type detection arm may be slid smoothly along the pivot axis.

If, in the above-described disc recording and/or reproducing apparatus, an abutment member is provided which limits rotation of the disc type detection arm about the pivot axis in the absence of the disc cartridge in the recording/reproducing apparatus and which is moved by the disc cartridge loaded on the recording/reproducing apparatus for releasing the limitation on the movement of the disc type detection arm, the magnetic head supporting member may be inhibited from rotation when the disc cartridge is not loaded on the recording/reproducing section for preventing the magnetic head from being destructed under external shock or vibrations.

Besides, in the recording and/or reproducing apparatus comprising the recording/reproducing section, the positioning member provided at one end of the pivot and the resilient member provided in the vicinity of the other end of the pivot the magnetic head supporting member is thrust by resiliency of the resilient member against the positioning member for being positioned as far as the position in the axial direction of the pivot is concerned. Consequently, the magnetic head may be positioned accurately.

In addition, with the present disc recording and/or reproducing apparatus, the locking unit whereby the magnetic head movably supported between the first position proximate to the disc base plate of the disc loaded on the disc loading section by being supported by the magnetic head supporting member and the second position in which it is displaced away from the disc base plate may be maintained at the aforementioned second position is arranged on the magnetic head supporting member movably mounted radially of the disc loaded on the disc loading section.

Consequently, when the magnetic head is moved radially of the disc, the locking unit is moved radially of the disc in unison with the magnetic head. That is, with the present disc recording and/or reproducing apparatus, there is no risk of the locking unit being slidingly contacted with the magnetic head supporting member of with the magnetic head for assuring smooth high-speed movement of the magnetic head unit radially of the disc.

With the present disc recording and/or reproducing apparatus, the unlocking unit is actuated for unlocking the magnetic head depending on the indexing portion provided on the disc cartridge for indexing the disc type on loading the disc on the disc loading section. When the magnetic head is released from locking by the locking unit the magnetic head is moved to the position proximate to the disc of enabling the magnetic field to be applied to the disc.

If the locking of the magnetic head by the locking unit is released when the magnetic head is at the inner most radial position of the disc, the magnetic head may be brought to the position proximate to the disc immediately before starting of the recording of the information signals, if the recording of the information signals is started at the inner most radial position of the disc.

That is, the sliding contact of the magnetic head with the disc is incurred only when the index portion provided on the disc cartridge indexes that the information signals can be recorded on the disc, so that the wear caused to the disc may be minimized, while the magnetic head movement radially of the disc may be performed speedily and smoothly.

What is claimed is:

1. A disc recording and/or reproducing apparatus for operating on a disc housed within a disc cartridge, the disc cartridge having a disc type recess formed on a bottom side, the disc type recess having one of a plurality of depths, each depth indicating a type of disc, the disc recording and/or reproducing apparatus comprising:

an optical pickup unit radially movable across the disc that radiates a laser light beam on a recording surface of the disc;

a magnetic head that applies an external magnetic field to the disc;

a pivot shaft;

a magnetic head supporting member rotatably connected to the optical pickup unit by the pivot shaft so that the magnetic head can move towards and away from the disc between a first position proximate to the disc and a second position spaced-apart from the disc, and so that the magnetic head moves in unison with the optical pickup unit;

biasing means for biasing the magnetic head supporting member in the second position; and a disc type detection arm slidingly engaged to the pivot shaft so that the pivot shaft moves with the optical pickup unit when the optical pickup unit moves radially across the disc, the disc type detection arm contacting the disc type recess formed on the bottom side of the disc cartridge when the disc cartridge is loaded into the recording and/or reproducing apparatus, moving the magnetic head supporting member towards the disc from the second position to the first position when the disc type recess indicates a first type of disc, and moving the magnetic head supporting member towards the disc from the second position to a third position intermediate between the first position and the second position when the disc type recess indicates a second type of disc.

2. The disc recording and/or reproducing apparatus as defined in claim 1 wherein the optical pickup unit comprises a connecting arm having a pair of upstanding bent portions, wherein the pivot shaft is connected between the pair of upstanding bent portions, and a pair of upstanding tabs that limit the movement of the disc type detection arm along the axis of the pivot shaft.

3. The disc recording and/or reproducing apparatus as defined in claim 2 wherein the magnetic head supporting member is positioned against one of the upstanding bent portions by the biasing means.

4. The disc recording and/or reproducing apparatus as defined in claim 3 wherein the biasing means includes a torsion coil spring.

5. The disc recording and/or reproducing apparatus as defined in claim 4 wherein the connecting arm includes position limiting member means for limiting a rotation of the magnetic head supporting member away from the disc.

6. The disc recording and/or reproducing apparatus as defined in claim 1 wherein the disc type detection arm further includes an indexing portion detection pin that contacts the disc type recess.

7. A disc recording and/or reproducing apparatus for operating on a disc housed within a disc cartridge, the disc cartridge having a disc type recess that has one of a plurality of depths, each depth indicating a type of disc, the disc recording and/or reproducing apparatus comprising:

an optical pickup unit radially movable across the disc that radiates a laser light beam on a recording surface of the disc;

a magnetic head that applies an external magnetic field to the disc;

a pivot shaft;

a magnetic head supporting member rotatably connected to the optical pickup unit by the pivot shaft so that the magnetic head can move towards and away from the disc between a first position proximate to the disc and a second position spaced-apart from the disc, and so that the magnetic head moves in unison with the optical pickup unit wherein the magnetic head supporting member rotates about the pivot shaft;

biasing means for biasing the magnetic head supporting member in the second position; and a disc type detection arm engaged to the pivot shaft that contacts the disc type recess in the disc cartridge when the disc cartridge is loaded into the recording and/or reproducing apparatus, that moves the magnetic head supporting member towards the disc from the second position to the first position when the disc type recess indicates a first type of disc, and that moves the magnetic head supporting member towards the disc from the second position to a third position intermediate between the first position and the second position when the disc type recess indicates a second type of disc, wherein the disc type detection arm includes a C-shaped cutout that is positioned around the pivot shaft so that the cutout can rotate around the pivot shaft and axially along the pivot shaft.

8. The disc recording and/or reproducing apparatus as defined in claim 7 wherein the disc type detection arm contacts the magnetic head supporting member so that the detection arm and the supporting member rotate around the pivot shaft in unison when the detection arm contacts the disc type recess.

9. The disc recording and/or reproducing apparatus as defined in claim 8 wherein one of the upstanding bent portions of the connecting arm includes a position limiting tab, and wherein the magnetic head supporting member includes a limiter shaft for rotatably supporting the disc type detection arm, the limiter shaft contactable with the position limiting tab for limiting rotation of the supporting member around the pivot shaft, thereby limiting the rotation of the detection arm around the pivot shaft.

10. The disc recording and/or reproducing apparatus as defined in claim 7 and further comprising an abutment member that engages the disc type detection arm and limits movement of the disc type detection arm when the disc cartridge is not loaded in the disc recording and/or reproducing apparatus, and that disengages from the disc type detection arm, thereby allowing movement of the disc type detection arm, when the disc cartridge is loaded in the disc recording and/or reproducing apparatus.

11. The disc recording and/or reproducing apparatus as defined in claim 10 wherein the abutment member engages the disc type detection arm by contacting a bottom side of the disc type detection arm.

12. The disc recording and/or reproducing apparatus as defined in claim 7 wherein the biasing means is formed around an end of the pivot shaft.

13. The disc recording and/or reproducing apparatus as defined in claim 7 and further comprising a cartridge holder that holds the disc cartridge when the disc cartridge is inserted in the recording and/or reproducing apparatus, the cartridge holder being movably supported between an upward direction and a downward direction, wherein the magnetic head supporting member is rotated according to the movement of the cartridge holder in the upward direction and the downward direction.

14. A disc recording and/or reproducing apparatus for operating on a disc housed within a disc cartridge, the disc cartridge having one of a plurality of disc type recesses, each disc type recess indicating a type of disc and having a bottom side, the disc recording and/or reproducing apparatus comprising:

a pivot shaft;

an optical pickup unit radially movable across the disc that radiates a laser light beam on a recording surface of the disc the optical pickup unit comprising a connecting arm having a pair of upstanding bent portions, wherein the pivot shaft is connected between the pair of upstanding bent portions, and a pair of upstanding tabs that limit the movement of the disc type detection arm along the axis of the pivot shaft one of the upstanding bent portions having a position limiting tab;

a magnetic head that applies an external magnetic field to the disk;

a magnetic head supporting member rotatably connected to the optical pickup unit by the pivot shaft so that the magnetic head can move towards and away from the disc between a first position proximate to the disc and a second position spaced-apart from the disc, and so that the magnetic head moves in unison with the optical pickup unit the magnetic head supporting member having a limiter shaft the limiter shaft contactable with the position limiting tab for limiting rotation of the magnetic head supporting member around the pivot shaft;

biasing means for biasing the magnetic head supporting member in the second position; and a disc type detection arm engaged to the pivot shaft and rotatably supported by the limiter shaft, that contacts the bottom side of the disc type recess in the disc cartridge when the disc cartridge is loaded into the recording and/or reproducing apparatus, that moves the magnetic head supporting member towards the disc from the second position to the first position in response to the detection arm contacting the bottom side when the disc type recess indicates a first type of disc, and that moves the magnetic head supporting member towards the disc from the second position to a third position intermediate between the first position and the second position in response to the detection arm contacting the bottom side when the disc type recess indicates a second type of disc, the disc type detection arm including a C-shaped cutout that is positioned around the pivot shaft so that the cutout can rotate around the pivot shaft and axially along the pivot shaft, wherein the disc type detection and the supporting member rotate around the pivot shaft in unison when the detection arm contacts the disc type recess, wherein the magnetic head supporting member further includes a pair of tabs, and wherein the limiter shaft is connected between the pair of tabs and extends beyond one of the tabs, the limiter shaft being substantially parallel with the pivot shaft.

15. A disc recording and/or reproducing apparatus for operating on a disc housed within a disc cartridge, the disc cartridge having one of a plurality of disc type recesses, each disc type recess indicating a type of disc, the disc recording and/or reproducing apparatus comprising: an optical pickup unit radially movable across the disc that radiates a laser light beam on a recording surface of the disc;

a magnetic head that applies an external magnetic field to the disc;

a magnetic head supporting member connected to the magnetic head and rotatably connected to the optical pickup unit so that the magnetic head can move towards and away from the disc between a first position proximate to the disc and a second position spaced apart from the disc, and so that the magnetic head moves in unison with the optical pickup unit;

a tension coil spring for biasing the magnetic head supporting member towards the first position when the magnetic head supporting member is in the first position, and for biasing the magnetic head supporting member towards the second position when the magnetic head supporting member is in the second position, the torsion coil spring having a first arm connected to the optical pickup unit and a second arm connected to the magnetic head supporting member; and a disc type detection arm that contacts the disc type recess in the disc cartridge when a first type of disc cartridge is loaded into the recording and/or reproducing apparatus, that moves the magnetic head supporting member to the first position when the detection arm contacts the disc type recess, and that leaves the magnetic head supporting member in the second position when a second type of disc cartridge is loaded.

16. The disc recording and/or reproducing apparatus as defined in claim 15 wherein the optical pickup unit includes a first position limiting member and a second position limiting member that limit the vertical movement of the magnetic head supporting member towards and away from the disc.

17. The disc recording and/or reproducing apparatus as defined in claim 16 wherein the magnetic head supporting member includes:

a first end, a second end, and a flexibly protruding member, the first end connected to the optical pickup unit between the first position limiting member and the second position limiting member, the flexibly protruding member connected adjacent to the second end, the magnetic head connected to the flexibly protruding member.

18. The disc recording and/or reproducing apparatus as defined in claim 16 wherein the first position limiting member defines the first position, and the second position limiting member defines the second position.

19. A disc recording and/or reproducing apparatus for operating on a disc housed within a disc cartridge, the disc cartridge having one of a plurality of disc type recesses, each disc type recess indicating a type of disc, the disc recording and/or reproducing apparatus comprising:

an optical pickup unit radially movable across the disc that radiates a laser light beam on a recording surface of the disc;

a magnetic head that applies an external magnetic field to the disc;

a magnetic head supporting member rotatably connected to the optical pickup unit so that the magnetic head can move towards and away from the disc between a first position proximate to the disc and a second position spaced apart from the disc, and so that the magnetic head moves in unison with the optical pickup unit;

biasing means for biasing the magnetic head supporting member towards the first position;

locking means formed on the optical pickup unit for positioning the magnetic head supporting member at a third position between the first position and the second position when the disc cartridge is loaded in the disc recording and/or reproducing apparatus; and a disc type detection arm that contacts the disc type recess in the disc cartridge when a first type of disc cartridge is loaded into the recording and/or reproducing apparatus, that engages the locking means when the detection arm contacts the disc type recess and the optical pickup unit radially moves to a release position, that releases the locking means when the detection arm engages the locking means, whereby the magnetic head supporting member moves to the first position, and that leaves the magnetic head supporting member in the third position when a second type of disc cartridge is loaded.

20. The disc recording and/or reproducing apparatus as defined in claim 19 wherein the release position includes the inner most radial position of the disc.

21. A disc recording and/or reproducing apparatus for operating on a disc housed within a disc cartridge, the disc cartridge having one of a plurality of disc type recesses, each disc type recess indicating a type of disc, the disc recording and/or reproducing apparatus comprising:

an optical pickup unit radially movable across the disc that radiates a laser light beam on a recording surface of the disc;

a magnetic head that applies an external magnetic field to the disc;

a magnetic head supporting member rotatably connected to the optical pickup unit so that the magnetic head can move towards and away from the disc between a first position proximate to the disc and a second position spaced apart from the disc, and so that the magnetic head moves in unison with the optical pickup unit the magnetic head supporting member having a first elongated portion connected to the magnetic head and a second elongated portion extending away from the first elongated portion, the second elongated portion having a projecting shoulder surface and a recessed surface;

biasing means for biasing the magnetic head supporting member towards the first position; and a disc type detection arm that contacts the projecting shoulder surface of the magnetic head supporting member when the disc cartridge is unloaded from the recording and/or reproducing apparatus, thereby positioning the magnetic head supporting member in the second position, that contacts the disc type recess in the disc cartridge when a first type of disc cartridge is loaded into the recording and/or reproducing apparatus, that moves to the recessed surface when the detection arm contacts the disc type recess, whereby the magnetic head supporting member moves to the first position, and that leaves the magnetic head supporting member in the second position when a second type of disc cartridge is loaded.

22. The disc recording and/or reproducing apparatus as defined in claim 21 wherein the magnetic head supporting member includes:

a head arm member movably mounted to the magnetic head; and a head arm movement limiting member that limits a movement of the head arm member.

23. The disc recording and/or reproducing apparatus as defined in claim 21 wherein the disc type detection arm includes:

a head arm controlling member rotatably supported by a chassis;

a shaft member connected to the head arm controlling member, the shaft member contacting the projecting shoulder surface and the recessed surface; and a detection plate member connected to the head arm controlling member having a detection pin mounted upright thereon for detecting the disc type recess in the disc cartridge.

24. A disc recording and/or reproducing apparatus for operating on a disc housed within a disc cartridge, the disc cartridge having a disc type recess formed on a bottom side, the disc type recess having one of a plurality of depths, each depth indicating a type of disc, the disc recording and/or reproducing apparatus comprising:

an optical pickup unit radially movable across the disc that radiates a laser light beam on a recording surface of the disc, the optical pickup unit having a position limiting tab;

a magnetic head that applies an external magnetic field to the disc;

a pivot shaft;

a magnetic head supporting member rotatably connected to the optical pickup unit by the pivot shaft so that the magnetic head can move towards and away from the disc between a first position proximate to the disc and a second position spaced-apart from the disc, and so that the magnetic head moves in unison with the optical pickup unit, the magnetic head supporting member having a rotation limiting shaft substantially parallel to the pivot shaft that limits rotation of the magnetic head supporting member away from the disc when the rotation limiting tab contacts the position limiting tab;

biasing means for biasing the magnetic head supporting member in the second position; and a disc type detection arm engaged to the pivot shaft and the rotation limiting shaft that contacts the disc type recess formed on the bottom side of the disc cartridge when the disc cartridge is loaded into the recording and/or reproducing apparatus, that moves the magnetic head supporting member towards the disc from the second position to the first position when the disc type recess indicates a first type of disc, and that moves the magnetic head supporting member towards the disc from the second position to a third position intermediate between the first position and the second position when the disc type recess indicates a second type of disc.

* * * * *